(12) United States Patent
Xu et al.

(10) Patent No.: US 9,321,126 B2
(45) Date of Patent: *Apr. 26, 2016

(54) LASER-BASED MATERIAL PROCESSING APPARATUS AND METHODS

(75) Inventors: Jingzhou Xu, Ann Arbor, MI (US); Jin Young Sohn, Ann Arbor, MI (US); Gyu Cheon Cho, Ann Arbor, MI (US); Lawrence Shah, Maitland, FL (US)

(73) Assignee: IMRA America, Inc., Ann Arbor, MI (US)

( * ) Notice: Subject to any disclaimer, the term of this patent is extended or adjusted under 35 U.S.C. 154(b) by 13 days.

This patent is subject to a terminal disclaimer.

(21) Appl. No.: 13/037,614

(22) Filed: Mar. 1, 2011

(65) Prior Publication Data
US 2011/0240617 A1    Oct. 6, 2011

Related U.S. Application Data

(63) Continuation of application No. PCT/US2011/026501, filed on Feb. 28, 2011.

(60) Provisional application No. 61/319,220, filed on Mar. 30, 2010.

(51) Int. Cl.
*B23K 26/00* (2014.01)

(52) U.S. Cl.
CPC . *B23K 26/00* (2013.01); *Y02P 40/57* (2015.11)

(58) Field of Classification Search
CPC .................................. B23K 26/00; B23K 26/36
USPC ............... 219/121.6, 121.61, 121.66, 121.67, 219/121.72
See application file for complete search history.

(56) References Cited

U.S. PATENT DOCUMENTS

| 3,360,398 A | 12/1967 | Garibotti |
| 5,435,815 A * | 7/1995 | Ikegaya et al. ................ 51/295 |

(Continued)

FOREIGN PATENT DOCUMENTS

| GB | 20092459669 A | 11/2009 |
| JP | 2005142389 A2 | 6/2005 |

(Continued)

OTHER PUBLICATIONS

M. Henry et al., "Cutting flexible printed circuit board with a 532nm Q-switched diode pumped solid state laser," Paper #M804, Proceeding of ICALEO, Laser Microfabrication Conference, pp. 412-419, 2005.

(Continued)

*Primary Examiner* — Dana Ross
*Assistant Examiner* — Ayub Maye
(74) *Attorney, Agent, or Firm* — Knobbe, Martens, Olson & Bear, LLP

(57) ABSTRACT

Various embodiments may be used for laser-based modification of target material of a workpiece while advantageously achieving improvements in processing throughput and/or quality. Embodiments of a method of processing may include focusing and directing laser pulses to a region of the workpiece at a pulse width sufficiently short so that material is efficiently removed by nonlinear optical absorption from the region and a quantity of heat affected zone and thermal stress on the material within the region, proximate to the region, or both is reduced relative to a quantity obtainable using a laser with longer pulses. In at least one embodiment, an ultrashort pulse laser system may include at least one of a fiber amplifier or fiber laser. Various embodiments are suitable for at least one of dicing, cutting, scribing, and forming features on or within a composite material.

31 Claims, 17 Drawing Sheets

(56) References Cited

U.S. PATENT DOCUMENTS

| | | |
|---|---|---|
| 5,499,134 A | 3/1996 | Galvanauskas |
| 5,593,606 A | 1/1997 | Owen |
| 5,641,416 A | 6/1997 | Chadha |
| 5,652,681 A | 7/1997 | Chen |
| 5,656,186 A | 8/1997 | Mourou |
| 5,696,782 A | 12/1997 | Harter |
| 5,744,780 A | 4/1998 | Chang et al. |
| 5,818,630 A | 10/1998 | Fermann |
| 5,841,099 A | 11/1998 | Owen |
| 5,847,960 A | 12/1998 | Cutler |
| 5,883,710 A | 3/1999 | Nikoonahad |
| 6,067,306 A | 5/2000 | Sandstrom |
| 6,172,325 B1 | 1/2001 | Baird |
| 6,210,401 B1 | 4/2001 | Lai |
| 6,211,488 B1 | 4/2001 | Hoekstra |
| 6,281,471 B1 | 8/2001 | Smart |
| 6,407,363 B2 | 6/2002 | Dunsky |
| 6,433,301 B1 | 8/2002 | Dunsky |
| 6,552,301 B2 | 4/2003 | Herman |
| 6,555,447 B2 | 4/2003 | Weishauss |
| 6,562,698 B2 | 5/2003 | Manor |
| 6,621,040 B1 | 9/2003 | Perry et al. |
| 6,664,498 B2 | 12/2003 | Forsman |
| 6,676,878 B2 | 1/2004 | O'Brien |
| 6,716,362 B1 | 4/2004 | Benz |
| 6,737,606 B2 | 5/2004 | Peng |
| 6,744,009 B1 | 6/2004 | Xuan |
| 6,760,356 B2 | 7/2004 | Erbert et al. |
| 6,770,544 B2 | 8/2004 | Sawada |
| 6,784,399 B2 | 8/2004 | Dunsky |
| 6,784,400 B1 | 8/2004 | Banks et al. |
| 6,791,060 B2 | 9/2004 | Dunsky |
| 6,885,683 B1 | 4/2005 | Fermann |
| 6,917,631 B2 | 7/2005 | Richardson |
| 6,979,798 B2 | 12/2005 | Gu et al. |
| 6,992,026 B2 | 1/2006 | Fukuyo |
| 7,057,133 B2 | 6/2006 | Lei |
| 7,113,327 B2 | 9/2006 | Gu |
| 7,115,514 B2 | 10/2006 | Stoltz |
| 7,169,687 B2 | 1/2007 | Li |
| 7,316,940 B2 | 1/2008 | Daubenspeck |
| 7,330,301 B2 | 2/2008 | Harter |
| 7,470,566 B2 | 12/2008 | Nakamura |
| 7,486,705 B2 | 2/2009 | Shah et al. |
| 7,491,909 B2 | 2/2009 | Yamamoto et al. |
| 7,505,196 B2 | 3/2009 | Nati et al. |
| 7,528,342 B2 | 5/2009 | Deshi |
| 7,568,365 B2 | 8/2009 | Schaffer et al. |
| 7,605,343 B2 | 10/2009 | Lei |
| 7,684,450 B2 | 3/2010 | Shah |
| 7,742,274 B2 * | 6/2010 | Utschig .................. 361/220 |
| 7,912,100 B2 | 3/2011 | Shah |
| 8,158,493 B2 | 4/2012 | Shah et al. |
| 8,279,903 B2 | 10/2012 | Shah et al. |
| 8,405,885 B2 | 3/2013 | Shah et al. |
| 8,644,356 B2 | 2/2014 | Shah et al. |
| 8,648,277 B2 | 2/2014 | Alpay et al. |
| 8,670,151 B2 | 3/2014 | Shah et al. |
| 8,723,076 B2 | 5/2014 | Alpay et al. |
| 8,735,772 B2 | 5/2014 | Chacin et al. |
| 8,785,813 B2 | 7/2014 | Shah et al. |
| 2001/0045419 A1 | 11/2001 | Dunsky et al. |
| 2002/0162360 A1 | 11/2002 | Schaffer et al. |
| 2003/0047543 A1 | 3/2003 | Peng |
| 2003/0160034 A1 | 8/2003 | Filgas et al. |
| 2003/0215204 A1 | 11/2003 | Schroeder et al. |
| 2004/0164061 A1 | 8/2004 | Takeuchi |
| 2004/0226925 A1 | 11/2004 | Gu et al. |
| 2004/0240037 A1 | 12/2004 | Harter |
| 2005/0000952 A1 | 1/2005 | Harter |
| 2005/0067391 A1 | 3/2005 | Starkston |
| 2005/0105865 A1 | 5/2005 | Fermann |
| 2005/0111500 A1 | 5/2005 | Harter |
| 2005/0184035 A1 * | 8/2005 | Kurosawa et al. ....... 219/121.61 |
| 2005/0190802 A1 | 9/2005 | Richardson |
| 2005/0225846 A1 | 10/2005 | Nati |
| 2005/0226278 A1 | 10/2005 | Gu |
| 2005/0226287 A1 | 10/2005 | Shah et al. |
| 2005/0274702 A1 | 12/2005 | Deshi |
| 2005/0279740 A1 | 12/2005 | Liu |
| 2006/0009008 A1 | 1/2006 | Kaneuchi |
| 2006/0088984 A1 | 4/2006 | Li |
| 2006/0096962 A1 | 5/2006 | Park |
| 2006/0099810 A1 | 5/2006 | Voronov |
| 2006/0159137 A1 | 7/2006 | Shah |
| 2006/0169677 A1 | 8/2006 | Deshi |
| 2006/0207976 A1 | 9/2006 | Bovatsek et al. |
| 2006/0263024 A1 | 11/2006 | Dong |
| 2006/0285561 A1 | 12/2006 | Shah et al. |
| 2007/0207570 A1 | 9/2007 | Choi |
| 2007/0272555 A1 | 11/2007 | Baird |
| 2007/0272666 A1 | 11/2007 | O'Brien |
| 2007/0272668 A1 | 11/2007 | Albelo |
| 2007/0275541 A1 | 11/2007 | Harris |
| 2007/0293019 A1 | 12/2007 | Jeng |
| 2008/0051713 A1 | 2/2008 | Kohlbrenner |
| 2008/0067155 A1 | 3/2008 | Gu |
| 2008/0067160 A1 | 3/2008 | Suutarinen |
| 2008/0299745 A1 | 12/2008 | Morikazu |
| 2009/0067455 A1 | 3/2009 | Murison |
| 2009/0194516 A1 | 8/2009 | Deshi |
| 2009/0268265 A1 | 10/2009 | Shah et al. |
| 2010/0111120 A1 | 5/2010 | Shah |
| 2010/0197116 A1 | 8/2010 | Shah |
| 2012/0196454 A1 | 8/2012 | Shah et al. |
| 2013/0003065 A1 | 1/2013 | Shah et al. |
| 2014/0092927 A1 | 4/2014 | Shah et al. |
| 2014/0185065 A1 | 7/2014 | Shah et al. |
| 2014/0312469 A1 | 10/2014 | Shah et al. |

FOREIGN PATENT DOCUMENTS

| | | | |
|---|---|---|---|
| WO | WO2007136183 A1 | 11/2007 | |
| WO | WO2008033135 A1 | 3/2008 | |
| WO | WO2008091898 A1 | 7/2008 | |
| WO | WO2009042347 A1 | 4/2009 | |
| WO | WO2009117451 A1 | 9/2009 | |
| WO | WO 2009117451 A1 * | 9/2009 | ............ B23K 26/06 |
| WO | WO2009120918 A2 | 10/2009 | |
| WO | WO2009145978 A1 | 12/2009 | |
| WO | WO 2011/123205 | 10/2011 | |

OTHER PUBLICATIONS

Wang, X.C., et al., "355 nm DPSS UV laser cutting of FR4 and BT/epoxy-based PCB substrates," Optics and Lasers in Engineering, vol. 46, pp. 404-409, Jan. 2008.

Yung, K.C., et al., "A study of the heat-affected zone in the UV YAG laser drilling of GFRP materials," Journal Mater. Process Technology, vol. 122, pp. 278-285, Mar. 2002.

Shah, et al., "12 µJ, 1.2 W Femtosecond Pulse Generation at 346 nm from a Frequency-tripled Yb Cubicon Fiber Amplifier," CLEO 2005 Postdeadline, CPDB1, in 3 pages, May 2005.

International Search Report and Written Opinion of Patentability for PCT Application No. PCT/US2006/002531, mailed Sep. 12, 2007.

International Preliminary Report on Patentability for PCT Application No. PCT/US2006/002531, mailed Oct. 11, 2007.

Stuart, et al., "Nanosecond-to-femtosecond laser-induced breakdown in dielectrics," Phys. Rev. B, vol. 55, No. 4, pp. 1749-1761, Jan. 15, 1996.

Borowiec, et al., "Wavelength dependence of the single pulse femtosecond laser ablation threshold of indium phosphide in the 400-2050 nm range," Applied Surface Science, vol. 243, pp. 129-137, 2005, available online Nov. 11, 2004.

Serafetinides, et al., "Ultra-short pulsed laser ablation of polymers," Applied Surface Science, vol. 180, pp. 42-56, 2001.

Herrmann, et al., "Micromachining with picosecond lasers: precise, cost efficient, industrially reliable," Lumera Laser: Laser Technik Journal, pp. 1-11.

Herrmann, et al., "Micromachining with Picosecond Laser Pulses," ILS Article, Feb. 9, 2004.

(56) References Cited

OTHER PUBLICATIONS

A. Ancona et al., "Femtosecond and picosecond laser drilling of metals at high repetition rates and average powers," Optics Letters, vol. 34, pp. 3304-3306, Nov. 2009.

A. Ancona et al., "High speed laser drilling of metals using a high repetition rate, high average power ultrafast fiber CPA system," Optics Express, vol. 16, pp. 8958-8968, Jun. 2008.

N. Bärsch et al., "Ablation and cutting of planar silicon devices using femtosecond laser pulses," Applied Physics A, vol. 77, pp. 237-242, May 2003.

J. Bovatsek et al., "Laser ablation threshold and etch rate comparison between the ultrafast Yb fiber-based FCPA laser and a Ti:sapphire laser for various materials," Fifth Int'l Symposium on Laser Precision Microfabrication, Proc. SPIE, vol. 5662, pp. 661-666, Oct. 2004.

D. Breitling et al., "Fundamental aspects in machining of metals with short and ultrashort laser pulses," Photon Processing in Microelectronics and Photonics III, Proc. SPIE, vol. 5339, pp. 49-63, Jul. 2004.

T.H.R. Crawford et al., "Femtosecond laser micromachining of grooves in silicon with 800 nm pulses," Applied Physics A, vol. 80, pp. 1717-1724, Aug. 2004.

Disco Laser Application Fully Automatic Laser Saw DFL 7000 Series product brochure, Jul. 2000.

H. Endert et al., "Novel ultrashort-pulse fiber lasers and their applications," Proc. SPIE, vol. 4426, pp. 483-488, Apr. 2003.

R. Fluck et al., "Passively Q-switched 1.34µm Nd:YVO$_4$ microchip laser with semiconductor saturable-absorber mirrors," Optics Letters, vol. 22, p. 991-993, Jul. 1997.

J. König et al., "Plasma evolution during metal ablation with ultrashort laser pulses," Optics Express, vol. 13, pp. 10597-10607, Dec. 2005.

J. Li et al., "Laser dicing and subsequent die strength enhancement technologies for ultra-thin wafer," Electronic Components and Technology Conference, 2007, pp. 761-766, May 2007.

A. Ostendorf et al., "Processing thin silicon with ultrashort-pulsed lasers: creating an alternative to conventional sawing techniques," Proceedings of ICALEO 2003, LMF Section A, pp. 20-28, Oct. 2003.

L. Shah et al., "12 µJ, 1.2 W femtosecond pulse generation at 346 nm from a frequency-tripled Yb cubicon fiber amplifier," CLEO 2005, paper CPDB1, pp. 1-3, May 2005.

A.E. Siegman et al., "Choice of clip levels for beam width measurements using knife-edge techniques," J. of Quantum Electronics, vol. 27, pp. 1098-1104, Apr. 1991.

A.E. Siegman, "Defining the effective radius of curvature for a nonideal optical beam," J. of Quantum Electronics, vol. 27, pp. 1146-1148, May 1991.

R.F. Toftness et al., "Laser technology for wafer dicing and microvia drilling for next generation wafers," Proc. SPIE, vol. 5713, pp. 54-66, May 2005.

H.K. Tönshoff et al., "Speed rate improvement for microcutting of thin silicon with femtosecond laser pulses," Third International Symposium on Laser Precision Microfabrication, Proc. SPIE, vol. 4830, pp. 531-536, Jun. 2003.

International Search Report and Written Opinion for International Application No. PCT/US2009/037443 filed Mar. 17, 2009, dated May 4, 2009, in 12 pages.

International Preliminary Report on Patentability for International Application No. PCT/US2009/037443 filed Mar. 17, 2009, dated Sep. 21, 2010, in 7 pages.

Restriction Requirement dated Apr. 8, 2011, in U.S. Appl. No. 12/641,256, in 9 pages.

Response to Restriction Requirement, in U.S. Appl. No. 12/641,256, filed May 5, 2011, in 6 pages.

Office Action dated Jun. 10, 2011, in U.S. Appl. No. 12/641,256, in 21 pages.

Amendment and Response to Office Action Dated Jun. 10, 2011, in U.S. Appl. No. 12/641,256, filed Nov. 8, 2011, in 10 pages.

Ameer-Beg, S., et al., "Femtosecond laser microstructuring of materials," Appl. Surface Sci., vol. 127-129, pp. 875-880, 1998.

Schaffer et al., "Laser-induced breakdown and damage in bulk transparent materials induced by tightly focused laser pulses," Meas. Sci. Technol., vol. 12, pp. 1784-1794, Oct. 2001.

Eaton et al., "Thermal heating effects in writing optical waveguides with 0.1-5 MHz repetition rate," Photon Processing in Microelectronics and Photonics IV, ed. Fieret et al., Proc. of SPIE, vol. 5713, pp. 35-42, May 2005.

Eaton et al., "Heat accumulation effects in femtosecond laser-written waveguides with variable repetition rate," Optics Express, vol. 13, pp. 4708-4716, Jun. 2005.

International Search Report and Written Opinion for International Application No. PCT/US2011/026501, mailed May 10, 2011, 14 pages.

Notice of Allowance dated Dec. 6, 2011, in U.S. Appl. No. 12/641,256, in 8 pages.

Issue Fee Transmittal, U.S. Appl. No. 12/641,256, filed Feb. 27, 2012, in 1 page.

After Allowance Amendment, U.S. Appl. No. 12/641,256, filed Feb. 27, 2012, in 7 pages.

Comments on Statement of Reasons for Allowance, U.S. Appl. No. 12/641,256, filed Feb. 27, 2012, in 2 pages.

Response to Rule 312 Communication dated Mar. 8, 2012, U.S. Appl. No. 12/641,256, in 2 pages.

Response to Rule 312 Communication dated Mar. 21, 2012, U.S. Appl. No. 12/641,256, in 2 pages.

Issue Notification received Mar. 28, 2012, U.S. Appl. No. 12/641,256, in 1 page.

International Preliminary Report on Patentability for International Application No. PCT/US2011/026501 filed Feb. 28, 2011, dated Oct. 2, 2012, in 6 pages.

Office Action dated Apr. 10, 2013, in U.S. Appl. No. 12/421,372, in 27 pages.

Pasmanik, "Pico Versus Femto in Micromachining", Laser Focus World, Jun. 2001.

Pronko et al., "Thermophysical Effects in Laser Processing of Materials with Picosecond and Femtosecond Pulses", Journal of Applied Physics, vol. 78, No. 10, Nov. 15, 1995.

Restriction Requirement dated Feb. 6, 2013 in U.S. Appl. No. 12/421,372, in 6 pages.

Response to Restriction Requirement in U.S. Appl. No. 12/421,372, filed Feb. 20, 2013, in 6 pages.

Amendment and Response to Office Action Dated Apr. 10, 2013 in U.S. Appl. No. 12/421,372, filed Aug. 6, 2013, in 9 pages.

Final Office Action dated Sep. 12, 2013 in U.S. Appl. No. 12/421,372, in 20 pages.

Extended European Search Report for European Application No. 09721791.3, dated Jul. 7, 2014, in 8 pages.

Amendment and Response to Final Final Office Action Dated Sep. 12, 2013 in U.S. Appl. No. 12/421,372, filed Feb. 4, 2014, in 11 pages.

Notice of Allowance dated Mar. 14, 2014 in U.S. Appl. No. 12/421,372, filed Feb. 4, 2014, in 13 pages.

Issue Notification received Jul. 2, 2014, U.S. Appl. No. 13/421,372, in 1 page.

Restriction Requirement dated Aug. 6, 2015 in U.S. Appl. No. 14/319,845, in 8 pages.

* cited by examiner

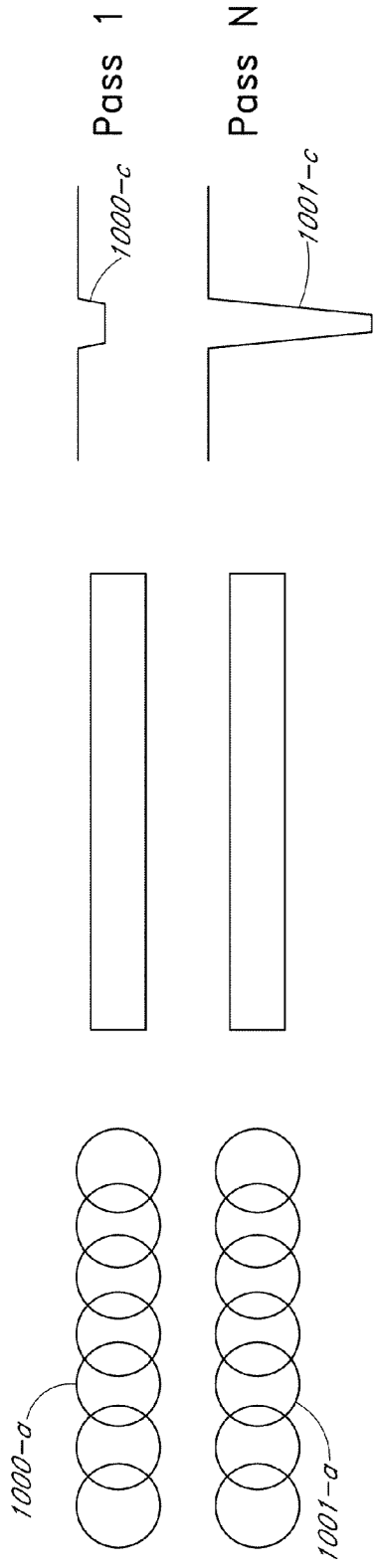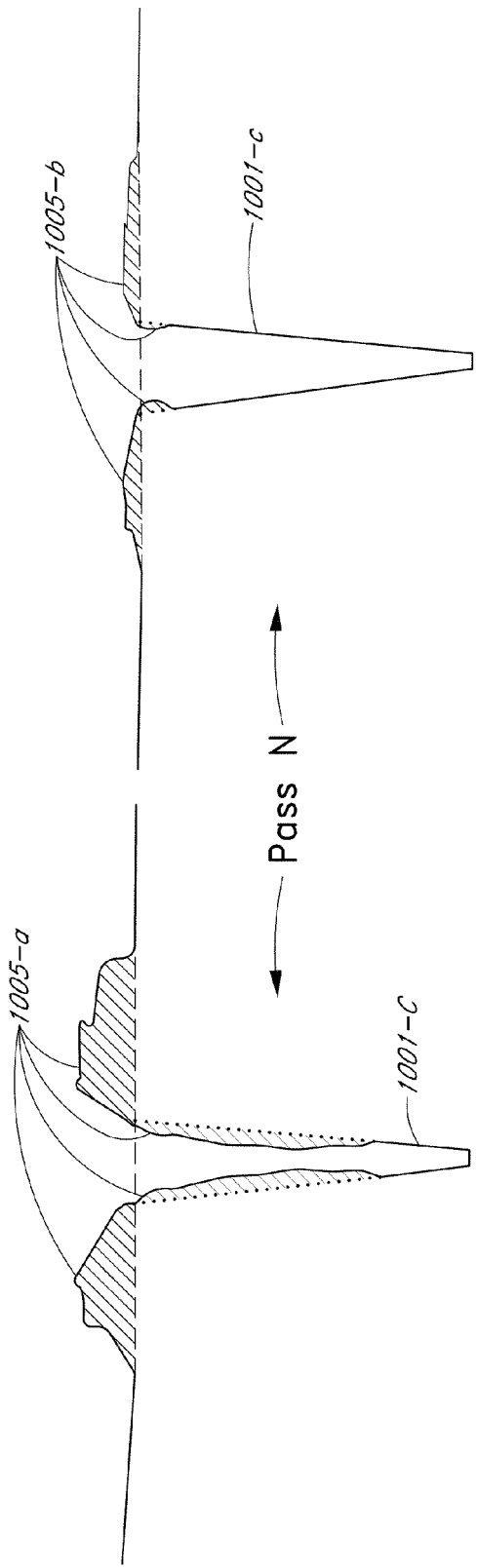

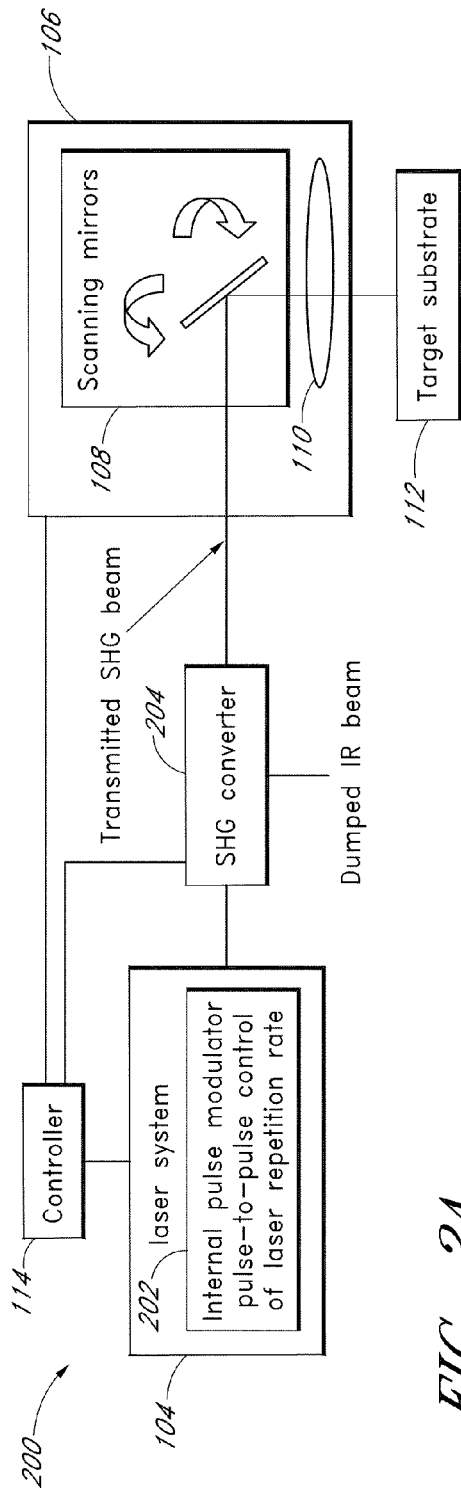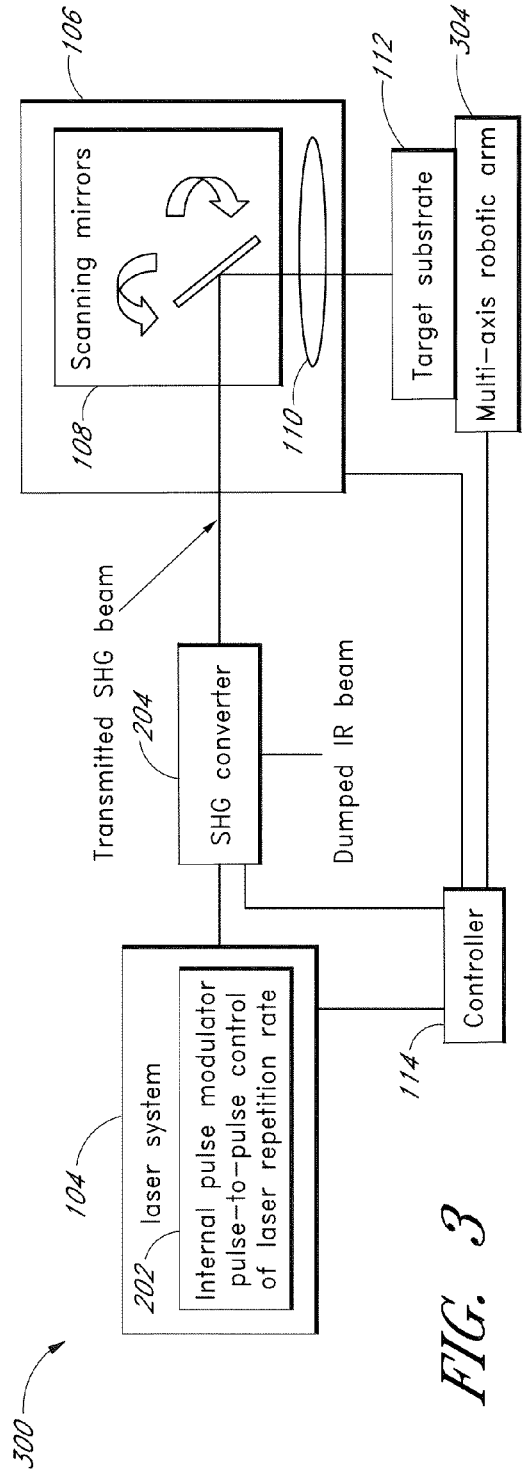
FIG. 2A
FIG. 3

LASER-BASED MATERIAL PROCESSING APPARATUS AND METHODS

CROSS REFERENCE TO RELATED APPLICATIONS

This application claims the benefit under 35 U.S.C. §120 and 35 U.S.C. §365(c) as a continuation of International Application No. PCT/US2011/026501 designating the United States, with an international filing date of Feb. 28, 2011, entitled "LASER-BASED MATERIAL PROCESSING APPARATUS AND METHODS," which claims the benefit under 35 U.S.C. §119(e) of U.S. Provisional Patent Application No. 61/319,220, filed Mar. 30, 2010, entitled "LASER-BASED MATERIAL PROCESSING APPARATUS AND METHODS," the entire contents of each of the foregoing applications is hereby incorporated by reference herein and made a part of this specification.

This application is related to U.S. patent application Ser. No. 12/641,256 filed Dec. 17, 2009 (hereinafter, the "'256 Application"), which published as U.S. Patent Application Publication No. 2010/0197116 on Aug. 5, 2010, which claims priority under 35 U.S.C. 120 and 35 U.S.C. 365(c) to co-pending International Application Number PCT/US2009/037443, with an international filing date of Mar. 17, 2009, which published as International Publication No. WO 2009/117451 on Sep. 24, 2009, entitled "LASER-BASED MATERIAL PROCESSING METHODS AND SYSTEMS," which claims the benefit under 35 U.S.C. §119(e) to U.S. Provisional Patent Application No. 61/038,725, filed Mar. 21, 2008, entitled "LASER-BASED MATERIAL PROCESSING METHODS AND SYSTEMS," to U.S. Provisional Patent Application No. 61/110,913, filed Nov. 3, 2008, entitled "LASER-BASED MATERIAL PROCESSING METHODS AND SYSTEMS," and to U.S. Provisional Patent Application No. 61/152,625, filed Feb. 13, 2009, entitled "LASER-BASED MATERIAL PROCESSING METHODS AND SYSTEMS." The disclosures of each of the aforementioned non-provisional, international, provisional applications and patent publications are hereby incorporated by reference herein in their entirety and made a part of this specification.

This application is also related to International Patent Application Number PCT/US08/51713, filed Jan. 22, 2008, entitled "ULTRASHORT LASER MICRO-TEXTURE PRINTING," which published as International Publication No. WO 2008/091898 on Jul. 31, 2008, which claims the benefit of U.S. Provisional Patent Application No. 60/886,285, filed Jan. 23, 2007, entitled "ULTRASHORT LASER MICRO-TEXTURE PRINTING." This application hereby incorporates by reference the entire disclosure of U.S. Patent Application Publication No. 2009/0268265, published Oct. 29, 2009, entitled "ULTRASHORT LASER MICRO-TEXTURE PRINTING." This application is also related to U.S. patent application Ser. No. 10/813,269, filed Mar. 31, 2004, entitled "FEMTOSECOND LASER PROCESSING SYSTEM WITH PROCESS PARAMETERS, CONTROLS AND FEEDBACK," now U.S. Pat. No. 7,486,705. Each of the above-identified patent applications, publications, and patent is owned by the assignee of the present application. The disclosures of each of the above-identified applications, publications, and patent are hereby incorporated by reference herein in their entirety.

BACKGROUND

1. Field

This disclosure relates generally to pulsed lasers and machining materials using high repetition rate pulsed lasers.

2. Description of the Related Art

Composite materials are engineered materials having, for example, at least two different materials with significantly different physical and/or chemical properties. The physical and/or chemical properties of the different materials may remain substantially separate, distinct, or distinguishable at a macroscopic or microscopic scale within the composite material. By way of example, the material may be composed of reinforcement (e.g., fibers, particles, flakes, and/or fillers) embedded in a matrix (e.g., polymers, metals, and/or ceramics). The matrix holds the reinforcement to form the desired shape while the reinforcement improves the overall mechanical properties of the matrix. Composite materials are used in variety applications, due to their combination of different material properties, such as strength and light weight, flexibility and rigidity, chemical and fire resistance among others.

Portions of a printed circuit board (PCB) may be fabricated with a composite material so as to provide mechanical strength, satisfy weight limitations, flexibility, and/or rigidness as well as thermal and chemical resistance. PCBs used in high speed electronics may include low-k dielectrics, expanding the functionality of the composite material. Low-k material can include material that has a dielectric constant that is less than the dielectric constant of silicon dioxide. For example, low-k material can include dielectric materials such as doped silicon dioxide, polymeric dielectrics, etc. The desirability of "green technology," and the associated use of lead-free and hazard-free material, is also a consideration. Therefore, challenges are apparent in fabrication of various PCB designs.

A glass fiber matrix, a carbon fiber matrix, or metallic structure may be used for reinforcing the mechanical structure of a composite material, where the structure is hosted in polymers or organic resin to mechanically stabilize the form. For instance, Garolite, which combines glass fiber mesh filled with epoxy resin, is a commonly used substrate for electronics PCB.

Composite materials (e.g., that can be used in PCB substrates) can include, for example, National Electrical Manufacturers Association (NEMA) grades: FR-1, FR-2, FR-3, FR-4, FR-5, FR-6, G-10, and composite epoxy materials including CEM-1, CEM-2, CEM-3, CEM-4, CEM-5, etc. Composite materials can include woven fiberglass cloth with an epoxy resin binder, resin bonded paper, cellulose paper having a woven glass fabric surface, woven glass and epoxy, cotton paper and epoxy, matte glass and polyester, woven glass and polyester, and glass reinforced epoxy laminates. In some types of PCBs, conducting layers of the PCB are made of a thin, electrically conductive foil or layer (e.g., copper) and insulating layers of dielectric materials are laminated with epoxy resin pre-impregnated (prepreg) composite fibers. In some cases, dielectric materials can include polytetrafluoroethylene (PTFE or Teflon®), polymide, FR-1, FR-4, CEM-1, and/or CEM-3. In some cases, prepreg materials can include FR-2, FR-3, FR-4, FR-5, FR-6, G-10, CEM-1, CEM-2, CEM-3, CEM-4, and/or CEM-5. For example, certain PCBs comprise an insulating FR-4 layer on which a thin layer of copper foil is laminated (on one or both sides of the FR-4 layer). Thickness of the electrically conductive layer (e.g., copper foil) can be in a range from about 10 µm to about 100 µm (for example, about 18 µm or about 35 µm). Other conductive layer thicknesses can be used. Thickness of the PCB substrate can be in range from about 500 µm to about 1500 µm (e.g., about 800 µm or about 1000 µm). Other substrate thicknesses can be used (e.g., about 30 µm to about 250 µm).

In some cases, a PCB can comprise between about one and twenty conductive layers (e.g., copper) laminated with insulating (e.g., dielectric) layers. In some cases, the PCB can comprise a multi-layer PCB in which a plurality of PCB layers are bonded together. In some cases, PCBs can be coated with one or more substances (e.g., wax, silicone rubber, polyurethane, acrylic, or epoxy) to inhibit corrosion and electrical shorting.

Physically separating, for example dicing, of a PCB comprising such composite material is not without challenges. Conventional mechanical dicing has been the most common method, but with significant drawbacks. When the material thickness becomes less than approximately 1000 µm, cutting with a mechanical saw may cause various problems such as chipping, fraying, tearing, and delamination. A high speed PCB may have a substrate with a thickness of about 125 µm, and a substrate thickness may be in the range from about 30 µm to about 250 µm. Moreover, special tooling may be required for mechanical dicing of thin PCBs, especially if an irregular shape is needed. Chemical processing bears high environmental cost and is considered, at the same time, non-green in many industries.

SUMMARY

Because of at least the foregoing challenges and limitations, Applicants recognized a need exists not only to efficiently machine materials but also to avoid thermally or mechanically weakening the material, such adverse effects resulting from undesirable heat effects. Solutions which would eliminate expensive processing steps are highly desirable for certain implementations. Therefore, various embodiments of the systems and methods disclosed herein may be used for laser-based modification of composite target material of a workpiece while simultaneously achieving improvements in processing throughput and/or quality. Laser processing using embodiments of the disclosed system and methods may be an attractive alternative to conventional mechanical dicing methods, and may be utilized in combination with mechanical dicing (or other processing) for some applications.

In one general aspect, a method of laser processing a workpiece having a composite material is provided. The method may comprise focusing and directing laser pulses to a region of the composite material of the workpiece at a pulse width sufficiently short so that heat accumulation within one or more materials is controlled in such a way that provides for rapid material removal material from the region and a heat-affected zone (HAZ) is reduced or minimized and/or a quantity of charring material within or proximate to the region is reduced relative to a quantity obtainable at a longer pulse. For example, the pulse width may be in a range from about 10 fs to about 500 ps in some embodiments of the method.

In another general aspect, a method of laser processing a composite workpiece having a composite material may comprise focusing and directing laser pulses to a region of the composite material.

In another general aspect, use of ultrashort (e.g., fs) pulses for processing composite materials, for example high speed PCBs, reduces at least some tradeoffs between kerf width, kerf quality, and spatial overlap between pulses. Kerf size control may be increasingly important as a PCB structure gets smaller; both the kerf size and HAZ size may require reduction. As illustrated in examples herein, operation with ultrashort (e.g., fs) pulses in a nonlinear absorption regime produces high-quality cuts.

At least one embodiment includes a method of scribing, dicing, cutting, or processing to remove material from a region of a workpiece having a composite material, the composite material including at least two non-metallic materials having different optical properties. The method includes directing laser pulses toward the composite material workpiece, the laser pulses having at least one pulse width in the range from tens of femtoseconds to about 500 picoseconds and a pulse repetition rate in the range from a few tens of kHz to about 10 MHz. The method includes focusing the laser pulses into laser spots having spot sizes ($1/e^2$) in a range from a few microns to about 100 µm, wherein at least one focused laser pulse provides a power density above a threshold for non-linear absorption in the composite material at a wavelength of the at least one laser pulse. The method includes positioning the laser spots relative to the workpiece in such a way that a spatial overlap between adjacent focused spots ($1/e^2$) for removal of material is sufficient for scribing, dicing, cutting or processing the workpiece at the wavelength, pulse width, repetition rate, and power density. The method controls heat accumulation within one or more materials of the workpiece region, while limiting accumulation of unwanted material about the region.

In various embodiments the composite material of the workpiece includes a material structure and its host material.

In various embodiments the workpiece includes non-composite material disposed in contact with the composite material, and the method includes removing at least a portion of the non-composite material.

In various embodiments an energy density of a pulse impinging the non-composite material is above a single-shot ablation threshold corresponding to linear absorption at the wavelength.

In various embodiments the non-composite material includes metal.

In various embodiments the non-composite material includes a polymer.

In various embodiments the workpiece includes at least two layers of non-composite material, and the composite material is disposed between at least two layers of non-composite material, and the method includes removing at least a portion of non-composite material from at least one layer of the non-composite material.

In various embodiments a thickness of the workpiece is less than about 1000 µm.

In various embodiments a fluence of at least one pulse is in a range from about 0.01 J/cm² to about 10 J/cm², and the positioning includes moving the composite material relative to the focused spots at a speed in the range from about 1 mm/sec to about 0.5 m/sec.

In various embodiments at least one laser pulse has a pulse energy in a range from about 0.1 µJ to about 500 µJ, wherein the pulse energy is pre-determined, at least in part, by the spot size and the repetition rate.

In various embodiments the laser pulses are output by an ultrashort pulsed laser system.

In various embodiments the power density is at least about $10^{12}$ W/cm².

In various embodiments the power density is in the range from about $10^{12}$ W/cm² to about $10^{14}$ W/cm².

In various embodiments a pulse width is in the range from tens of femtoseconds to about 1 ps.

In various embodiments the pulses include a series of pulses and at least two corresponding laser spots having spatial overlap of at least about 50%, wherein the series of pulses provide depthwise removal of about 30-300 µm of at least a portion of the composite material of the workpiece, wherein the spot sizes are in the range from about 10-100 µm.

In various embodiments the material structure and its host material enhances a mechanical property of the workpiece. For example, the material structure (e.g., glass fibers) may enhance or reinforce rigidity of the composite material.

In various embodiments the material structure and its host material includes a woven glass.

In various embodiments, the material structure and its host material includes matte glass.

In various embodiments, the material structure and its host material includes cotton papers.

In various embodiments the host material includes epoxy.

In various embodiments the host material includes polymer.

The method of Claim 1, wherein the composite material of the workpiece is selected from the group consisting of FR-4, FR-5, FR-6, G-10, CEM-1, CEM-2, CEM-3, CEM-4, and CEM-5.

The method of Claim 1, wherein the composite material of the workpiece is selected from the group consisting of (a) woven glass and epoxy, (b) matte glass and polyester, (c) cotton paper and epoxy, and (d) woven glass and polyester.

In various embodiments the workpiece includes a printed circuit board.

In various embodiments a patterned metal layer is deposited on the workpiece.

In various embodiments the composite material workpiece includes a thin layer of polymer for protecting the composite material workpiece.

In various embodiments the workpiece includes a layer of low-k material.

In various embodiments the energy density of a laser pulse impinging the composite material is less than a single-shot ablation threshold corresponding to linear absorption at the laser wavelength, and the energy density reduces or avoids heat accumulation in the composite material. In various other embodiments the energy density of a laser pulse impinging the composite material is greater than a single-shot ablation threshold corresponding to linear absorption at the laser wavelength, and the energy density reduces or avoids heat accumulation in the composite material.

In various embodiments the spatial overlap is at least about 50%.

In various embodiments the spatial overlap is at least about 90%.

The method of claim 1, wherein the spatial overlap is at least about 95%.

The method of claim 1, wherein the spatial overlap is at least about 98%.

The method of claim 1, wherein the spatial overlap is at least about 99%.

The method of claim 1, wherein the spatial overlap is in a range from about 90% to about 99%.

The method of claim 1, wherein the spatial overlap is in a range from about 95% to about 99%.

In various embodiments the repetition rate is in the range from about 100 kHz to 10 MHz.

In various embodiments the scribing, dicing, cutting or processing the workpiece includes depthwise removing of at least about 25 µm to about 150 µm of composite material with the laser pulses in about 1-10 passes of laser processing pulses relative to the composite material.

In various embodiments the wavelength is longer than an absorption edge corresponding with linear absorption in the composite material, and a fluence for the scribing, dicing, cutting or processing the composite material is substantially less than a fluence of a pulse having a pulse width of at least about 1 ns at the wavelength.

In various embodiments the fluence is at least about four times less than the fluence of the ns pulse.

In various embodiments, the wavelength is longer than an absorption edge corresponding with linear absorption in the composite material, and a fluence for the scribing, dicing, cutting or processing the composite material is above an ablation threshold for linear absorption in the composite material At least one embodiment includes a method of laser processing a workpiece having at least one target composite material including at least two different materials with different properties and functionalities. The method includes: repeatedly irradiating at least one target composite material of the workpiece with focused laser pulses at a pulse repetition rate, and during relative motion of the laser pulses relative to the composite material, the repetition rate in a range of at least about a few tens of kHz to about 10 MHz, the relative motion comprising a speed in a range from about 1 mm/sec to about 20 m/sec. At least some of the focused laser pulses have a spatial overlap factor of at least about 50% with at least one other pulse, a pulse width less than about 1 ns, a pulse energy in a range of about 100 nJ to about 1000 µJ, a focused $1/e^2$ spot size in a range of about 10 µm to about 100 µm, and a fluence in a range of about 0.01 J/cm$^2$ to about 1000 J/cm$^2$ at the target composite material.

At least one embodiment includes a method of processing a workpiece having a composite material that includes at least two different materials with different properties and functionalities, the different materials comprising at least one of a dielectric material and a metal material. The method includes: irradiating the composite material with a series of laser pulses, at least two pulses of the series having different characteristics that are applied to different materials of the workpiece, the series of laser pulses having at least one pulse providing a power density above a threshold for non-linear absorption at a wavelength of the at least one laser pulse. The method includes controlling heat-affected zone (HAZ) such that at least one HAZ generated during removal of at least one of the dielectric material and the metal material is increased depthwise relative to at least one HAZ generated during removal of a portion of the composite material of the workpiece.

At least one embodiment includes a laser-based system for scribing, dicing, cutting, or processing a workpiece having composite material that includes at least two different materials with different properties and functionalities. The laser-based system includes: a source of optical pulses, at least one pulse having a wavelength longer than a linear absorption edge of the composite material workpiece; an optical amplification system configured to amplify a pulse from the source to a pulse energy of at least about 1 µJ and to generate output optical pulses having at least one pulse width in a range from about 10 fs to a few hundred picoseconds; a modulation system, having at least one optical modulator, configured to adjust a repetition rate of the output optical pulses to be within a range from a few kHz to about 10 MHz; a beam delivery system configured to focus and deliver pulsed laser beams to the workpiece, wherein a pulsed beam is focused into a spot size ($1/e^2$) in a range from about 10 µm to about 100 µm; the focused beam providing a peak power density above a threshold for non-linear absorption at a wavelength of the laser pulse; a positioning system configured to position the beams relative to the workpiece at a rate in a range from about 1 mm/sec to about 20 m/sec; and a controller configured to be coupled to at least the positioning system, the controller configured to control a spatial overlap between adjacent focused beams during processing of the workpiece at the repetition rate.

In various embodiments the optical amplification system includes a fiber-based chirped pulse amplification system.

In various embodiments the optical amplification system includes at least one large-mode fiber amplifier.

In various embodiments the optical amplification system is operable to produce an output pulse with pulse energy up to about 20 µJ and to produce an average power up to about 10 W.

In various embodiments the source of optical pulses includes a fiber oscillator and one or more amplifiers of the amplification system are fiber amplifiers, and the oscillator and amplification system are configured as an all-fiber design.

In various embodiments the source of optical pulses includes at least one of a fiber laser, a fiber amplifier, a passive Q-switched microchip laser, and a mode locked oscillator.

In various embodiments the laser-based system is operable to provide a fluence of at least about 0.25 J/cm$^2$ within a focused spot size of a delivered pulsed beam.

In various embodiments a fluence is at least about 0.01 J/cm$^2$.

In various embodiments the pulse energy is in a range of about 1 µJ to about 1000 µJ.

In various embodiments the repetition rate is in a range from about 10 kHz to about 5 MHz.

At least one embodiment includes a laser-based system for scribing, dicing, cutting, or processing of a workpiece having a composite material that includes at least two different materials with different properties and functionalities. The system includes: a source of optical pulses, at least one pulse having a wavelength longer than a linear absorption edge of the composite material of the workpiece; an optical amplification system configured to amplify a pulse from the source and to generate output pulses having at least one pulse width in a range from tens of femtoseconds to about 500 picoseconds; a modulation system, including at least one optical modulator, configured to provide a repetition rate of the output optical pulses in a range from at least about 1 MHz to less than about 100 MHz; a beam delivery system configured to focus and deliver pulsed laser beams to the workpiece, wherein a pulsed beam is focused into a spot size (1/e$^2$) of at least about 5 microns, the focused beam providing a peak power density above a threshold for non-linear absorption at in the composite material at a wavelength of the laser pulse; and a positioning system configured to produce a spot overlap at least about 50% on or within the one or more materials of the workpiece, at the repetition rate and the spot size.

In various embodiments at least some of the output pulses have a pulse energy of at least about 100 nJ.

In various embodiments the spot overlap exceeds about 50%, exceeds about 90%, exceeds about 95%, or exceeds about 99%.

In various embodiments the source and amplification system are configured as an all-fiber design.

In various embodiments the amplification system includes a fiber-based chirped pulse amplifier comprising a pulse stretcher and compressor configured for chirped pulse amplification.

In various embodiments the amplification system includes at least one large-mode fiber amplifier.

In various embodiments the positioning system includes a beam deflector.

In various embodiments the optical amplification system is configured to amplify a pulse from the source to an energy of at least about 1 µJ and to generate ultrashort output pulses having at least one pulse width in a range of about 10 fs to about 500 ps. The optical amplification system includes at least one large-mode fiber amplifier, the at least one large-mode fiber amplifier comprising at least one of a doped large-core leakage channel fiber amplifier, a photonic crystal fiber, and a photonic bandgap fiber, wherein at least one fiber amplifier is configured such that the laser-based system emits nearly diffraction limited pulsed output beams; and wherein the laser-based system is configured to be adjustable to generate the pulsed output beams at a repetition rate in a range from about a few kHz to about 10 MHz.

In various embodiments an overlap is based, at least in part, on at least one of a material and a structure of the workpiece.

In various embodiments the workpiece comprises both composite material and non-composite material, and the method includes selectively adjusting spatial overlap for removal of material. The non-composite material may comprise metal and/or dielectric. The spatial overlap selected for the composite material may, but need not be, different from the spatial overlap selected for the non-composite material. The spatial overlap selected for the non-composite material (e.g., metal) may, but need not be, greater than the spatial overlap selected for the composite material.

An embodiment of a method of scribing, dicing, cutting, or processing to remove material from a region of a multi-material workpiece is disclosed. The method comprises directing laser pulses toward at least one material of a multi-material workpiece. The laser pulses have a pulse width in a range from tens of femtoseconds to about 500 picoseconds and a pulse repetition rate of a few hundred kHz to about 10 MHz. The workpiece can comprise both a metal material and a composite material. The method further comprises focusing the laser pulses into laser spots having spot sizes in a range from a few microns to about 50 µm (1/e$^2$). The method further comprises positioning the laser spots relative to the at least one material at a scan speed such that an overlap between adjacent focused spots for removal of material from at least a portion of the metal material is substantially greater than an overlap between adjacent focused spots for removal of material from at least a portion of the composite material. The overlap between adjacent focused spots for removal of material from the at least a portion of the composite material can be greater than about 50%. The method controls heat accumulation within one or more materials of the workpiece, while limiting accumulation of redeposited material about the region. The laser pulses used for scribing, dicing, cutting, or processing the composite material can have a power density above a threshold for nonlinear absorption in the composite material. The laser pulses used for scribing, dicing, cutting, or processing the metal material can have a power density below a threshold for nonlinear absorption in the metal material.

An embodiment of a method of scribing, dicing, cutting, or processing to remove material from a region of a multi-material workpiece is disclosed. The method comprises directing laser pulses toward at least one material of a multi-material workpiece. The laser pulses have a pulse width in a range from tens of femtoseconds to about 500 picoseconds and a pulse repetition rate of a few tens of kHz to about 10 MHz. The workpiece comprises both a metal material and a composite material. The method further comprises focusing the laser pulses into laser spots having spot sizes in a range from a few microns to about 50 µm (1/e2) and selectively adjusting spatial overlap of the laser spots for removal of at least a portion of the at least one material. The method further comprises positioning the laser spots relative to the at least one material at a speed in a range from about 1 mm/s to about 20 m/s. The method advantageously controls heat accumulation within one or more materials of the workpiece, while limiting accumulation of redeposited material about the region. The laser pulses used for scribing, dicing, cutting, or processing said composite material can have a power density above a threshold for nonlinear absorption in the composite material. The spatial overlap between adjacent focused spots for removal of at least a portion of the composite material can be greater than about 50%.

In some embodiments of the method, the spatial overlap between adjacent focused spots for removal of at least a portion of the metal material is substantially greater than the spatial overlap between adjacent focused spots for removal of at least a portion of the composite material.

In some embodiments of the method, the laser pulses used for scribing, dicing, cutting, or processing the metal material have a power density below a threshold for nonlinear absorption in the metal material.

BRIEF DESCRIPTION OF THE DRAWINGS

FIGS. 1A-1C schematically illustrate top and cross-sectional views representing an embodiment of a multiple pass laser-based method for material removal.

FIGS. 1D-1E schematically illustrate cross-sectional views representing a relation between machining depth and formation of unwanted re-deposited material after N passes. FIG. 1E is a schematic representation of a result obtainable with at least one embodiment of a pulsed laser system.

FIG. 1G-1 illustrates a wafer having several die, and FIG. 1G-2 illustrates an expanded view of a portion of the wafer of FIG. 1G-1, and FIG. 1G-3 illustrates a cross sectional side-view of a portion of the wafer.

FIGS. 2A-2B schematically illustrate embodiments of a system for processing a workpiece with laser pulse trains.

FIG. 3 schematically illustrates another embodiment of a system for processing a workpiece with laser pulse trains FIG. 4A schematically illustrates yet another embodiment of a system for processing a workpiece with laser pulse trains.

FIG. 7A is a top view of the cutting line, and FIG. 7B is an edge view of the cutting line in a partially broken away portion of the composite material.

FIG. 8A is a top view and FIG. 8B is an edge view of a portion of the workpiece that has been processed with the ns laser pulses. FIGS. 8A and 8B illustrate extended heat affected zones (HAZ) and presence of molten recast material.

Figure 1F:
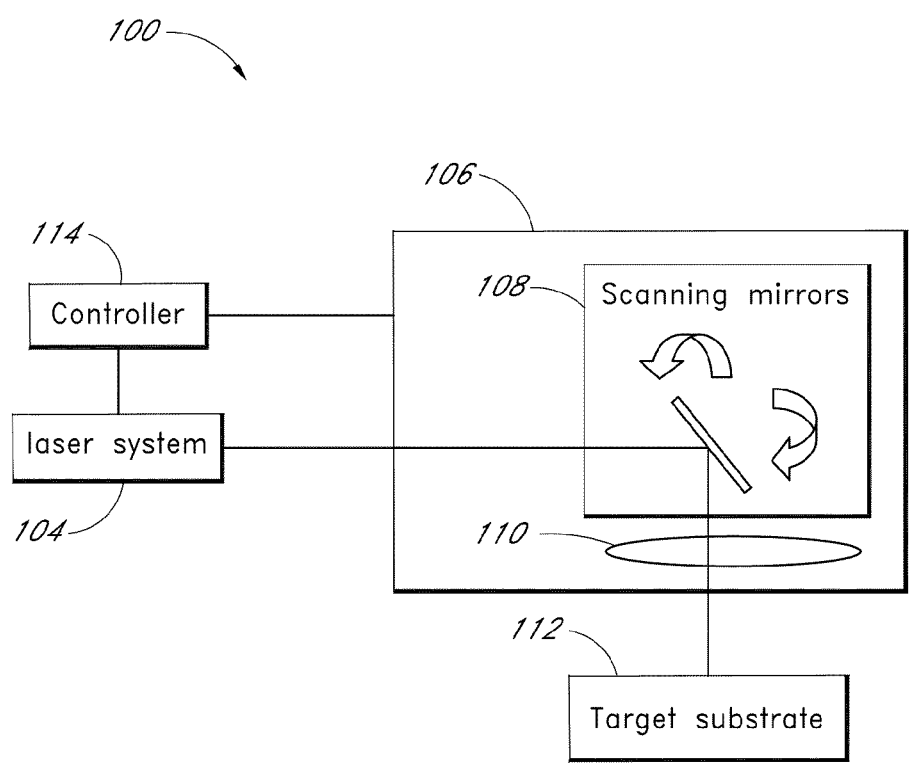
FIG. 1F schematically illustrates an embodiment of a laser system suitable for processing a workpiece with laser pulses.

These and other features will now be described with reference to the drawings summarized above. The drawings and the associated descriptions are provided to illustrate embodiments and example experimental results and not to limit the scope of the disclosure.

DETAILED DESCRIPTION OF PREFERRED EMBODIMENTS

Overview of Laser Processing Methods

Continuous wave (CW) CO2 lasers have been used for the dicing of glass fiber reinforced PCB due to its capability to cut the glass material. Charring of epoxy resin and residual debris have been issues in obtaining high quality cuts without further processing requirements. Pulsed CO2 lasers have been introduced to address this issue, but tend to limit the quality and cut speed. A pulsed solid-state UV laser was investigated for via drilling by K. C. Yung et al., J. Mater. Process. Technology, vol. 122, p. 278 (2002). Regarding pulse energy and pulse repetition rate, it was found by these authors that: for a given repetition rate, the equivalent width of the heat affected zone (HAZ) increases with an increase in the average laser power (e.g.: Yung et al., p 284). Use of pulsed UV wavelength was further demonstrated by X. C. Wang et al., Optics and Lasers in Engineering, vol. 46, p. 404 (2008), which suggested that not only a low energy pulse can be used, but processing with a low spot overlap may achieve good cut quality. It has been believed in the art of laser processing that relatively small spot overlap (e.g., substantially zero in some cases) may be useful to reduce the heat effect. We estimate the spot overlap ratio for the optimized processing by X. C. Wang et al. was less than about 50%, based on the parameters as described by Wang (e.g.: Wang, page 406).

Further, M. Henry et al., Proceeding of ICALEO, p. 412 (2005), suggests that multi-pass cutting, high speed repeated passes of the laser across the desired kerf (e.g., the width of the desired cut), may offer the potential to minimize thermal input to the substrate by spatially separating each pulse on the surface (see, e.g., Henry, page 414). This teaching may tend to lead one toward no spot overlap (e.g., spatially separating each pulse) being useful for avoiding lateral heat expansion and for limiting the undesirable kerf size. Henry et al. disclosed results obtained with q-switched lasers at 1064 nm and 532 nm wavelengths, with PCB substrates having a copper-polyimide-copper composition. Tradeoffs between higher-speed multi-pass cutting (high-overlap) and lower-speed single-pass cutting were analyzed. High repetition rates, e.g., about 20 kHz, were regarded as useful, and the effects on cut quality were examined as a function of cut velocity. For example, FIG. 5 on page 415 by M. Henry et al., shows the decreasing kerf size as the spot overlap decreases toward no overlap (e.g., about 0%). Tradeoffs between at least kerf width, spatial overlap, and processing speed are evident.

Moreover, in Henry et al., a high speed scanner was recommended for directing the laser beam onto a workpiece. Considering the potential handling a large dimension PCB boards in manufacturing, however, a combination of a scanner with a translation stage might be desirable due to the limited area a conventional scanner can cover. Further, a processing method using a nanosecond laser pulse is limited by the heat effect if the pulse energy is increased.

The performance of IR/UV pulsed laser systems for PCB cutting, particularly systems operating with pulse widths in the range of ns or higher, are limited by heat effects. Such effects include, but are not limited to: (a) extended heat affected zone (HAZ), which weakens and deforms the structure, (b) heat generated by absorption of laser beam burns and chars the target, especially polymers, if present, in the composition material, (c) recast and debris, and (d) since different compositions have different thermal properties, they may be cut differently in such a process. UV lasers are used in commercially available systems for creating heat in the workpiece based on linear absorption. UV laser wavelengths may include frequency tripled (e.g., 355 nm), frequency quadrupled (e.g., 248 nm) wavelengths, or even shorter wavelengths. However, the high photon energy of a UV pulse may weaken the material.

Although considered for via drilling, use of near infrared lasers, in the wavelength range from about 1-1.5 μm, which corresponds with maximum substrate transmission for many substrates, has not been widely investigated for PCB cutting. The paper of M. Henry et al., Proceeding of ICALEO, p. 412 (2005), showed use of nanosecond pulses with a relatively low peak intensity and relying mainly on linear absorption in the workpiece. A comparison of infrared (IR) nanosecond pulse with a nanosecond pulse of green wavelength was presented in the paper, where the green wavelength pulse provided superior cut quality (compared to the IR pulse) due to low absorption of IR energy by a copper layer.

Accordingly, Applicants have recognized that the teachings of the aforementioned references suggest some general guidelines for high quality via drilling or cutting of a PCB: i) use of a wavelength corresponding to highly linear absorption in the workpiece, in particular a UV wavelength, ii) use of a reduced spot overlap ratio, and iii) processing such that HAZ are reduced or avoided.

As will be discussed, Applicants have found that using processing parameters that differ from some or all of these general guidelines produce surprising results. For example, using laser beam parameters that cause nonlinear absorption of the laser beam in the workpiece can provide surprisingly effective processing of composite materials in the workpiece in some cases. Further, in some cases, using a relative large spot overlap ratio (e.g., greater than about 90%) can provide surprisingly effective processing of composite materials. Examples of the surprising results found by Applicants will be described below.

In the present application, composite material generally refers to a material comprising at least two substantially non-metallic materials (e.g., dielectric materials) having different optical properties. The composite material can also include metallic materials. Composite materials can comprise two or more constituent materials with significantly different physical or chemical properties that remain substantially separate, distinct. or distinguishable on a macroscopic (or microscopic) level in the finished structure. Constituent materials can include a matrix (or binder) and a reinforcement. Many composite materials include at least one portion of matrix and at least one portion of reinforcement. Generally, the matrix surrounds and supports the reinforcement by maintaining the relative positions of matrix and reinforcement, and the reinforcement imparts its mechanical and physical properties to enhance the matrix properties. The matrix and reinforcement can be selected to provide a composite material with desired electrical, mechanical, and/or chemical properties that may be relatively unavailable from individual constituent materials. The matrix can include polymers (or resins) such as, e.g., polyester, vinyl ester, epoxy, phenolic resin, polyimide, polyamide, polypropylene, and/or PEEK. The reinforcement can include fibers (e.g., woven glass), particulates, and/or ground minerals. Composite materials can comprise layers or laminates of reinforcement in the matrix.

Some types of composite materials comprise a material structure and a host material. In some cases, the material structure and its host material are selected to enhance a mechanical and/or electrical property of the composite material. In some composite materials, the material structure and its host material comprise, for example, woven glass, matte glass, cotton paper, etc. In some composite materials, the host material comprises, for example, epoxy and/or polymer. The composite material can comprise a printed circuit board material such as, e.g., FR-4 (e.g., woven glass and epoxy), FR-5 (e.g., woven glass and epoxy), FR-6 (e.g., matte glass and polyester), G-10 (e.g., woven glass and epoxy), CEM-1 (e.g., cotton paper and epoxy), CEM-2 (e.g., cotton paper and epoxy), CEM-3 (e.g., woven glass and epoxy), CEM-4 (e.g., woven glass and epoxy), and/or CEM-5 (e.g., woven glass and polyester). Composite materials can include other grades of NEMA materials.

In the present application, target material generally refers to material in or on at least one region of a workpiece that is to be modified by one or more laser pulses. The target material may comprise multiple materials having different physical properties. The target material may comprise a composite material. In some implementations, the target material is referred to as a target substrate.

In the present application, repetition rate, unless otherwise stated, generally refers to a rate at which laser pulses are delivered to a target material during laser processing of the material. The rate may correspond to the rate at which pulses are generated by a laser source, but the rate may also be reduced relative to the source rate in embodiments where, for example, a pulse or group of pulses is gated and delivered to the target material.

In the present application, reference is made to ultrashort pulse. In general, an ultrashort pulse has a pulse duration (or pulse width) less than a few tens of picoseconds. For example, an ultrashort pulse can have a pulse duration less than about 100 ps, less than about 10 ps, less than about 1 ps, less than about 500 fs, less than about 250 fs, or less than about 100 fs. An ultrashort pulse can have a pulse duration of a few fs to several tens of fs. An ultrashort pulse width may be material dependent, and characterized by a pulse width below which a damage threshold is approximately constant, for example.

In the present application, reference is made to limiting accumulation of unwanted material within or proximate to a target material, target region, or the like. Unless otherwise explicitly stated, alternative language is to not to be construed as only one of the two (or more) alternatives, but may include both (or more) alternatives.

As used herein the term debris is not limiting, and generally refers to unwanted accumulation of material within or proximate a localized region. Debris may result from laser-material interaction and/or HAZ. Recast, slag, redeposit and other related terms are also well known in the art. Typically a heat affected zone includes material heated and cooled fast enough to form molten material, and the extent of the region depends, among other factors, on the pulse duration and various material parameters. Short pulses, particularly ultrashort pulses, are known to localize the heat and reduce the dimension of a heat-affected zone.

As used herein the phrase linear absorption generally refers to a physical mechanism wherein the absorption of light in a material is material-characteristic, and the light absorbed (per unit thickness of the absorber) is dependent linearly on the light intensity. Linear absorption generally corresponds to an exponential decrease in light power over a depth range in the material. An absorption length may be specified based on the quantity of power that is scattered and/or absorbed. A material may be characterized with a linear absorption coefficient, $\alpha$, wherein the power P at a given depth is given by $P=P_{inc} \exp(-\alpha Z)$, where $P_{inc}$ is the power incident on the material and Z is the depth within the material. In many materials, linear absorption involves a quantum mechanical transition induced by a single photon. In linear absorption, the absorption coefficient $\alpha$ is independent of the light intensity.

As used herein, nonlinear absorption generally refers to processes in which light absorption is dependent on the light intensity, I. Two-photon absorption is an example of nonlinear absorption where an electronic transition to an upper-level state results from (substantially simultaneous) absorption of two photons. For example, for two-photon absorption, the absorption (per unit thickness of the absorber) is proportional to the square of the intensity, e.g., $\beta I^2$, where $\beta$ is a two-photon absorption cross-section. In other nonlinear absorption processes, the absorption can depend on higher powers of the intensity I (e.g., for higher-order multi-photon absorption processes) or can have different mathematical functional dependence on the intensity I. As a result of the nonlinearity on the intensity, the likelihood of nonlinear absorption increases in the presence of strong optical fields (e.g., nonlinear absorption increases faster than linear absorption as the intensity I increases). For sufficiently high intensity, nonlinear absorption can be much larger than linear absorption; therefore, at such intensities, light is primarily absorbed by the medium (e.g., a workpiece) through nonlinear absorption processes rather than through linear absorption processes.

The use of scan, scanner, scanning, scan rate and the like in this application generally refers to relative movement of a beam of radiation with respect to a material and, unless otherwise specified, is not to be construed as a imposing a requirement for an optical scanner (e.g.: X-Y galvanometer or other beam deflector). Various embodiments may utilize X, Y, Z, angular, motion stages, including piezoelectric or other positioning mechanisms; electro-mechanical, solid state, diffractive, refractive optical scanners/deflectors; or other positioning equipment, configured in any suitable combination so as to meet laser processing objectives. In various embodiments, the beam can be moved or positioned and the target material held stationary, the beam can be held stationary and the target material moved or positioned, or a combination of movements or positioning of both the beam and the target material can be utilized. Relative movements in one dimension, two dimensions, and/or three dimensions can be utilized.

Overview of Examples and Embodiments

As discussed above, Applicants have recognized that a need exists for laser-based processing to scribe, dice, cut, or other processing to remove material from a region of a composite material workpiece, so as to produce relatively narrow kerfs and relatively clean cuts with reduced thermal effects, while maintaining high throughput.

Embodiments of systems and methods disclosed herein are generally applicable for laser processing a workpiece, and particularly for micromachining applications. The workpiece may comprise a composite material. The workpiece may comprise a PCB. For example, various embodiments are applicable to cutting, dicing, scribing, and/or engraving composite materials to form features having a typical lateral dimension in a range from about 1 micron to about 100 microns and a depth from about a few microns to hundreds of microns. In some embodiments, the depth of the feature (e.g., a cut) may be equal to the thickness of the target material (e.g., the features passes entirely through the target material). In some embodiments, the depth of the feature is smaller than the thickness of the target material (e.g., the feature is used to scribe a portion of the target material).

In various embodiments a depthwise removal of at least about 10 µm, up to about 100 µm, or somewhat larger may be achieved with one or more passes of laser processing pulses relative to the material. The laser pulses may comprise ultrashort pulses. By way of example, experimental results disclosed herein show that about 100 µm of composite material can be removed in four passes with a near IR ultrashort pulsed laser (e.g., a fs laser outputting laser pulses with a duration of about 500 fs). Images comparing the ultrashort pulse and nanosecond (ns) experimental results obtained at approximately the same wavelength illustrate greatly reduced HAZ and molten recast with the ultrashort pulse configuration as compared to the ns configuration.

Laser processing has advantages over conventional mechanical dicing in many aspects, particularly as the workpiece gets thinner and comprises materials with far different mechanical and thermal properties. Precision contour cut and cut of a populated PCB of high density pose challenges for conventional mechanical methods. Furthermore, challenges remain for laser processing depending on the optical properties of the materials and the control of HAZ that depends on the material properties.

In certain implementations disclosed herein, unlike the thermal processing of a ns laser or CW laser, processing with a picosecond (ps) or fs pulse does not primarily rely on the linear laser absorption, but rather on nonlinear absorption. High power pulsed lasers can provide sufficient intensity in or on a target material such that the laser pulses are absorbed primarily by nonlinear absorption processes (e.g., as compared to linear absorption processes).

Applicants have found that ultrashort laser processing in the nonlinear absorption regime may provide, for certain target materials, advantages including, e.g., reduced HAZ, reduced residual stress, and less sensitivity to variations in material ablation thresholds. Ablation of a transparent material is an advantageous capability provided by the use of ultrashort laser pulses in some implementations, and can result from nonlinear absorption at high intensity. In some embodiments one or more optical parameters including, but not limited to, pulse energy, photon energy, peak or average intensity, peak or average fluence, pulse wavelength (or frequency), peak or average pulse intensity, pulse duration, pulse repetition rate, peak or average power density, peak or average power, laser spot size, laser spot spatial overlap, and number of processing passes may be tailored for the material to achieve a desired material processing outcome. Ultrashort pulse lasers providing high average power are available, and ultrashort laser processing is a viable and practical alternative to machine processing or CW (or ns) laser processing for material processing.

Application of ultrashort laser technology for high quality cuts of composite material provides potential for process improvement, as will be demonstrated with examples and experimental results below. A particularly surprising discovery was the depth of material removed in a single pass, or in a few passes, while obtaining high cut quality and low HAZ.

As one example, a composite workpiece may be a Garolite board having glass fiber mesh structure and epoxy resin. Melting temperature of a typical glass material reaches about 1200° C., while the melting temperature of a typical epoxy resin is only about 85-95° C. The evaporation temperature is about 2500° C. and about 600° C. for the glass and epoxy resin material, respectively. As a result of the relatively large temperature differences between the melting and evaporation temperatures of the glass and the resin, heat associated with laser cutting with long pulses (e.g., >ns pulses) could require pre-determining parameters for each material, and thus pre-determining a large number of processing parameters. As such, conflicting alternatives could arise and reduce the predictability of the processing. For example, in one alternative, long pulse laser parameters optimized for epoxy may not cut the glass material, while in another alternative, long pulse laser parameters optimized for the glass may overly heat the epoxy. Applicants have found that using ultrashort pulses may provide improved cut quality as compared to either of the alternative processing parameters using long laser pulses. Conditions for cutting by a CW laser or long laser pulse system, for example, pulse widths >1 ns, >10 ns, or >30 ns, depend on the heat created by the linearly absorbed laser pulses. Applicants have also found that processing using ultrashort pulses in the nonlinear absorption regime may have advantages over processing regimes using linearly absorbed laser pulses.

With certain prior methods and systems considerable effort was used to reduce or avoid the heat effect in PCB via drilling. Debris, overheated delamination, recasts, fiber protrusion, resin recession are some examples of undesirable results of such heat-driven percussion drilling. Many efforts were made to improve the process quality to cope with the heat effect in laser processing. For example, U.S. Pat. No. 7,057,133 discloses drilling a pilot hole having a diameter that is less than the desired diameter of the through-hole and then drilling a through-hole having the desired diameter. The pilot hole forms a channel from which thermal energy produced during laser drilling can diffuse into the environment, thereby reducing the amount of thermal energy diffusing into the surrounding target material matrix and the degree of thermal damage to the heat affected zone of the target material matrix.

The transition from the relatively well investigated area of PCB laser via drilling to PCB cutting has been limited by the different requirements of the cut surface, where the homogeneity does not restrictedly apply to a single drilled hole, but rather a line or even two-dimensional distribution of cut surface quality over an extended region. An example would be the straightness of the cut line and the size of kerf.

X. C. Wang et al., (Optics and Lasers in Engineering vol. 46, p. 404 (2008)) demonstrated a high speed scanner providing a cut line using low overlap (e.g., <50%) of adjacent laser spots generated with a UV DPSS q-switched laser as one possible solution to create better cut quality of a PCB cut.

However, because high throughput can be advantageous for PCB manufacturing, Applicants have developed embodiments of systems and methods providing for high throughput material processing. In some embodiments, a high throughput process may utilize a higher average laser power. Increasing the pulse energy at a limited low pulse repetition rate generally does not result in satisfactory throughput. Accordingly, in certain embodiments, a high repetition rate pulse train may be desirable. Furthermore, repetitive application of properly adjusted pulses may enhance the cut quality by providing effective control of the heat effect. For example, the '256 Application, discloses that another possible advantage of a relatively high repetition rate is the ability to process the substrate in a shorter time than when a lower repetition rate is used. As such, in certain embodiments, the throughput of the system is improved while simultaneously providing improved quality.

As demonstrated in certain examples below, ultrashort laser pulses having sufficient intensity to induce nonlinear absorption in a composite material, provide improved cut quality under spot overlap conditions, for example, over about 50%, over about 60%, over about 70%, over about 80%, over about 90%, over about 95%, over about 98%, or over about 99%. By way of example, some of the results demonstrate high quality cutting of PCB material with a spot overlap over 90% to remove about 100 μm of material in about 1-10 passes, at a speed of about 200 mm/sec of each pass, thereby providing for practical application of ultrashort pulse cutting of high speed PCBs fabricated from the composite material(s).

Some embodiments may include the formation of high-aspect ratio features as part of the process. For example, thin PCB dicing advantageously may use clean and precise cuts to separate PCB die without damaging nearby circuitry or structures. The PCB may be diced using focused laser pulses to cut through the entire board, perhaps changing the depthwise position of the focus of the laser pulses during cutting in some embodiments. Alternatively, laser pulses may form a high aspect ratio feature, for example, a narrow and deep cut of pre-determined depth. A thin depthwise portion of remaining material is then separated using a non-laser method in some implementations. It may be advantageous for debris and contamination to be sufficiently well controlled.

FIGS. 1A-1C are schematic illustrations showing a portion of a process for laser-based material modification. Examples of focused laser spots 1000-a, 1001-a are shown with an overlap factor which may be a small fraction of a spot diameter in some embodiments. The overlap factor may be different than schematically shown in FIG. 1A. For example, the overlap factor may be approximately the same from spot to spot (e.g., as schematically illustrated in FIG. 1A) or the overlap factor may differ from spot to spot. Different laser passes may utilize different overlap factors (and/or spot shapes, spot diameters, etc.). In various implementations, some adjacent spots can substantially overlap (e.g., having an overlap factor that is a small fraction of a spot diameter) or some adjacent spots can be spaced apart (e.g., having an overlap factor that is approximately the same, or larger, than the spot diameter). In various embodiments, an overlap factor may be selected to provide machined features with, for example, smooth straight edges, or selected to affect heat accumulation within a region. In such embodiments, the overlap factor (or other parameters) can be pre-selected prior to machining, selected or adjusted dynamically during machining, or a combination of pre-selection and dynamic selection can be used. Although FIG. 1A illustrates the focused laser spots 1000-*a* and 1001-*a* as circles having the same spot diameter, the focused laser spots can have other shapes and sizes in other embodiments. Many variations in spot shape, spot size, overlap factor, etc. are possible.

The spots may be applied to target material of a workpiece with one pass or with multiple passes, for example with a scanning mechanism (not shown). In FIGS. 1A-1C, the upper illustrations schematically show the first pass of the laser pulses (Pass 1), and the lower illustrations show the $N^{th}$ pass of the laser pulses (Pass N). In various embodiments, any suitable number N of processing passes may be used, for example, 1, 2, 3, 4, 5, 6, 7, 8, 9, 10, 20, 50, 100, 250, 700, 1000, or more passes. A simplified top schematic view of a target region is shown in FIG. 1B, showing a region where material was removed with the circular spots 1000-*a*, 1001-*a*. The region has a lateral dimension on the order of a spot diameter, although it is generally known that with ultrashort pulses it is possible to controllably remove material over a region smaller than a spot dimension, as taught in, for example, U.S. Pat. No. 5,656,186. In the top views shown in FIGS. 1A-1C, the region where material is removed is schematically shown as a rectangle, although at least the edges orthogonal to the scan direction are typically somewhat rounded, particularly with the use of focused laser beams having an elliptical or circular cross section.

With various embodiments, the features may be formed with laser spots to remove a depthwise portion of the target material, for example, about 0.5 µm or a few microns in some embodiments. In some embodiments, particularly implementations for cutting composite materials, about 25 µm of material or more may be removed per pass, with less than 10 passes being used for cutting/dicing a 125 µm substrate, for example. In a single pass, a relatively small depth-portion 1000-*c* is removed (see upper illustration in FIG. 1C). A second pass, or N passes, then remove additional depthwise portions, as schematically represented by curve 1001-*c* (see lower illustration in FIG. 1C). After N passes a feature may be formed having a desired depth and/or spatial profile. Alternatively, with a sufficiently large number of passes, the material may be cleanly severed (e.g., cut all the way through the material, sometimes called "breakthrough"). In various embodiments, the number of passes N may be 1, 2, 3, 4, 5, 10, 25, 100, 250, 500, 750, 1000, 1500, 2000, 5000, or more. The number of passes may be selected based on factors including, for example, the desired depth and/or spatial profile of the feature, the material(s) forming the workpiece, whether breakthrough is desired, and so forth. The number of passes may be dynamically adjusted during processing.

FIG. 1B schematically shows a simple linear/rectangular machined pattern as viewed from above the workpiece. However, machined features may be circular, elliptical, interleaved, spiral or other arbitrary shapes that will be formed by programming the relative positions of the laser pulse source and target material (e.g., with a scanning mechanism, as will be further illustrated below). Similarly, the focused spot distributions may be non-circular and/or may have Gaussian or non-Gaussian spot profiles. Further, various shapes may be formed as a function of depth, for example tapered, stepped, and/or curved features wherein the width of the feature varies with depth in a pre-determined manner, or approximately so. High aspect ratio features may be formed alone or in combination with other features, and may be connected to a region having a lower aspect feature, for example a large diameter hole. Many variations are possible with the systems and methods disclosed herein.

Some parameters of interest for embodiments of "trench digging" or other applications may include, for example, the shape, depth, and quality of the trench. However, in many applications, redeposited material, commonly called recast or slag, may be formed at or very near the edges of the narrow trenches. The quantity of redeposited material generally increases with increased machining depth.

FIG. 1D schematically illustrates a cross-sectional view of a machined feature 1001-*c* having a depth (as in FIGS. 1A-1C), but having significant redeposited material 1005-*a*. The redeposited material 1005-*a* may be above a surface of the workpiece and/or within the machined feature 1001-*c*. A baseline of the non-processed substrate is depicted as the dashed lines in FIGS. 1D and 1E. The redeposited material may also accumulate within a feature or target region, for example within a depth of several microns below the baseline (see FIG. 1D).

FIG. 1E is representative of an example result obtainable with pulsed laser embodiments disclosed herein, wherein, for a fixed number of passes N, accumulation of redeposited material 1005-*b* is reduced (compared to the result schematically shown in FIG. 1D). As illustrated in FIG. 1E, the cross sectional area of redeposited material is reduced (relative to FIG. 1D) and/or the type of material deposited is in the form of fine particles as opposed to molten material of a larger dimension. For example, in some embodiments, such a result is obtainable by increasing the laser repetition rate and, in this example, holding other laser parameters approximately constant. In various embodiments, the accumulation of the redeposited material may be reduced within the target region, proximate to the target region, or both. In various embodiments, the nature of the redeposited material (e.g., the size distribution of the particles) may be altered within the target region, proximate to the target region, or both. FIGS. 1C, 1D, and 1E schematically illustrate the machined features 1000-*c* and 1001-*c* as having a cross-section shaped generally as a trapezoid. The trapezoidal cross-sectional shape is intended to be schematic and is not intended as a limitation on the cross-sectional shape (or any other characteristic) of features that can be machined with various embodiments of the laser-based processing systems and methods disclosed herein. In other embodiments, features can be machined that do not have trapezoidal cross-sectional shapes such as, for example, triangular shapes, rectangular shapes, rounded shapes, tapered shapes converging to a minimum width much smaller than the a maximum width, or any other suitable shape. The features can have a relatively high aspect ratio measured, for example, by a relatively high ratio of a depth of the feature to a width of a feature. Many feature shapes, sizes, and aspect ratios are possible. Also, the cross-sectional size and shape of the redeposited material 1005-*a*, 1005-*b* are intended to be schematic and are not intended as a limitation on the sizes and/or shapes of possible redeposited material.

In some implementations, obtaining both a desired feature shape and reduction in redeposited material were best achieved with ultrashort pulses, for example, pulses less than about 10 ps in pulse width. However, increased repetition rate was also beneficial with longer pulses of about 200 ps in some cases, because, for example, the accumulation of redeposited material was reduced relative to slower repetition rates. For some applications, benefits may also be found with longer pulse widths, for example up to a few nanoseconds, or below about 10 ns.

Embodiments may therefore decrease the quantity of slag and/or other unwanted material (and/or change the nature of the redeposited material), while providing for a desired shape, depth, and/or width of the features. By way of example, and as will be shown later, short pulse width processing affected the nature and quantity of re-deposited material.

In some applications, for example dicing and scribing, different quality measures may be provided. For example, quantification of the volume of redeposited material may be a useful measure, and may be combined with cut quality as an overall figure of merit. Various embodiments are particularly applicable for processing operations where high efficiency is desirable, and wherein accumulation of redeposited material is detrimental or otherwise undesirable.

In some embodiments micromachining may include laser scribing, dicing, or similar processing of composite material substrate, which may be bare or patterned. Scribing and dicing are two applications with a recognized need. Scribing may remove one or more layers of multiple materials supported on a composite material substrate but may not cut entirely through the composite material. Dicing may result in a complete cut entirely through the material.

Because potential processing speed is one possible reason for use of laser technology for thin PCB dicing, a practical system for dicing thin, e.g. <300 µm in some cases, PCB is to provide for removal of a relatively large amount of material at high speed, for example at least 10 µm, 25 µm, and up to about 50 µm, 100 µm, 150 µm, or greater in a single pass.

Without subscribing to any particular theory, the energy transfer time between electron and lattice excitation modes and subsequently diffusing to surrounding area depends on the material and time scale. The energy transfer time between the excitation modes before onset of thermal diffusion is considered to be ultrafast within a time scale of ps or even tens of fs regime depending on material. Extreme localization of temperature in a laser spot (melting or non-melting) prior to the diffusion may be an underlying process when ablating material using a laser pulse with an ultrashort laser. In various embodiments, the time it takes for the temperature to reach the point required for ablating material without spreading heat by diffusion may be a parameter used at least in part to control the material processing.

When a nanosecond (or longer pulse duration) laser is used for dicing or scribing process, the irradiated region generally remains above its melting temperature for an extended time frame. A "melting pool" (e.g.: a region of molten material) may be formed and may shrink when it is cooling down. The "boiling" and "cooling" process can cause cracking, surface roughness and voids in the HAZ. Such a process can be erratic, and the quality of material modification difficult to predict, leading to inconsistent processing results When a ns UV pulse impinges a material opaque to the UV wavelength, linear absorption generally is the primary source of the temperature increase in the laser spot. The ns pulse duration leads, at the same time, to spreading the resulting heat away from the laser spot. The heat penetration into the bulk of material can be more strongly present, which in turn may lead to melting of material over an extended volume. This process tends to limit localized elevation of temperature in the laser spot to the point of ablation. By way of example, and in contrast to ns processing, ultrashort pulses may be more suitable for localized ablating. Moreover, the nonlinear absorption tends to be less material specific, although some dependence on the band gap energy may exist for some materials.

Ultrashort pulse irradiation (e.g., fs pulses) in some implementations provides a shallow HAZ, but little interaction with underlying layers of a device occurs as a result of the ultrashort pulse width. The femtosecond pulse heating process can be almost instantaneous, confines HAZ to a limited thickness, and does not substantially affect layers disposed below modified material. Much smoother and predictable surface morphology is achievable in certain such implementations.

In some embodiments, ultrashort pulses may be used to process a second depthwise portion of the workpiece, with generation of negligible HAZ. In various embodiments femtosecond pulses are utilized for at least cutting through the entire PCB, a portion of the PCB, and particularly for cutting very thin PCB, for example PCB having thickness of 100 µm or less.

In various embodiments, cutting of metal layers with ultrashort laser pulses is advantageous. For example, the '256 Application discloses various embodiments for processing a multi-material workpiece. The workpiece can comprise a semiconductor material and a pattern, and the pattern can comprise at least one of a dielectric material and metal material. In some embodiments, the method comprises irradiating the workpiece with a series of laser pulses, with at least two pulses of the series having different characteristics that are applied to different materials of the workpiece. The method may also include controlling HAZ such that at least one HAZ generated during removal of at least one of the dielectric material and the metal material is increased depthwise relative to at least one HAZ generated during removal of a portion of the semiconductor material. Numerous examples are set forth for removing material portions from multi-material workpieces having various combination of dielectric, metal, and semiconductor materials arranged in various lateral and depthwise patterns. Experimental results demonstrated that overlap ratio for high quality Cu cutting corresponds with high spot overlap ratio. For example, the '256 Application, including but not limited to FIGS. 7-17 and the corresponding text, illustrates examples of processing multi-material microelectronic workpieces with various laser parameters.

By way of example, and as disclosed in the '256 Application, FIGS. 1G-1 to 1G-3 (not to scale) schematically illustrate an example of a patterned semiconductor wafer 120 having several die arranged in rows and columns with streets 127 therebetween. In conventional systems the wafer is typically laser scribed, and cut using a dicing saw. As the thickness decreases below about 100 µm, for example about 50 µm or about 75 µm, mechanical dicing becomes more difficult. Therefore, it is desirable to use laser dicing to reduce or eliminate mechanical dicing.

Figures 1, 1G:
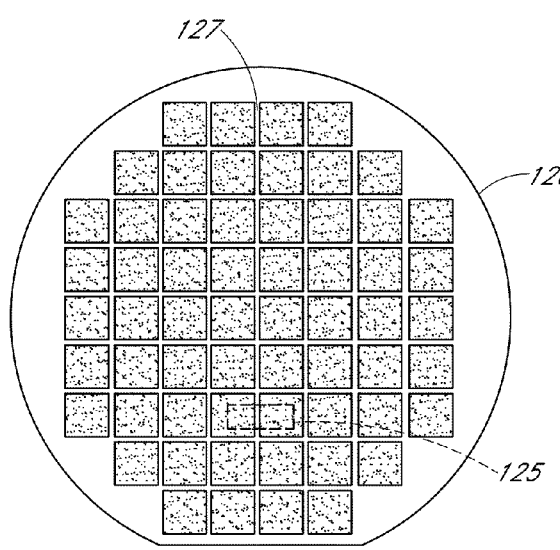
FIGS. 1G-1 to 1G-3 schematically illustrate examples of portions of patterned wafers.
Figures 1, 1G, 2, 3:
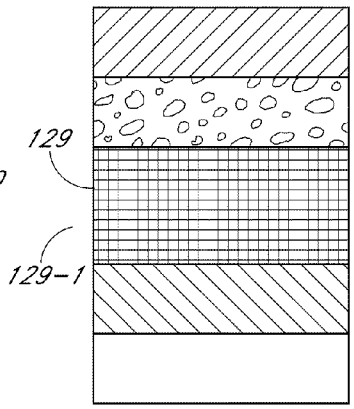
Figures 1, 1G, 2:
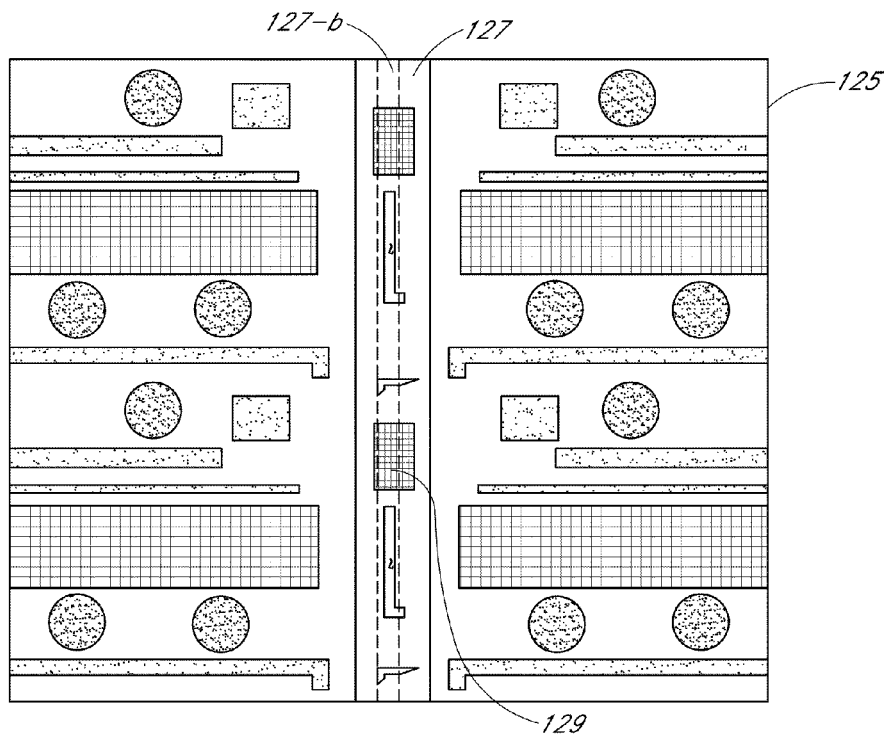

FIG. 1G-2 schematically illustrates an example portion 125 of the wafer 120. By way of example, dicing is to be carried out in region 127-b along the street 127. The region may include several materials and bare wafer portions. The circuit features shown in the streets, for example high-density grid layer 129, may be utilized for electrical or other functional tests prior to dicing. The regions adjacent to street 127 contain high density active circuits, interconnects which may include solder balls, or other combinations. In certain advantageous implementations, the dicing or scribing is to be carried out to cleanly cut the wafer without causing damage to circuitry, without introducing significant debris or heat affected zone (HAZ), and should provide for sufficient die strength.

FIG. 1G-3 schematically illustrates a cross sectional sideview 129-1 of a portion of the wafer, the fine grid area 129 of FIG. 1G-2. The grid may be covered with one or more of dielectric and metal materials.

In accordance with embodiments for processing a workpiece having a composite material, similar circuit layouts may be found on high speed PCBs, but at a coarser scale and with substrate material(s) having substantially different thermal and optical properties than semiconductor wafers. For example, the circuit may comprise ball grid arrays and high density interconnects in localized regions. In a manner similar to that for wafer processing collateral damage advantageously is to be avoided when cutting high speed PCBs having composite material substrates having high density circuitry. Such a PCB may, for example, have composite material disposed between at least two layers of non-composite material, and/or a layer of non-composite material in contact with the composite material. A non-composite material may comprise a metal (e.g., a copper layer) or polymer, for example.

In at least one embodiment a single laser source may be utilized (see, e.g., FIG. 1F). Adjustment of laser parameters may balance heat generation within a processing region and transfer of heat outward from the region. Delamination and/or unwanted thermal stress can be reduced or avoided. Furthermore, in some embodiments a frequency doubled green wavelength can be suitable where the PCB material (besides the metal layer) is largely transparent to infrared wavelengths (e.g., wavelengths of about 1 micron).

Example Embodiments of Pulsed Laser Systems for Micromachining

FIG. 1F schematically illustrates an embodiment of a system 100 suitable for processing a workpiece with laser pulses. The system 100 comprises a laser system 104 that is operatively coupled to a controller 114 and scanning system 106. In some embodiments, the laser system 104 is configured to output laser pulses that comprise one or more ultrashort pulses. For example, in at least one embodiment, the laser system 104 comprises an ultrashort pulse laser. In various embodiments the system 100 will provide for adjustment of certain pulse parameters over a substantial range. Such parameters may include one or more of pulse energy, pulse repetition rate, pulse width, pulse power, pulse fluence, pulse power density, pulse intensity, pulse wavelength (or frequency), spot diameter, overlap of adjacent spots, scan speed, and number of scan passes. By way of example, pulses may be generated at an adjustable repetition rate from a few tens of kHz up to about 1 MHz, or up to about 10 MHz. An output pulse may have an energy of about 1 µJ or higher, for example up to about 5-20 µJ or greater (e.g., 500 µJ), and a pulse width about 1 ps or shorter. Further details of various embodiments of the system 100 are described below.

An amplified laser system, particularly an ultrashort fiber-based chirped pulse amplification system (FCPA), operating at repetition rates of at least several hundred kHz, is suitable for processing of several types of patterned and unpatterned substrates. High pulse energy, for example several microjoules, is obtainable with an amplified train of ultrashort pulses. Sufficient pulse energy in at least the microjoule range is obtainable, with 15-40 µm typical spot diameters providing for high throughput in some embodiments.

In some implementations, multiple passes can be used. The pulse energy used in the passes may be the same or different than the energy used in additional passes. Moreover, in some embodiments, the pulse energy may be varied between passes (or may be varied during a pass). One or more other parameters of the laser beam can be varied between passes or during a pass (e.g., pulse duration, repetition rate, fluence, power density, spot size, spot overlap, etc.).

In some embodiments other laser pulse parameters may be adjusted between passes. For example, a relatively long pulse width may be used for removal of at least conductive and/or dielectric materials. Such a pulse width may be up to a few nanoseconds (ns), less than 1 ns, or about 500 ps or shorter. An ultrashort pulse may be used to cut at least the underlying composite material, for example with sub-picosecond pulses.

In some implementations, the long and short pulses may be applied in separate passes, or in some embodiments by applying bursts of laser light to a target area of a material during any single pass. In some cases, the burst may be applied at a predetermined repetition rate, and may comprise at least first and second pulses of laser light displaced or overlapped in time, and the first pulse width may be greater than the second pulse width, and greater than 10 ps in duration in some embodiments, the second pulse width being an ultrashort pulse, for example a sub-picosecond pulse. The pulse separation of pulses in the burst may be about 1 µsec to 0.1 µsec, and in some embodiments a shorter separation may be used. The second pulse width may be as above: sub-picosecond (e.g.: greater than about 100 fs in some cases) to about 10 ps, and generally less than about 50 ps. Moreover, first and second is not restricted to temporal sequence, but may be applied in any order. For example a reversed order may result from respective top-side or bottom-side initial scans.

One possible laser system for some micromachining implementations will provide pulse energy of at least about 5 µJ at an adjustable repetition rate (pulses delivered to the surface) of about a few tens of kHz to about 10 MHz, and will be coupled to a scanner for scanning at a rate up to about 10 m/sec. The system can include an optical power amplifier to provide for high pulse energy and sufficiently high throughput. At least a portion of the system can be fiber based in some embodiments.

In one embodiment, the laser source comprises an Yb-doped, amplified fiber laser (e.g., FCPA µJewel, available from IMRA America, Ann Arbor, Mich.). Such a laser offers several primary advantages over commercial solid-state laser systems. For example, this laser source provides a variable repetition rate over a range of about 100 kHz to 5 MHz. Higher pulse energy than an oscillator-only system allows greater flexibility in focal geometry (e.g.: larger spot sizes for a given fluence). In at least one embodiment, pulse energy of up to about 10 µJ may be applied at a repetition rate of about 1 MHz, with at least about 1 µJ at a 5 MHz rate. Higher repetition rate than various solid-state regeneratively amplified systems allows greater processing speed. Although some oscillators have been demonstrated which produce microjoule pulse energy, their complexity is at least comparable to CPA systems.

Such energy is also achievable with embodiments of a fiber-based system utilizing a power amplifier, for example at least one large mode amplifier producing a nearly diffraction limited output beam. In at least one embodiment, a large mode amplifier may receive low-energy pulses from a mode locked fiber oscillator, and amplify the pulses to the microjoule level. Preferably, the oscillator and power amplifier are integrated to form an all-fiber system. Numerous possibilities exist.

In some embodiments, particularly for processing with lower pulse energy and/or higher repetition rates, an all-fiber ultrashort pulsed laser system may be utilized. The system may include a fiber-based pulse amplification system producing pulse widths below 1 ps. Low energy pulses from a fiber oscillator may be selected with an optical switch, and amplified with a fiber amplifier to at least about 100 nJ. At relatively low energy the sub-picosecond pulses may be amplified with the fiber amplifier. In other embodiments an all-fiber chirped pulse amplification system may comprise a pulse stretcher and pulse compressor. The compressor may comprise a fiber compressor performing at least partial pulse compression, a bulk compressor, or a combination thereof. Many variations are possible, including further amplification, harmonic conversion, and the like.

Various embodiments include fiber-based chirped pulse amplification systems suitable for numerous micromachining applications. The systems are particularly suited for processing materials using pulse energies up to tens of microjoules and up to a maximum of about 100 µJ. Spot diameters may be in a range from about 1 micron to about 100 µm. In some embodiments, a spot size may be in the range of about 10 µm to 100 µm, or 10 µm to about 60 µm, or 25 µm to 50 µm. Pulse widths may be in a range from tens of femtoseconds (e.g., 50 fs) to about 500 picoseconds. The parameters generally provide for energy density near or above an ablation threshold for the workpiece material(s) being processed, and the total energy provided may depend on, for example, the spot diameter. Workpiece materials may include, but are not limited to, composite materials, metals, inorganic dielectrics, organic dielectrics, semiconductor materials, low-k dielectric materials, or combinations thereof.

FIG. 1F schematically illustrates a first embodiment of a system 100 capable of use for processing a workpiece, for example a composite material substrate. The system 100 comprises a laser system 104 and a scanning system 106. In this embodiment, the scanning system 106 includes two beam deflectors 108, for example galvanometric scanning minors, capable of two-dimensional scanning. In other embodiments, a different number and/or type of scanning mirrors may be used. In some embodiments, the scanning may be one-dimensional. The scanning system 106 may also include focusing optics 110 such as, for example, an integrated F-theta lens capable of producing a substantially flat field of view at the target substrate 112.

In other embodiments, additional optical elements may be utilized in the scanning system 106 (e.g., minors, lenses, gratings, spatial light modulators, etc.). A skilled artisan will recognize that a pattern to be formed within the substrate may be communicated to the system 100 via many methods including wired and/or wireless techniques. In certain embodiments, the pattern is represented via vector graphics including curves and/or polygons, and may include three-dimensional machining instructions. Many variations are possible.

In some embodiments, the laser system 104 may comprise an ultrashort pulse laser configured to output one or more ultrashort pulses. An ultrashort pulse may have a duration such as, for example, less than approximately 10 ps. In the example system 100 shown in FIG. 1F, the laser system 104 may comprise a fiber-based laser capable of generating an ultrafast pulse train. For example, the laser may comprise an FCPA µJewel laser available from IMRA America, Inc. (Ann Arbor, Mich.). The laser pulses have a wavelength that may be about 1 µm. In some embodiments, shorter wavelengths laser pulses are used such as, for example, green light pulses of about 520 nm wavelength. Green light pulses are provided in some implementations by frequency doubling the 1 µm light. In other embodiments, any other suitable laser system can be implemented. In certain embodiments, the laser system 104 may produce laser pulses with a pulse width less than about 10 ps. For example, the pulse width may be in a range from about 100 fs to about 1 ps. In some embodiments, the pulse width is in a range from about 10 fs to about 500 ps. In other embodiments of the laser system 104, other pulse widths are used such as, for example, ≤10 ns, ≤1 ns, ≤100 ps, ≤1 ps, and/or ≤100 fs.

In some embodiments, a relatively high laser repetition rate is used to enable relatively rapid laser processing. For example, the repetition rate may be larger than 500 kHz. In certain embodiments, a repetition rate of about 1 MHz to 10 MHz may be used. Other repetition rates are possible. Based on results disclosed herein, the use of a relatively high repetition rate may be utilized in some embodiments to reduce the quantity of redeposited material 1005-a schematically illustrated in FIG. 1D. In some implementations, tens or hundreds of laser pulses may overlap in each focal spot diameter, which may be about 20 µm in diameter, or 10-50 µm in some embodiments. In other embodiments a different number of pulses may overlap. For example, in some embodiments a few pulses may overlap, for example 3 pulses. Another possible advantage of a relatively high repetition rate is the ability to process the substrate in a shorter time than when a lower repetition rate is used. As such, in certain embodiments, the throughput of the system 100 is improved while simultaneously providing improved quality.

FIG. 2A schematically illustrates an embodiment of a system 200 that can be used for processing a composite material target substrate 112 with ultrafast pulse trains. This system 200 may be generally similar to the embodiment schematically depicted in FIG. 1F. The laser system 104 in the embodiment shown in FIG. 2A comprises an optional internal pulse modulator 202 not shown in the embodiment depicted in FIG. 1F. The optical modulator 202 may be used for modulation of the repetition rate of the laser pulse train. In some embodiments, the laser pulse train comprises one or more ultrashort pulses such as, for example, one or more trains of ultrashort pulses. In some embodiments, the modulator 202 is adapted to change the laser pulse repetition rate from the oscillator repetition rate (typically about 50 MHz in some fiber laser embodiments) to the machining repetition rate (typically less than or about 1 MHz). For example, the modulator 202 may be configured to allow for transmission of only every nth pulse from the oscillator pulse train to a final power amplifier, or transmission of groups of pulses. In certain embodiments, it may be convenient to implement such oscillator amplifier configurations for the generation of high energy pulse trains, where for improved oscillator stability, oscillator repetition rates of the order of 50 MHz are utilized. Such oscillator amplifier systems are well known to a skilled artisan.

In certain implementations, the internal modulator 202 allows the average power and thermal conditions in the amplifier to remain substantially the same while substantially instantaneously changing the pulse energy and pulse peak power. The internal modulator 202 may comprise an acousto-optic modulator or any other suitable optical modulator. In certain embodiments, the laser system 104 outputs pulses with pulse energies above about 1 µJ, pulse durations less than about 10 ps, and a pulse repetition rate of greater than about 100 kHz.

The embodiment shown in FIG. 2A also comprises a frequency converter 204 such as, for example, a second harmonic generation (SHG) converter. In this embodiment, combination of the SHG converter and the internal modulator 202 provides a "fast shutter," because the harmonic conversion efficiency is proportional to the laser pulse energy. Accordingly, by modulating the laser repetition rate from the oscillator it is possible to turn the machining beam (e.g., the transmitted SHG beam) on and off substantially instantaneously. Such rapid shuttering is not possible mechanically and is difficult to implement optically for high laser powers without causing degradation to beam quality, pulse duration, etc. Some embodiments may include a third harmonic generation converter and/or a fourth harmonic generation converter or any other suitable harmonic generation converter.

The embodiment shown in FIG. 2A also comprises the controller 114, which may be used to control the laser system 104, the scanning system 106, the frequency converter 204, and/or other system components. For example, in certain embodiments, control of the modulator 202 and the scanning system 106 (e.g., the scanning minors 108 and/or the focusing optics 110) may be linked so as to enable much greater control of the laser irradiation conditions, thereby providing greater control of machining depth and lateral extent. For example, in some embodiments, the controller 114 is configured to control a spatial overlap between adjacent focused pulses (or groups of pulses) during processing of a target material at the pulse repetition rate.

Figure 2B:
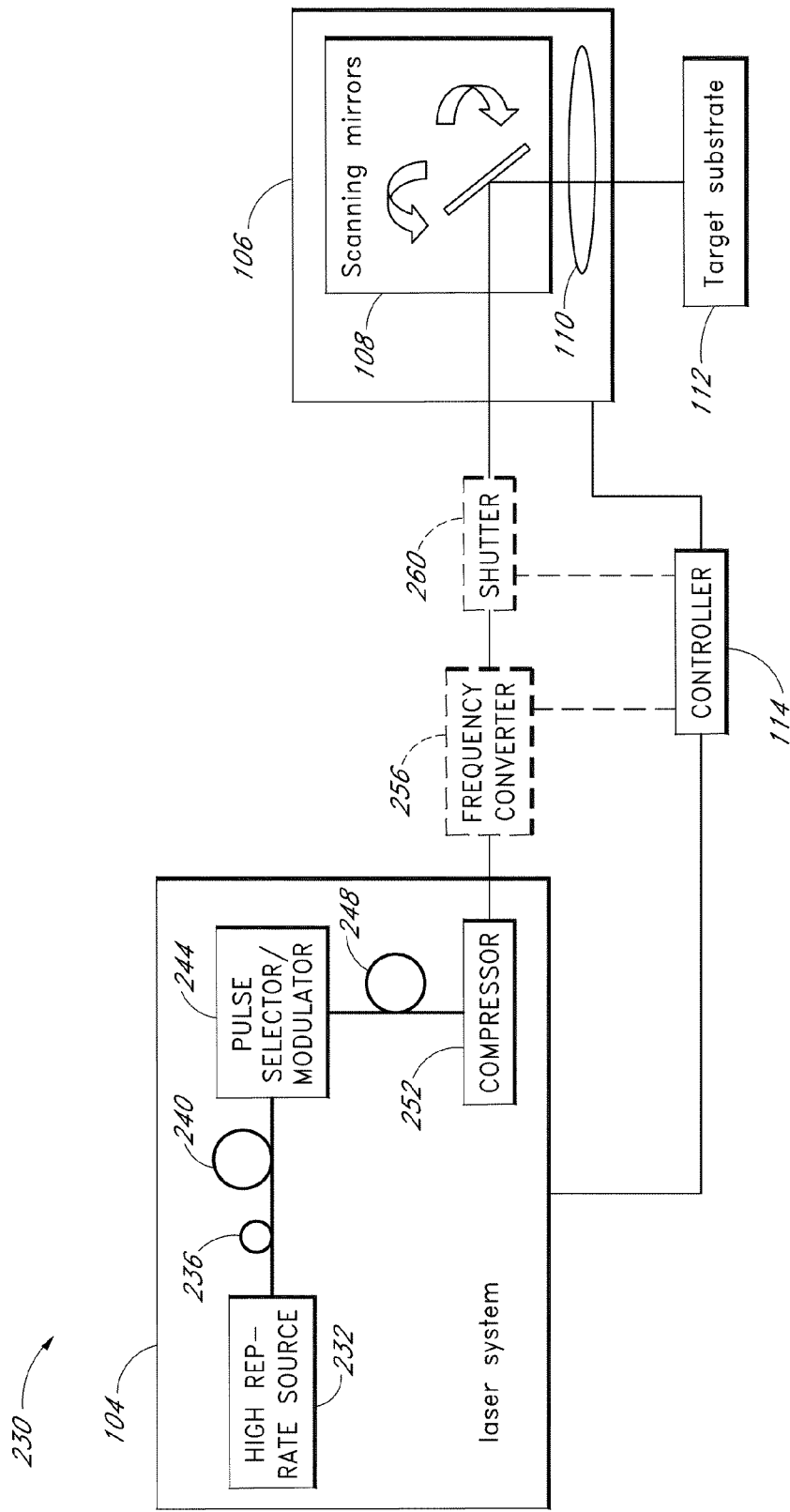

FIG. 2B schematically illustrates an embodiment of a system 230 capable of use for processing target substrates with ultrafast pulse trains. In this embodiment, the laser system 104 includes a chirped pulse amplification system such as, for example, a fiber-based chirped pulse amplification (FCPA) system. Advantages of using an FCPA system include improved efficiency and reliability. Also, since the output energy and peak-power of a fiber amplifier generally decrease as the repetition rate of the oscillator increases, with substantially constant average output power or with fixed pump power. The fiber amplifier output energy and power variation as a function of repetition rate may be exploited to provide improved FCPA performance.

Various U.S. patents assigned to the assignee of the present application disclose chirped pulse amplification systems using compact fiber configurations. The disclosure of each of the following U.S. patents is incorporated by reference herein for the material specifically referred to herein and for all other material that it discloses: U.S. Pat. No. 5,499,134, issued Mar. 12, 1996 to Galvanauskas, et al., entitled "Optical Pulse Amplification Using Chirped Bragg Gratings," U.S. Pat. No. 5,696,782, issued Dec. 9, 1997 to Harter, et al., entitled "High Power Fiber Chirped Pulse Amplification Systems Based On Cladding Pumped Rare-Earth Doped Fibers," and U.S. Pat. No. 7,113,327, issued Sep. 26, 2006 to Gu, et al., entitled "High Power Fiber Chirped Pulse Amplification System Utilizing Telecom-Type Components" (hereinafter referred to as "the '327 patent"). Any of the laser systems disclosed in these patents, as well as other commercially-available "all fiber" laser systems, may be used with the system 230 shown in FIG. 2B.

In certain embodiments, the laser system 104 comprises an FCPA µJewel laser (available from IMRA America, Inc., the assignee of the present application), which provides laser pulses at an output of a compressor 252. The output pulses may be generated at an adjustable repetition rate up to about 1 MHz. An output pulse may have an energy of about 1 µJ or higher, and a pulse width about 1 ps or shorter. In some embodiments, if the peak power and pulse energy are low enough to avoid non-linear effects, a fiber compressor, rather than a bulk output compressor, may be used for pulse compression. In certain embodiments, photonic bandgap fibers or photonic crystal fibers may be used alone or in combination with bulk compressors or large area fibers to provide for increased output energy and peak power.

In the embodiment of the system 230 schematically illustrated in FIG. 2B, the laser system 104 comprises a single-pass fiber-based chirped pulse amplification system. The laser system 104 includes a high repetition rate source 232, a fiber stretcher 236, a fiber pre-amplifier 240, a pulse selector/modulator 244, a fiber power amplifier 248, and a compressor 252. The output of the compressor 252 may be an ultrashort pulse train. In some embodiments, the compressor 252 may be detuned to provide longer pulse widths (e.g., about 200 ps). In other embodiments, the compressor 252 is not used, and the laser system 104 outputs pulses having widths up to about a nanosecond, a few nanoseconds, and/or up to about 10 nanoseconds. In some embodiments, the laser system 104 may include one of more of a single-pass and double-pass pre-amplifier, a single or double-pass stretcher, and power-amplifier arrangement (not shown), which may provide longer stretched pulse widths and higher pulse energy in a comparable package size. Some embodiments may comprise polarization maintaining (PM) fiber amplifiers, oscillators, and stretcher fibers. As described above, the controller 114 may be configured to coordinate delivery of the pulses to the target substrate 112 via the scanning system 106. In various embodiments, the controller 114 may be used to control some or all of the components of the laser system 104, the scanning system 106, and/or other system components. In one embodiment, the controller 114 is configured to control the laser system 104 by controlling the pulse selector/modulator 244. As described above, the scanning system 106 may include, for example, a scanning mirror 108 such as, e.g., a galvanometer scanning minor. The scanning system 106 may also include focusing optics 110.

The high repetition rate source 232 may provide a free-running pulse train operating at a repetition rate well above 1 MHz, for example, in a range of about 20 MHz to about 100 MHz. Mode-locked lasers, including all-fiber-based passive mode-locked or other devices, may be used to produce such repetition rates. Corresponding pulse widths may be in a range from about several hundred femtoseconds to about 10 picoseconds, for example. In other embodiments, non-mode locked laser sources may be used. For example, output of a quasi-cw semiconductor laser may be modulated and optionally compressed to produce picosecond or femtosecond pulses. Suitable laser sources include the sources described in U.S. patent application Ser. No. 10/437,057 to Harter, entitled "Inexpensive Variable Rep-Rate Source For High-Energy, Ultrafast Lasers," now U.S. Pat. No. 7,330,301, assigned to the assignee of the present application, and which is incorporated by reference herein for the material specifically referred to herein and for all other material that it discloses.

The fiber stretcher 236 may include a length of optical fiber (e.g., about 100 m to 1 km depending on fiber dispersion) to stretch pulses from the high repetition rate source 232 in order to avoid non-linear effects and/or damage to the fiber pre-amplifier 240 and/or the fiber power amplifier 248. The stretcher 236 may comprise a fiber Bragg grating (FBG), a chirped FBG, or a combination thereof. The stretcher 236 may comprise fiber having anomalous third order dispersion (TOD), so as to partially compensate residual TOD (if present) that may be accumulated in the system. In some embodiments, the majority of residual TOD results from the use of mismatched stretcher (fiber-based) and compressor dispersion (bulk-grating based). In various example embodiments, the width of a stretched pulse may be about 50 ps, in a range from about 100 ps to about 500 ps, or in a range up to about 1 ns. Pulse stretching may also be provided in double pass arrangements.

The fiber pre-amplifier 240, which is optional in some laser systems 104, amplifies the energy of a pulse emitted from the high repetition rate source 232. The source 232 may emit pulses with energies from about several hundred pJ to about 1 nJ, and up to about 5 nJ. In some embodiments, the pulse energy at the output of the pre-amplifier 240 may be above about 1 nJ, for example, in a range from about 1 nJ to about 20 nJ, and in some embodiments up to about 100 nJ. In some embodiments a large-mode amplifier may be used as a pre-amplifier so as to produce microjoule seed pulses. For example, various amplifier options developed by the assignee of the present application (e.g.: amplifiers utilizing a multi-mode fiber, large core leakage channel fiber, photonic crystal fiber, and/or photonic bandgap fiber) that provide a high quality output beam are further described below and useable as either pre-amplifiers, power amplifiers, or generally as at least a portion of a multistage amplifier.

The pulse selector/modulator 244 may be configured to selectively transmit pulses to the power amplifier 248. The pulse selector/modulator 244 may include an acoustic-optic modulator (AOM), an electro-optic modulator (EOM), a high speed Mach-Zehnder device (MZ), and/or an electro-absorption modulator (EAM). AOMs do not require high voltage electronics, and commercially available digital driver electronics provide ease of use. Mach-Zehnder modulators (MZs) are integrated optical devices having GHz bandwidths and low drive voltages, and in many cases, require a polarized input beam. In some embodiments, the relatively small area of an integrated MZ device may limit useable peak-power. In some embodiments, the pulse stretcher 236 reduces peak power incident on the modulator 244, as described in the '327 patent. MZ devices have been used at 1.55 µm telecom wavelengths, and MZ devices are now available at 1 µm wavelengths. The '327 patent discloses a chirped pulse amplification system using MZ modulators. In certain embodiments, the pulse selector/modulator 244 may provide for about 20 dB to about 30 dB of intensity control, and may be useable to at least partially control output intensity based on the transfer characteristic of the power amplifier 248 as a function of input.

In certain embodiments, the fiber power amplifier 248 comprises a multimode fiber amplifier configured to provide an output substantially in the fundamental mode. For example, the system may utilize a fiber power amplifier as described in U.S. Pat. No. 5,818,630, issued to Fermann, et al., entitled "Single-Mode Amplifiers and Compressors Based on Multi-Mode Fibers," assigned to the assignee of the present application, and which is incorporated by reference herein for the material specifically referred to herein and for all other material that it discloses. Multimode fiber amplifiers provide production of peak powers and pulse energies that are higher than those achievable in single-mode (SM) fibers before the onset of undesirable nonlinearities and gain saturation. In other embodiments, large-area amplifiers may be utilized, for example photonic bandgap or photonic crystal designs. High quality output beams were demonstrated with leakage mode designs, for example, as described in U.S. patent application Ser. No. 11/134,856, entitled, "Single Mode Propagation in Fibers and Rods with Large Leakage Channels," published as U.S. Patent Application Publication 2006/0263024, assigned to the assignee of the present application, and which is incorporated by reference herein for the material specifically referred to herein and for all other material that it discloses.

As described above, the compressor 252 is an all-fiber compressor in some embodiments. However, if peak power is too high, for example about 100 kW or greater in some implementations, non-linear effects may limit performance of an all-fiber compressor. A tradeoff may then exist between the compactness of a fiber design and the flexibility associated with a bulk compressor. In some embodiments, both fiber and bulk components may be used in the laser system 104.

The high repetition rate source 232 may produce pulses having an output wavelength of about 1 µm. In some embodiments, the system 230 comprises an optional frequency converter 256. For example, the frequency converter 256 may comprise a frequency doubler, a frequency tripler, and/or a frequency quadrupler producing respective visible (e.g., green) or ultraviolet output wavelengths (for 1 µm input wavelengths). In some embodiments the frequency converter 256 may comprise a parametric amplifier. Conversion efficiency is generally improved with higher peak intensity. Therefore, the frequency converter 256 advantageously may be positioned to receive the output of the compressor 252. In one example embodiment, the frequency converter 256 was configured to provide second, third, and fourth harmonic generation. Second harmonic generation was accomplished using a type I non-critically phase-matched lithium triborate (LBO) crystal. The third harmonic was produced by sum frequency mixing the fundamental and the second harmonic in a type II critically phase-matched LBO crystal. A type I LBO and type I beta barium borate (BBO) crystal can also be used in embodiments for 3rd harmonic generation, producing near UV output wavelengths. A type I critically phase-matched beta barium borate (BBO) crystal generated the fourth harmonic by frequency doubling the second harmonic light.

In this example embodiment, light having 50 µJ, 500 fs pulses at a fundamental wavelength of 1040 nm was input to the frequency converter 256, which provided 53%, 25%, and 10% conversion efficiency to second, third, and fourth harmonic frequencies, respectively. At a laser repetition rate of 100 kHz, this example embodiment produced an average power of about 5.00 W at 1040 nm, and average converted powers of about 2.62 W at 520 nm, about 1.20 W at 346 nm, and about 504 mW at 260 nm. The converted pulse energies were about 26 µJ at 520 nm, about 12 µJ at 346 nm, and about 5 µJ at 260 nm. Further details of a laser system 104 that may be used for providing frequency converted ultrashort pulses are described in "12 µJ, 1.2 W Femtosecond Pulse Generation at 346 nm from a Frequency-tripled Yb Cubicon Fiber Amplifier," by Shah, et al., 2005, CLEO 2005 Postdeadline, CPDB1, which is incorporated by reference herein for the material specifically referred to herein and for all other material that it discloses.

The controller 114 may be used to coordinates the positioning of the scanning beam and the selection of laser pulses. In certain embodiments, when the high repetition rate source 232 is free-running, a portion of the beam is detected using a length of optical fiber coupled to a high speed photodetector (not shown). The photodetector output provides a synchronization signal to the controller 114. The synchronization signal advantageously may be a digital signal. The scanning system 106 may include 2-D galvanometer mirrors 108 such as, for example, hurrySCAN® II 14 scan heads available from SCANLAB America, Inc. (Naperville, Ill.). Advantages of using such scan heads include that they are low inertia-devices and are provided with user-friendly commercially available controllers so that minor position and/or velocity signals are readily programmable. The scanning system 106 and the controller 114 may also be used with any suitable combination of translation stages, rotation stages, and robotic arm (not shown) to position the target substrate 112. In some embodiments the scanning minors 108 may be omitted and any other suitable system for relatively moving the laser beam and the target substrate 112 can be utilized. Suitable focusing optics 110 such as, for example, an F-theta lens and/or a high resolution objective may be used to focus each laser pulse onto the surface of or in the target material. Some refractive optical elements may introduce spot placement and focusing errors, or other temporal or spatial distortions, resulting from material dispersion. In certain embodiments, commercially available optic elements designed for ultrashort laser pulse beams are used. In certain embodiments, the controller 114 is configured to control spatial overlap between adjacent focused laser pulses (or groups of laser pulses) during processing of the target material.

In certain embodiments, it may be desirable to operate the amplifier(s) substantially continuously to reduce the likelihood of damage and to provide for maximum energy extraction from the amplifiers. Fiber amplifiers are well suited for amplifying high speed pulse trains. However, in some embodiments, increased risk of amplifier damage occurs and undesirable amplified spontaneous emission (ASE) is generated during extended periods where material processing does not occur ("idle periods"). For example, in some amplifiers, the idle time period may be in a range from tens of microseconds to hundreds of milliseconds or greater. In certain fiber amplifiers, an idle time of about 100 µs may be sufficient for gain to increase to a sufficient level for free-lasing under high gain (strong pumping) conditions. After about 25-40 µs of idle time, if a seed pulse is injected, the built up gain in the amplifier may have sufficient gain to create a high energy pulse capable of inducing damage to the output fiber facet. Accordingly, in certain embodiments, stabilization and protection of the laser components is provided by dynamic adjustment of the input pulse energy and/or control of a pump diode current as described, for example, in U.S. patent application Ser. No. 10/813,173, to Nati, et al., entitled "Method And Apparatus For Controlling And Protecting Pulsed High Power Fiber Amplifier Systems," published as U.S. Patent Application Publication No. 2005/0225846, now U.S. Pat. No. 7,505,196, assigned to the assignee of the present application, and which is incorporated by reference herein for the material specifically referred to herein and for all other material that it discloses.

In various embodiments of the system 230, the controller 114 can be configured to operate the pulse selector/modulator 244 at a high repetition rate (e.g., from about 50 MHz to about 100 MHz) during idle periods. During idle periods, the amplifier 248 is generally operating in a non-saturated regime. The power amplifier average output may slightly increase at the fundamental wavelength. Modulation of the pulse energy between an idle period and an "active" period (when the system 230 is processing the target) may be sufficient to provide rapid shuttering of the beam (e.g., "off" and "on" functionality). In some implementations, the laser fluence on the target substrate 112 during some "idle" periods may be above the ablation and/or surface modification thresholds, but the modulation in fluence between "idle" and "active" periods may be sufficient for process control. In some embodiments, an optional shutter 260 may be used to control the energy incident on the target substrate 112. The optional shutter 260 may comprise an acousto-optic device, an opto-mechanical shutter, and/or an electro-optic shutter.

Certain embodiments of the system 230 include a frequency converter 256 that may provide, for example, frequency doubling and/or tripling. In certain such embodiments, the pulse energy and/or the peak power may be relatively low at the output of the frequency converter 256. In such cases, output of the converter 256 may be a relatively low energy pulse with most energy content at the fundamental wavelength and, at focus on the target; the energy may be below the ablation and/or surface modification thresholds of the target material. In some system embodiments, modulator adjustment of about 20 dB to about 30 dB may provide control of intensity over a wide operating range so as to avoid altering target material properties.

In certain embodiments, techniques may be used to attenuate unwanted beam energy. For example, unwanted energy may be removed with a spectral filter (not shown). In some implementations, polarization filtering may be possible, because of the difference in polarization state between fundamental and harmonic frequencies for Type I phase matching. The pulse selector/modulator 244 also may be controlled to limit the energy to the amplifier 248. Focusing optics in the scanning system 106 (or other focusing optics if a scanner is not used) may be optimized for the machining wavelength (which may be a frequency converted wavelength if the optional frequency converter 256 is used). In some implementations, the focusing optics may be configured so that the spot size of the fundamental wavelength is increased so that the energy density at the surface of the target substrate 112 is reduced.

During active processing periods, the controller 114 may be used to provide signals to the pulse selector/modulator 244 to "down count" or otherwise select pulses. In some embodiments, processing repetition rates may be from about 100 KHz to about 10 MHz. During active processing, it may be advantageous for the laser to operate in saturation, or approximately so, in order to extract the maximum energy from the fiber amplifier.

FIG. 3 schematically illustrates an embodiment of a system 300 capable of use for machining a workpiece (or target substrate) 112 via ultrafast pulse trains. This system 300 may be generally similar to the embodiments depicted in FIGS. 1F and 2A, 2B. The system 300 may further comprise a robotic arm system 304 coupled to the target substrate 112 and configured to manipulate the target position (and/or orientation) relative to the scanning beam. The robotic arm system 304 may be a single-axis or a multi-axis system. In some embodiments, the scanning system 106 comprises a scan head that is moved with respect to the target substrate 112. A possible advantage of embodiments providing relative movement between the scan beam and the target substrate 112 is that the system may enable processing of non-flat surfaces.

In some embodiments of the systems 100, 200, 230, and 300 schematically shown in FIGS. 1-F, 2A, 2B and 3, respectively, the laser spot size is primarily determined by the F-theta lens in the scanning system 106. In some implementations, in order to have reasonable processing area for images, spot sizes larger than about 10 µm are used. Certain embodiments of the laser system 104 are capable of machining much smaller spot sizes (e.g., ≤1 µm). For such small focal dimensions, significantly lower pulse energy is used in some embodiments. In order to achieve sufficiently high resolution over a sufficiently large working area, the target and the beam may be moved with respect to each other. For example, the target may be moved relative to a substantially stationary laser beam (or vice-versa). In some implementations, both the target and the laser beam are moved.

In certain embodiments of the systems 100, 200, 230, and 300, a variable telescope can be positioned along an optical path between the laser system 104 and the scanning system 106. In certain such embodiments, the F-theta lens may be omitted from the scanning system 106. The variable telescope may be used to dynamically vary the focal length of the system and may provide continuous variation of the focal spot size on the target substrate 112. A commercially available variable telescope system may include, for example, the variOSCAN dynamic focusing unit available from SCANLAB America, Inc. (Naperville, Ill.). Such a system, with dynamic focusing, provides capability for 3D adjustment of the beam focal position, and useful capability for following or compensating variations in the target surface locations, as might be caused by substrate warpage or other deviations from flatness.

Figure 4A:
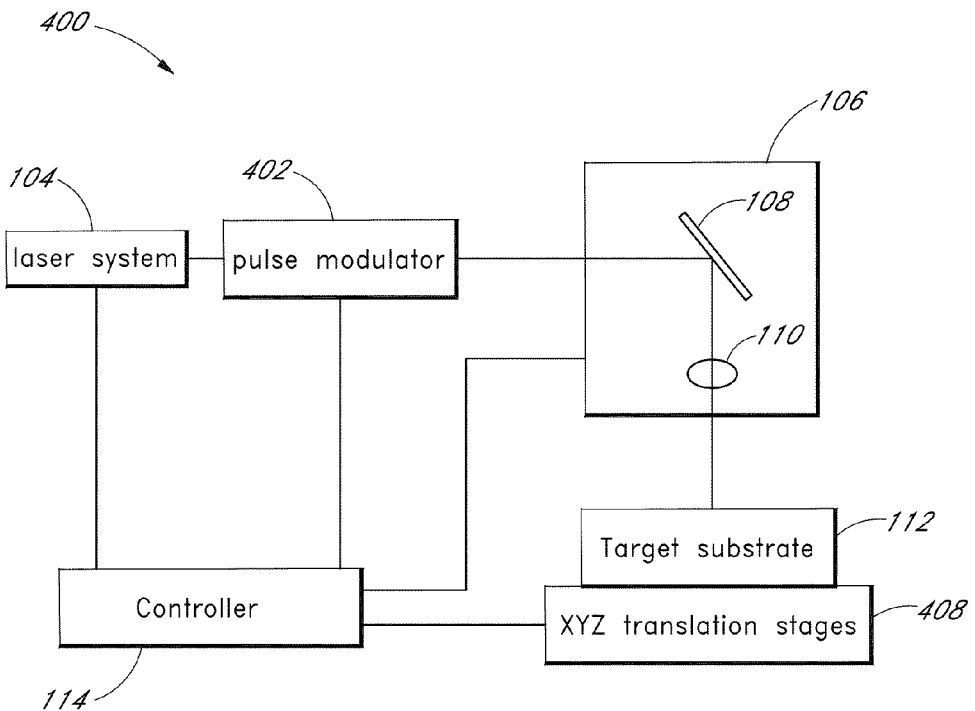
FIG. 4B schematically illustrates an embodiment of a large mode area fiber comprising a core doped with rare earth ions that can be used in a fiber amplifier or in a laser pumped by a multimode pump source FIG. 5 schematically illustrates a further embodiment of a system for processing a workpiece with laser pulse trains, the system having feedback and controls based on process and/or target information.

FIG. 4A schematically illustrates an embodiment of a system 400 capable of use for processing composite material substrates with ultrafast pulse trains. This embodiment comprises a laser system 104 and a translation stage 408 configured to move the target substrate 112 relative to the laser beam. In certain embodiments, the translation stage 408 remains in substantially constant motion with relatively high translation speeds in order to enable sufficiently high processing speeds. In some embodiments, the translation stage 408 may include an X-Y or an X-Y-Z translation stage. For example, the translation stage 408 may include a Nano-Translation (ANTTM) stage available from Aerotech, Inc. (Pittsburgh, Pa.). Many techniques for relatively controlling positioning of a pulsed laser beam and a target substrate are known such as, for example, as described in U.S. Pat. No. 6,172,325 to Baird, et al., entitled "Laser Processing Power Output Stabilization Apparatus and Method Employing Processing Position Feedback." In some embodiments, the controller 114 may execute control instructions for coordinating the scanning system 106 and the translation stage 408 such as, for example, the Nmark™ control software available from Aerotech, Inc. (Pittsburgh, Pa.).

In some embodiments of the system 400 schematically shown in FIG. 4A, a modulator 402 may be used to provide substantially instantaneous laser modulation for improved control of the laser-material interaction. The modulator 402 may be generally similar to the modulator 202 described with reference to FIG. 2, or the modulator 402 may be an external modulator as schematically depicted in FIG. 4A. In certain embodiments, the controller 114 provides linked control of the modulator 402 and the translation stage 408.

Figure 5:
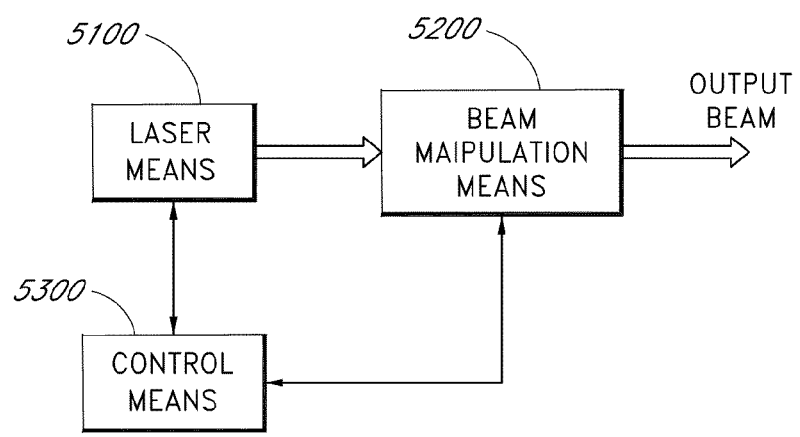
Figure 6A:
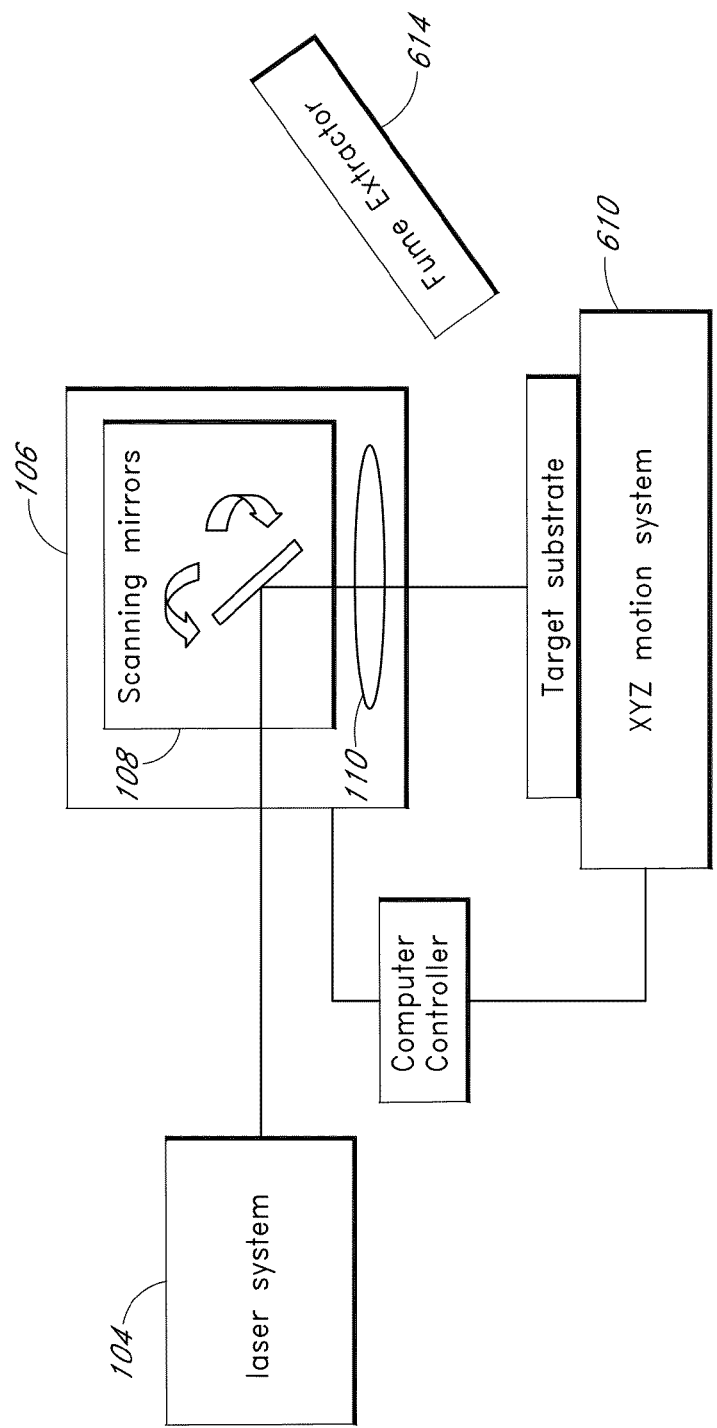
FIGS. 6A and 6B show a schematic representation and a line drawing, respectively, illustrating an experimental system corresponding to an embodiment for processing a workpiece with laser pulse trains.

In certain embodiments, the systems described herein (e.g., the systems 100, 200, 230, 300, 400, and the systems schematically shown in FIGS. 5 and 6A) may process a target substrate using multiple passes of a laser beam relative to the target substrate. For example, ten or more passes may be used in various embodiments, and perhaps hundreds for formation of very high aspect ratio features. The fluence (and/or other system and/or beam parameters) may be adjusted to control the material removal during a given pass.

In various embodiment the system the system may utilize information regarding the state of the laser system of target and, based on feedback signals, control laser parameters as described in, for example, U.S. patent application Ser. No. 10/813,269, filed Mar. 31, 2004, entitled "Femtosecond laser processing system with process parameters, controls and feedback," now U.S. Pat. No. 7,486,705 (hereinafter, the '705 patent) assigned to the assignee of the present application, and which is incorporated by reference herein for the material specifically referred to herein and for all other material that it discloses.

In some embodiments, a system may be provided wherein each laser pulse may have individualized characteristics. At least one of the laser pulses may be an ultrashort pulse. The system may comprise a laser means for generating a pulse or high repetition rate bursts of pulses as provided in one or more of the embodiments 100, 200, 230, 300, 400, and the systems schematically shown in FIGS. 5 and 6A. Additionally a control means that controls the laser means and a beam manipulation means for monitoring the pulse width, wavelength, repetition rate, polarization, and/or temporal delay characteristics of the pulses comprising the pulse bursts may be included. In some embodiments, the system may generate feedback data based on the measured pulse width, wavelength, repetition rate, polarization and/or temporal delay characteristics for the control means.

In one embodiment, the laser means may comprise a fiber amplifier that uses stretcher gratings and compressor gratings. The beam manipulation means can comprise a variety of devices including, e.g., an optical gating device that measures the pulse duration of the laser pulses, a power meter that measures the power of the laser pulses output from the laser means, and/or a photodiode that measures a repetition rate of the laser pulses. In some embodiments where a frequency converter is utilized, for example a doubler or tripler, a beam manipulation means optically converts the fundamental frequency of a percentage of the generated laser pulses to one or more other optical frequencies, and includes at least one optical member that converts a portion of the fundamental of the laser pulses into at least one higher order harmonic signal. The optical member may comprise a non-linear crystal device with a controller that controls the crystal's orientation.

In certain embodiments, the means for converting an optical frequency advantageously includes a spectrometer that measures one or more predetermined parameters of pulses output from the non-linear crystal device and generates feedback for the control means. Another embodiment of the beam manipulation means comprises telescopic optical devices to control the size, shape, divergence, and/or polarization of the laser pulses input, and steering optics to control an impingement location of the laser pulses on a target substrate. The system may further comprise a beam profiler that monitors characteristics of laser pulses and generates feedback for the control means. The above-described system has several uses including, but not limited to, modifying the refractive index of a target substrate; surface marking, sub-surface marking, and/or surface texturing of a target substrate; fabricating holes, channels, trenches, grooves, vias, and/or other features in a target substrate; and depositing and/or removing thin layers of material on a target substrate.

As shown in the embodiment of a laser processing system illustrated in FIG. 5, the control means 5300 is coupled to the laser means 5100. The laser system may be generally similar to an embodiment of the laser system schematically illustrated in FIG. 5 of the '705 patent. The control means 5300 monitors several output laser parameters, such as, for example, the average output power, the pulse train (repetition rate and/or burst mode structure), pulse duration (and/or temporal phase, e.g., FROG, frequency resolved optical gating), and/or spatial phase (wavefront sensor). The monitored parameters are linked to the control means 5300 in order to vary laser performance (pulse energy, repetition rate and pulse duration) through feedback loops. Furthermore, the feedback loops may be linked to compressor alignment (e.g., grating separation) in order to pre-chirp the laser pulse, thereby compensating for the optical dispersion caused by the components in subsequent laser system modules. The control means 5300 may comprise, for example, a desktop computer, a laptop computer, a tablet computer, a handheld computer, a workstation computer or any other general-purpose and/or special-purpose computing or communicating device. The control means 5300 may execute any of the well-known MAC-OS, WINDOWS, UNIX, LINUX, or other appropriate operating systems on a computer (not shown). The control means 5300 may be networked to other computing means by physical links and/or wireless links. The control means 5300 may comprise an input device, an output device, random access memory (RAM), and/or read-only memory (ROM), a CD-ROM, a DVD device, a hard drive, and/or other magnetic or optical storage media, or other appropriate storage and retrieval devices. The control means 5300 may also comprise a processor having a system clock or other suitable timing device or software. The input device might comprise a keyboard, mouse, a touch screen, pressure-sensitive pad or other suitable input device, and the output device can comprise a video display, a printer, a disk drive or other suitable output device.

In some embodiments, additional tools may be included to monitor the status of the target substrate, and/or to confirm/control the focal position relative to the surface of the target substrate. For example, an illumination and optical microscopic viewing system (not shown) could be used to locate alignment markers, confirm/deny laser damage, and measure laser affected feature volume and/or morphology. Additional data could be obtained by including spectroscopic diagnostics such as laser induced breakdown spectroscopy (LIBS) and/or laser-induced fluorescence. A range-finding tool that precisely determines the distance from the target surface to the focal point could also be employed. In some applications, determining the distance may be advantageous since one application may include micron-level material processing. Use of a camera system that images the surface of the target substrate could be used as well. At these dimensions, small error/uncertainty may reduce the user's ability to precisely control the laser/material interaction. This may be complicated since several such applications potentially involve sub-surface processing of materials with non-planar surfaces. Signals from the viewing/spectroscopic tools could feedback to other system components (e.g., the control means, the means for converting optical frequencies, etc.) to precisely influence the extent and nature of the laser/material interaction. Furthermore, the signal from the range finding tool and/or the viewing/spectroscopic tools can be fed back to the control workpiece positions. The scanning mechanism steering optics, which may include a galvanometer based minor scanner and possibly one or more additional precision positioners, and control means 5300 provide that the beam is accurately delivered to the target substrate.

In some embodiments, processing may be carried out with a train of picoseconds pulses having total energies sufficient for material removal. For example, pulse widths may be in a range of about 10 ps to about 500 ps. In some embodiments, a pulse compressor may not be utilized. In such embodiments, pulses from one or more laser sources may be amplified to produce the processing pulses. Such a configuration may be generally similar to embodiments of the systems 100, 200, 230, 300, and 400, but with omission of a pulse compressor.

Embodiments are applicable for many micromachining applications, and well matched to applications in microelectronics including, for example, cutting, dicing, scribing, and similar applications. In some applications, suitable modifications of elements shown in the system embodiments 100, 200, 230, 300, and 400, and the systems schematically shown in FIGS. 5 and 6A may be made using methods and devices adapted for such applications. For example, in one embodiment, a substrate positioning mechanism may include the X-Y-Z stage 408, and additional rotation mechanism(s) to provide 6-axis capability and/or to maintain flatness and coplanarity of the target substrate (e.g., a PCB).

Certain embodiments of the systems 100, 200, 230, 300, and 400, and the systems schematically shown in FIGS. 5 and 6A include various combinations of laser and amplifier(s). Although fiber-based technology is preferred in some embodiments, various embodiments may utilize waveguide lasers and/or amplifiers, regenerative amplifiers, and so forth. In some embodiments, the technologies may be used in combination with fiber amplifiers, lasers, and/or a length of un-doped transmission fiber. For example, in one embodiment, a passively Q-switched microchip laser may produce several microjoules of pulse energy at repetition rates somewhat below one MHz, for example up to about 100-500 kHz, and somewhat larger. Pulse widths may be in the range of about 1 ps to about 100 ps. In some embodiments a microchip laser may seed a fiber amplifier, for example as disclosed in the above-incorporated U.S. patent application Ser. No. 10/437,057 to Harter (now U.S. Pat. No. 7,330,301).

For example, the above-incorporated U.S. patent application Ser. No. 10/437,057 discloses various embodiments utilizing seed and microchip laser sources which are amplified and compressed with various fiber and non-fiber elements to produce ultrashort pulse widths. In one embodiment seed pulses of a few nanoseconds are generated using a semiconductor laser diode, portions thereof are selected using a GHz electro-optic modulation, and then further processed so as to obtain amplified and compressed pulses. Typical repetition rates are less than about 10 MHz. The disclosed arrangements provide elements and sub-systems useable by a person skilled in the art to construct relatively high repetition rate (e.g., 500 kHz-10 MHz) short pulses (sub-picosecond to about a few nanoseconds) so as to create geometric features within a predetermined tolerance, and with reduced accumulation of redeposited material on or very near to a processing location when operated at the higher repetition rates.

Various embodiments may provide pulse widths in the range of about a few hundred picoseconds to several hundred picoseconds. The laser system may comprise an FCPA system. In some embodiments that utilize picosecond or longer pulses any pulse compressor may be eliminated. Alternatively, a system may be configured to produce amplified picosecond pulses without chirped pulse amplification, e.g., preferably with a fiber amplifier system.

Referring back to FIG. 4A, the laser system 104 may include a mode-locked fiber oscillator or other seed source, and a fiber amplifier system having a fiber power amplifier. In various embodiments the fiber power amplifier comprises a multimode fiber amplifier configured to provide an output substantially in the fundamental mode. For example, the system may utilize a fiber power amplifier as described in U.S. Pat. No. 5,818,630, issued to Fermann, et al., entitled "Single-Mode Amplifiers and Compressors Based on Multi-Mode Fibers," assigned to the assignee of the present application, and which is incorporated by reference herein for the material specifically referred to herein and for all other material that it discloses. Multimode fiber amplifiers provide production of peak powers and pulse energies that are higher than those achievable in single-mode (SM) fibers before the onset of undesirable nonlinearities and gain saturation. In other embodiments, large-area amplifiers may be utilized, for example photonic bandgap or photonic crystal fiber designs. High quality output beams were demonstrated with leakage mode designs, for example, as described in U.S. patent application Ser. No. 11/134,856, entitled, "Single Mode Propagation in Fibers and Rods with Large Leakage Channels," published as U.S. Patent Application Publication 2006/0263024, assigned to the assignee of the present application, and which is incorporated by reference herein for the material specifically referred to herein and for all other material that it discloses.

Figure 4B:
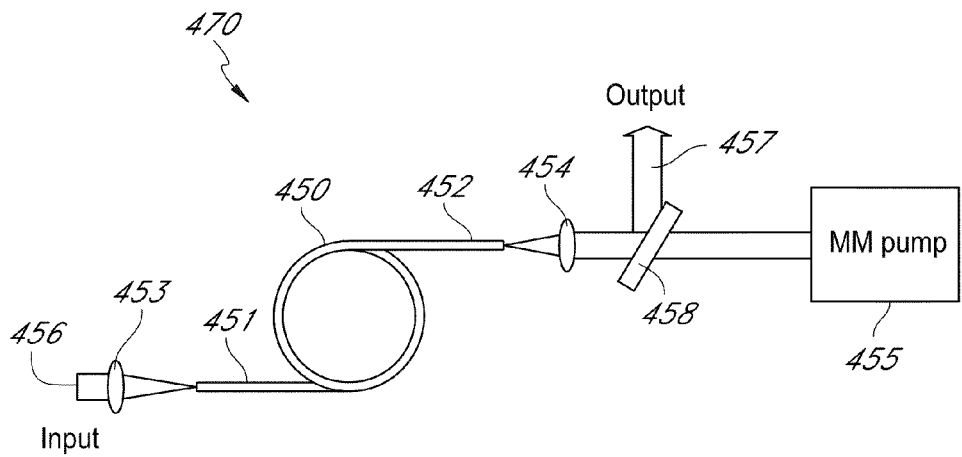

In at least one embodiment the amplifier may be included in laser system 104. FIG. 4B schematically illustrates an example embodiment 470 of a large mode area fiber comprising a core doped with rare earth ions that can be used in a fiber amplifier, or in a laser pumped by a multimode pump source. For example, the embodiment 470 can be included in the laser system 104 schematically shown in FIG. 4A (or other systems described herein). Input beam 456 may be generated with a mode-locked oscillator, semiconductor diode, diode and electro-optic modulator, and/or other suitable source. Prior to amplification with the large-mode amplifier, a preamplifier may boost the pulse energy levels. The laser system 104 may also include pulse selectors, polarization controllers, and/or beam shaping optics to condition pulses prior to and/or after amplification. In the embodiment 470 illustrated in FIG. 4B, the fiber 450 has straight input and output ends 451, 452, respectively, and a coiled section therebetween. A multimode pump 455 is used to pump the amplifier or laser using a coupling lens 454. Input beam 456 is launched into the fiber 450 through a lens 453. Output 457 is separated by dichroic minor 458. In other embodiments, the fiber 450 and/or other components may be configured differently than schematically shown in FIG. 4B. Also, various components can be removed, added, and/or arranged differently than shown in the example embodiment 470 illustrated in FIG. 4B.

Various laser or amplifier embodiments may be utilized in an all-fiber design for generation of high peak power pulses in the femtosecond, picosecond, and/or nanosecond regimes with reduced or negligible non-linear effects. The laser or amplifiers may also be utilized in FCPA systems to further increase available pulse energy. In one example embodiment a core diameter of about 70 μm-100 μm or larger may be used to produce nanosecond pulses having energy of a few mJ to about 10 mJ. In another embodiment, ultrashort pulses with example pulse widths of about 1-10 ps may be produced with output energies in the range of about 10 μJ to a few hundred μJ. Pulse repetition rates greater than about 100 KHz, and up to at least a few MHz may be utilized in various embodiments. Repetition rates in the range of 100 MHz to 1 GHz are also possible, depending on the average power rating and system requirements. By way of example, and as disclosed in PCT Application No. PCT/US2008/074668 entitled "Glass Large-Core Optical Fibers", published as International Publication No. WO 2009/042347, and as disclosed in U.S. Patent Application Publication No. 2010/0157418, each of which is owned by the assignee of the present application and each of which is incorporated by reference herein for the material specifically referred to herein and for all other material that it discloses, input pulses at 25 kHz repetition rate, 5 μJ pulse energy, and 600 ps pulse width emitted from a microchip laser were amplified to about 400 μJ in a large-core leakage channel fiber, producing nearly diffraction limited output beams, and without distortion caused by non-linear effects. In the experiment no pulse stretching or compression was utilized. Higher pulse energies and repetition rates are achievable. Therefore, many possibilities exist for fiber-based amplified laser configurations.

Various embodiments for PCB dicing may include an ultrashort pulse system as above, for example an FCPA, with any suitable combination of substrate and/or beam positioning equipment. In one implementation translation stage(s) 408 may be used to position the substrate, as illustrated in FIG. 4A. The positioner(s) may be used alone or in combination with an optical scanner to position the substrate relative to the ultrashort laser pulses. In some embodiments the scanning minors 108 may be omitted and any other suitable system for relatively moving the laser beam and the target substrate 112 utilized. Laser processing equipment and/or a target substrate may be positioned relatively to each other. Numerous positioning configurations are known for PCB drilling and other laser processing applications and any suitable combination of mechanisms may be utilized in systems for processing composite materials, including multiple beam positioners to improve throughput. For example, suitable combinations of beam and/or substrate positioning mechanisms as illustrated in FIGS. 2A-4A and 6A may be utilized. Also, as set forth above, additional tools may be included to monitor the status of the target substrate, and/or to confirm/control the focal position relative to the surface of the target substrate.

Various Embodiments and Examples

In another general aspect, a method of laser processing a composite material workpiece includes irradiating at least one material of the composite material workpiece with laser pulses having a pulse width. The laser pulses may be focused onto spots in the at least one material. The method includes moving the focused spots relative to the composite material at a relative speed. In some implementations, the workpiece comprises a patterned region and a composite material region. The patterned region may include electronic circuits comprising dielectric and/or metal materials. In some embodiments, the relative speed of the laser spot used for removal of at least a portion of the patterned region is substantially less than the relative speed used for removal of at least a portion of the composite material.

In some embodiments, an overlap between adjacent focused spots is substantially greater for irradiation of the patterned region than for irradiation of the certain portion of the composite material. For example, the overlap for irradiation of the patterned region may be greater than about 95% in some cases.

In some embodiments, at least a portion of material within the composite material region is modified using a pulse width in a range of about 100 fs to about 500 ps.

At least one implementation includes an ultrashort pulse laser system suitable for carrying out embodiments of the above methods of laser processing. At least one embodiment includes an ultrashort pulse laser system that comprises at least one of a fiber amplifier or a fiber laser. At least one embodiment includes an ultrashort pulse laser system configured as an "all-fiber" design.

In various embodiments, a pulsed laser system provides a pulse width of at least one pulse that is less than about 10 ps In some embodiments, a pulse width of at least one pulse is less than about a few nanoseconds, for example a sub-nanosecond pulse.

Embodiments of a method of scribing, dicing, cutting, or processing to remove material from a region of a composite material workpiece are provided. In some embodiments, the method comprises directing laser pulses toward at least one material of a composite material workpiece. The laser pulses can have a pulse width in a range from tens of femtoseconds to about 500 picoseconds and a pulse repetition rate of a few tens of kHz to about 10 MHz. In some embodiments the composite material workpiece may comprise both a pattern and a composite material board, and the pattern may include electric circuits comprising dielectric and/or metal materials. In some embodiments the composite material may comprise a structured property enhancing material and a structure fixing material, and may include any suitable combination of dielectric, metal, semiconductor, or composite material(s). The method can also include focusing the laser pulses into lasers spots having spot sizes in a range from a few microns to about 50 μm ($1/e^2$) and positioning the laser spots relative to the at least one material at a rate such that an overlap between adjacent focused spots for removal of material from at least a portion of the pattern is substantially greater than an overlap between adjacent focused spots for removal of material from at least a portion of the composite material board. In certain advantageous implementations, the method controls heat accumulation within one or more materials of the workpiece, while limiting accumulation of redeposited material about the region.

Embodiments of a method of processing a workpiece that comprises a pattern and a composite material substrate are provided. The pattern can comprise at least one of a dielectric material and a metal material. In some embodiments, the method includes modifying at least a portion of the pattern with a laser pulse comprising a pulse width in the range from about 10 ps to about 500 ps and modifying at least a portion of the composite material with a laser pulse comprising a pulse width in a range from about 100 fs to about 10 ps.

Embodiments of a method of laser processing a multi-material workpiece having a composite material are provided. In some embodiments, the method comprises focusing and directing laser pulses to a region of the workpiece at a pulse repetition rate in a range from about a few tens of kHz to about 10 MHz and at a repetition rate sufficiently high so that material is efficiently removed from the region and a quantity of unwanted material within or proximate to the region is limited relative to a quantity obtainable at a lower repetition rate below about 100 kHz.

In other embodiments, methods of laser processing a multi-material workpiece having a composite material are provided. The composite material may comprise a structured property enhancing material and a structure fixing material. In some such embodiments, the method comprises repeatedly irradiating at least one target material of the workpiece with focused laser pulses during relative motion of the focused laser pulses with respect to the at least one target material of the workpiece at a relative speed rate. The laser pulses have a pulse repetition rate that may be in a range of at least about a few tens of kHz to about 10 MHz, and the relative speed rate may be in a range of about 1 mm/s to about 20 m/s. In various embodiments of the method, at least some of the focused laser pulses have a non-zero spatial overlap factor with at least one other pulse, a pulse width less than about 1 ns, a pulse energy in a range of about 100 nJ to about 25 μJ, a focused ($1/e^2$) spot size in a range of about 5 μm to about 50 μm, and a fluence in a range of about 0.25 J/cm² to about 30 J/cm² at the target material.

Embodiments of method of processing a multi-material workpiece are disclosed. The workpiece can comprise a composite material board and a pattern, and the pattern may include electronic circuits comprising a dielectric material and/or a metal material. The composite material may comprise a structured property enhancing material and a structure fixing material. In some embodiments, the method comprises irradiating the workpiece with a series of laser pulses, with at least two pulses of the series having different characteristics that are applied to different materials of the workpiece. The method also comprises controlling HAZ such that at least one HAZ generated during removal of at least one of the dielectric material and the metal material is increased depthwise relative to at least one HAZ generated during removal of a portion of the composite material.

Embodiments of a method of processing a workpiece comprising both a pattern and a composite material board region are disclosed. The composite material may comprise a structured property enhancing material and a structure fixing material. The pattern can comprise a dielectric material and a metal material. In some embodiments, the method comprises modifying at least a portion of the pattern with focused laser pulses, with at least one focused pulse comprising a pulse width in a range of about 100 fs to about 500 ps. The method also includes accumulating sufficient heat in the portion of the pattern to reduce or avoid delamination of the dielectric material from the metal material.

Embodiments of a laser-based system for scribing, dicing, cutting, or processing a multi-material workpiece having a composite material are provided. The composite material may comprise a structured property enhancing material and a structure fixing material. In some embodiments, the laser-based system comprises a source of optical pulses and an optical amplification system configured to amplify a pulse from the source to a pulse energy of at least about 1 μJ and to generate output optical pulses having at least one pulse width in a range from about 500 fs to a few hundred picoseconds. The system may also include a modulation system, comprising at least one optical modulator, configured to adjust a repetition rate of the output optical pulses to be within a range from about a few tens of kHz to about 10 MHz, and a beam delivery system configured to focus and deliver pulsed laser beams to the workpiece, such that a pulsed beam is focused into a spot size ($1/e^2$) in a range from about 15 μm to about 50 μm. The system may also include a positioning system configured to position the beams relative to the one or more materials of the workpiece at a relative speed in a range from about 1 mm/sec to about 20 m/sec, and a controller configured to be coupled to at least the positioning system. The controller can be configured to control a spatial overlap between adjacent focused beams during processing of the workpiece at the repetition rate.

Embodiments of a laser-based system for scribing, dicing, cutting, or processing of a multi-material workpiece having a composite material are described herein. The composite material may comprise a structured property enhancing material and a structure fixing material. Embodiments of the system comprise a source of optical pulses and an optical amplification system configured to amplify a pulse from the source and to generate output pulses having at least one pulse width in a range from tens of femtoseconds to about 500 picoseconds. The system can also include a modulation system, including at least one optical modulator, configured to provide a repetition rate of the output optical pulses to be in a range from at least about 1 MHz to less than about 100 MHz. The system also can include a beam delivery system configured to focus and deliver pulsed laser beams to the workpiece, such that a pulsed beam is focused into a spot size ($1/e^2$) of at least about 5 microns, and a positioning system configured to position the pulsed laser beams relative to the multi-material workpiece in such a way that produces a spot overlap on or within the one or more materials of the workpiece. The spot overlap in various implementations may be at least about 95% at the repetition rate and the spot size.

Embodiments of a system for dicing, cutting, scribing, or forming features on or within a workpiece having a composite material are provided. The composite material may comprise a structured property enhancing material and a structure fixing material. In some embodiments, the system comprises a pulsed laser system configured to repeatedly irradiate at least a portion of the material with focused laser pulses during motion of the focused laser pulses relative to the workpiece.

The laser pulses have a pulse repetition rate. The repetition rate can be in a range of about 100 kHz to about 5 MHz and sufficiently high to efficiently remove a substantial depthwise portion of material from a target location and to limit accumulation of unwanted material about the target location. The system can also include a beam delivery system configured to focus and deliver the laser pulses, and a positioning system configured to position the laser pulses relative to the composite material substrate during the motion. The positioning system can comprise at least one of an optical scanner, a substrate positioner or both. In some embodiments, a controller is configured to be coupled to the pulsed laser system, the beam delivery system, and the positioning system. The controller can be configured to control a spatial overlap between adjacent focused laser pulses during processing of the workpiece at the repetition rate.

EXAMPLE EXPERIMENTAL RESULTS

Cutting Example with Ultrashort Pulses in Comparison with ns Pulses

Experiments were carried out to compare cutting results obtained with ultrashort pulses and nanosecond pulses. The system configuration used was similar to the system schematically illustrated in FIG. 6A. In these experiments, the laser system 104 comprised a D-10K laser to provide ultrashort pulses and comprises a fiber-based ns laser unit to provide ns pulses; both lasers are made by IMRA America Inc. (Ann Arbor, Mich.).

The experimental arrangement is schematically illustrated in FIG. 6A. For the ultrashort pulse experiments, laser system 104 provided more than 10 μJ of available pulse energy, pulse widths in a range from about 500 fs to about 500 ps, and a repetition rate exceeding 100 kHz. The laser parameters of the experimental system were varied, although not necessarily all the parameters were independent of each other. For example, pulse energy influences the minimum achievable pulse width. In some experiments, a focused spot size at the substrate surface was about 15 μm, which at an energy of about 10 μJ provides an average fluence of about 5-6 $J/cm^2$ and a power density of about 1013 $W/cm^2$. At a repetition rate of 500 kHz, the average power produced by the system is about 5 W in some experiments.

Figure 6B:
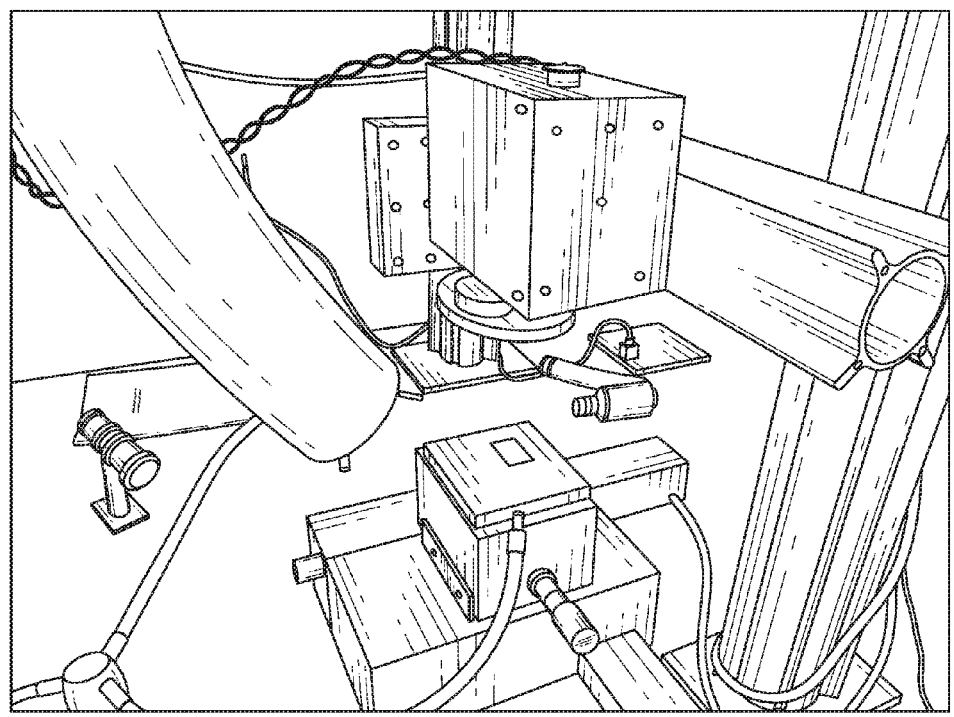

A line drawing of the system is shown in FIG. 6B. The experimental setup includes a fume extractor 614, which is operable to remove particulate fumes generated during machining. The fume extractor 614 was operated at an extraction rate of approximately 350 cubic feet per minute. The experimental setup included an XYZ motion system 610.

Measurement Tools, Methods, and Specifications

Figure 7:
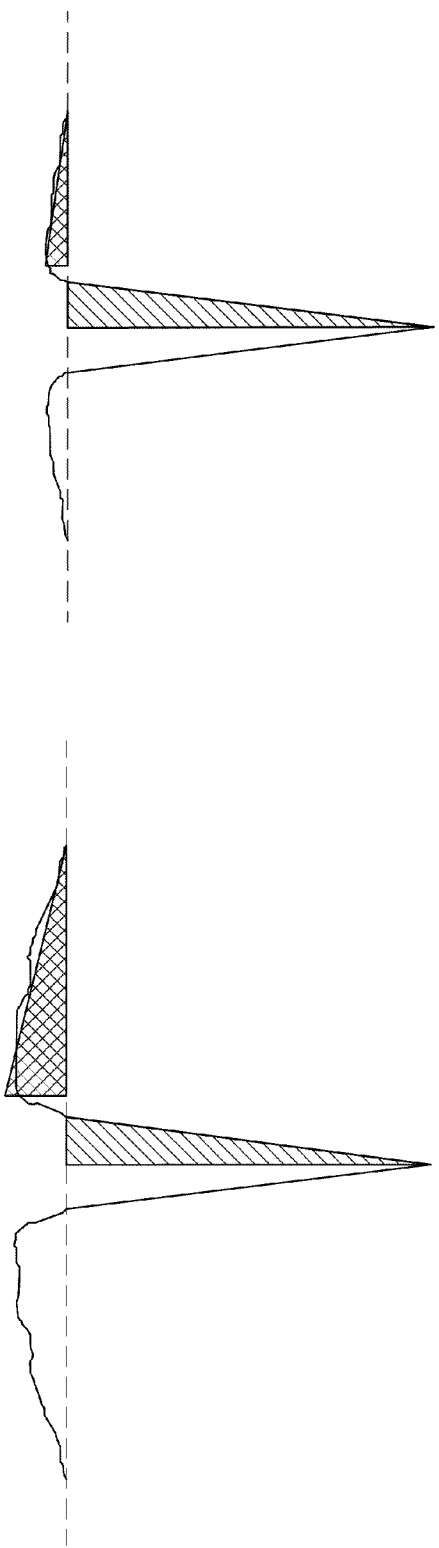
FIG. 7 schematically illustrates one example technique for quantifying processing quality so as to obtain an approximation of an ablated volume and a redeposited volume proximate to a processing location.

FIG. 7 schematically illustrates one example technique for quantifying processing quality so as to obtain an approximation of an ablated volume and a redeposited volume proximate to a processing location. For some processing applications, a rough measurement of the trench depth relative to the recast peak or average height may be sufficient to quantify the influence of laser parameters on machining quality. However, for other processing applications, it may be more accurate to characterize a quantity of material removed versus a quantity of material recast.

As an example, FIG. 7 schematically illustrates one possible method for quantifying laser-based material processing of a workpiece. From cross-sectional images of the trench obtained, for example, with a scanning electron microscope (SEM), the ablated area is approximated by fitting a triangle to the shape of a vertical bisector of the trench (hatched triangles in FIG. 7). A triangular approximation is also used to approximate the amount of material recast (cross-hatched triangles in FIG. 7). The trench (or other feature) quality is therefore quantified by the ratio of the triangular ablated area to the triangular recast area. In the following example results, a JEOL JSM 6060 SEM, available from JEOL USA, Inc. (Peabody, Mass.) was used. Additional measurements are obtainable using automated or semi-automated tools, for example a fully automated SEM system, white light interferometer, surface profilometer(s), and/or atomic force microscopes.

In some cases, the ablated area can be estimated by approximating the trench and recast with a polygon enclosing the area and estimating the area from the area of the polygon. In various embodiments, the polygon may have 3, 4, 5, 6, 7, 8, or more sides. In other embodiments, different shapes may be used to estimate the trench and/or recast areas. For example, a cross-sectional profile of a feature may be approximated by a spline, a best-fit curve, etc. In yet other embodiments, trench and/or recast areas may be estimated by summing areas of a plurality of geometric shapes (e.g., rectangles, trapezoids, etc.) that "fit" in the features (e.g., generally similar to approximating the area under a curve using the trapezoidal rule or Simpson's rule). A wide variety of numerical techniques may be used to estimate areas.

Observations Based on the Example Experimental Results

The D-10K laser generates ultrashort pulse trains with 1 MHz repetition rate and average power of 10 W, which correspond to a pulse energy of about 10 μJ. A pulse duration was about 0.5 ps (500 fs) and the central wavelength was about 1045 nm. In order to demonstrate the effect of nonlinear absorption, which may provide a measure for HAZ, a nanosecond fiber laser was also used to process a composite material in these experiments. The ns fiber laser had a central wavelength of about 1066 nm and a pulse duration of about 20 ns, significantly longer than the 500 fs pulses of the D-10K laser. The pulse repetition rate of the ns laser was set at 14 kHz at an average power of 440 mW, corresponding to a pulse energy of about 31 μJ. The example experimental results using the D-10K ultrashort pulse laser are shown in FIGS. 7A-7D, and the example experimental results using the ns laser are shown in FIGS. 8A-8C.

In these experiments, the workpiece was a 5 mil (125 μm) thick PCB sheet 700 comprising G10/FR4 composite material. Lasers were focused normally onto the workpiece with a focal spot diameter of about 30 μm. The position of the target was controlled by a 3D motion translation stage. In these experiments, an optimized focal condition was obtained by varying the sample position around the focal point to achieve a maximum power density. Power density was characterized by ablating a test pattern with different sample heights.

Figure 7A:
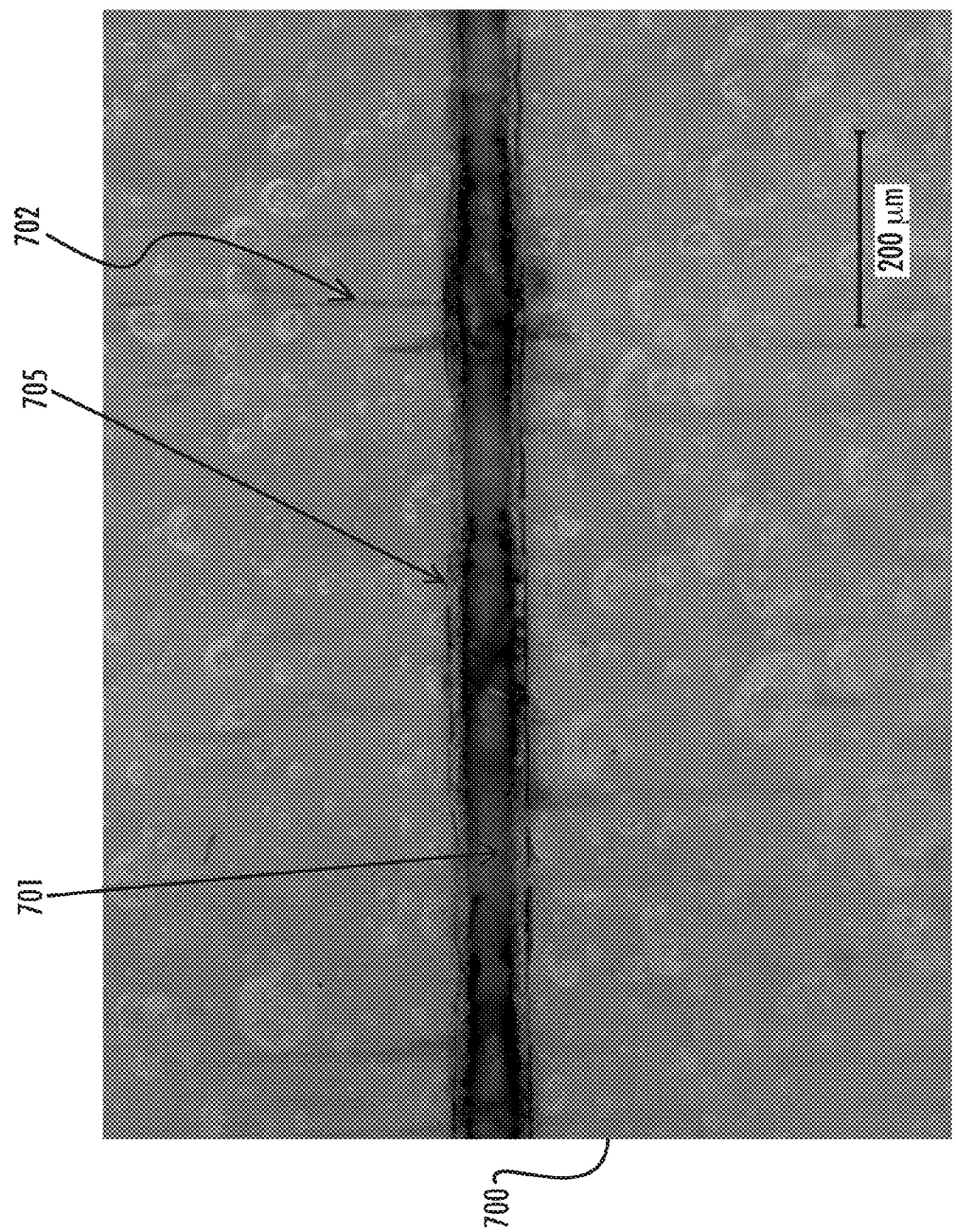
FIGS. 7A and 7B illustrate an example experimental result showing cutting of a composite material workpiece using an ultrashort pulse infrared (IR) laser providing about 10 µJ of pulse energy. The composite material workpiece comprised a PCB composite material and was entirely cut through during the laser processing.
Figure 7B:
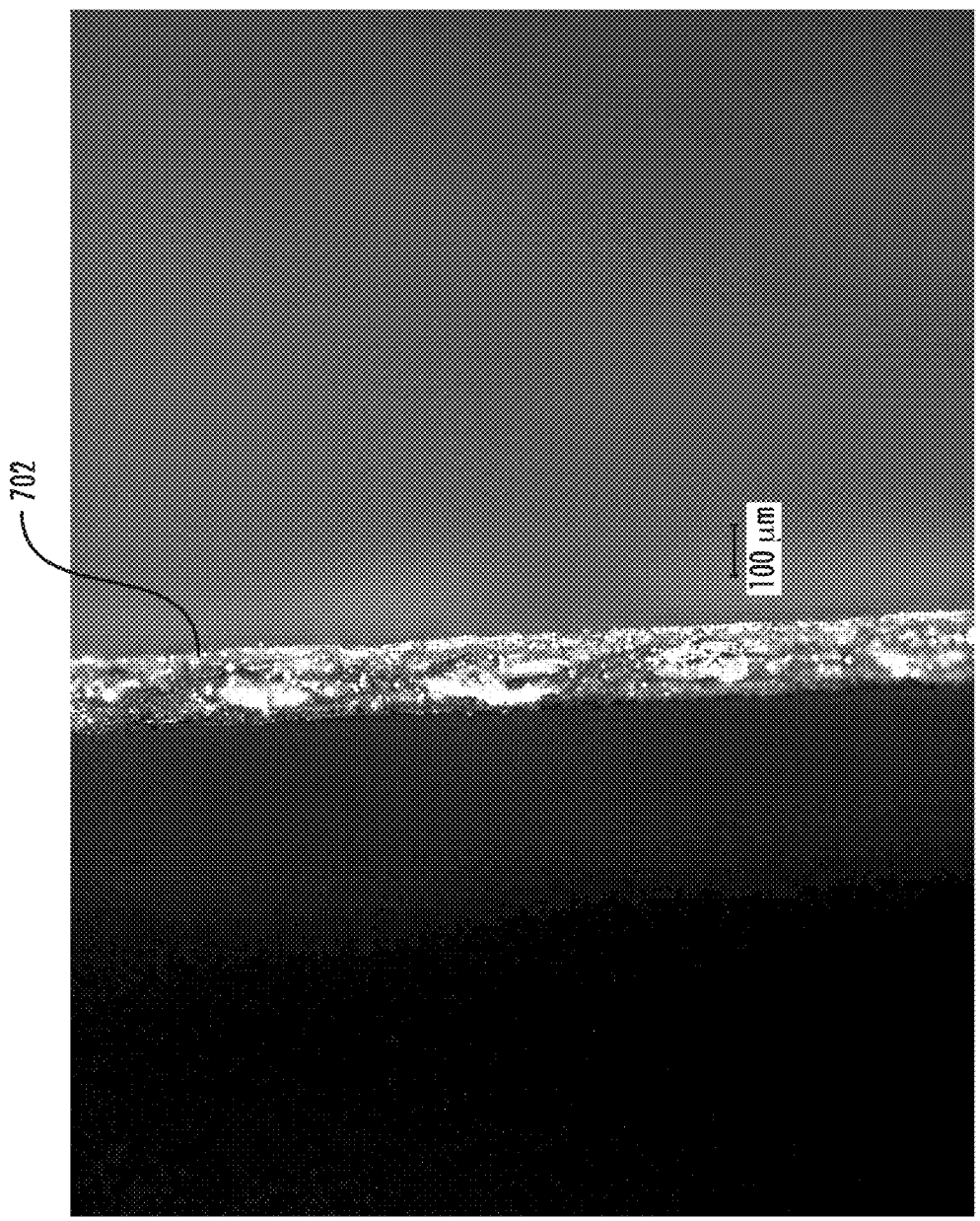
Figure 8A:
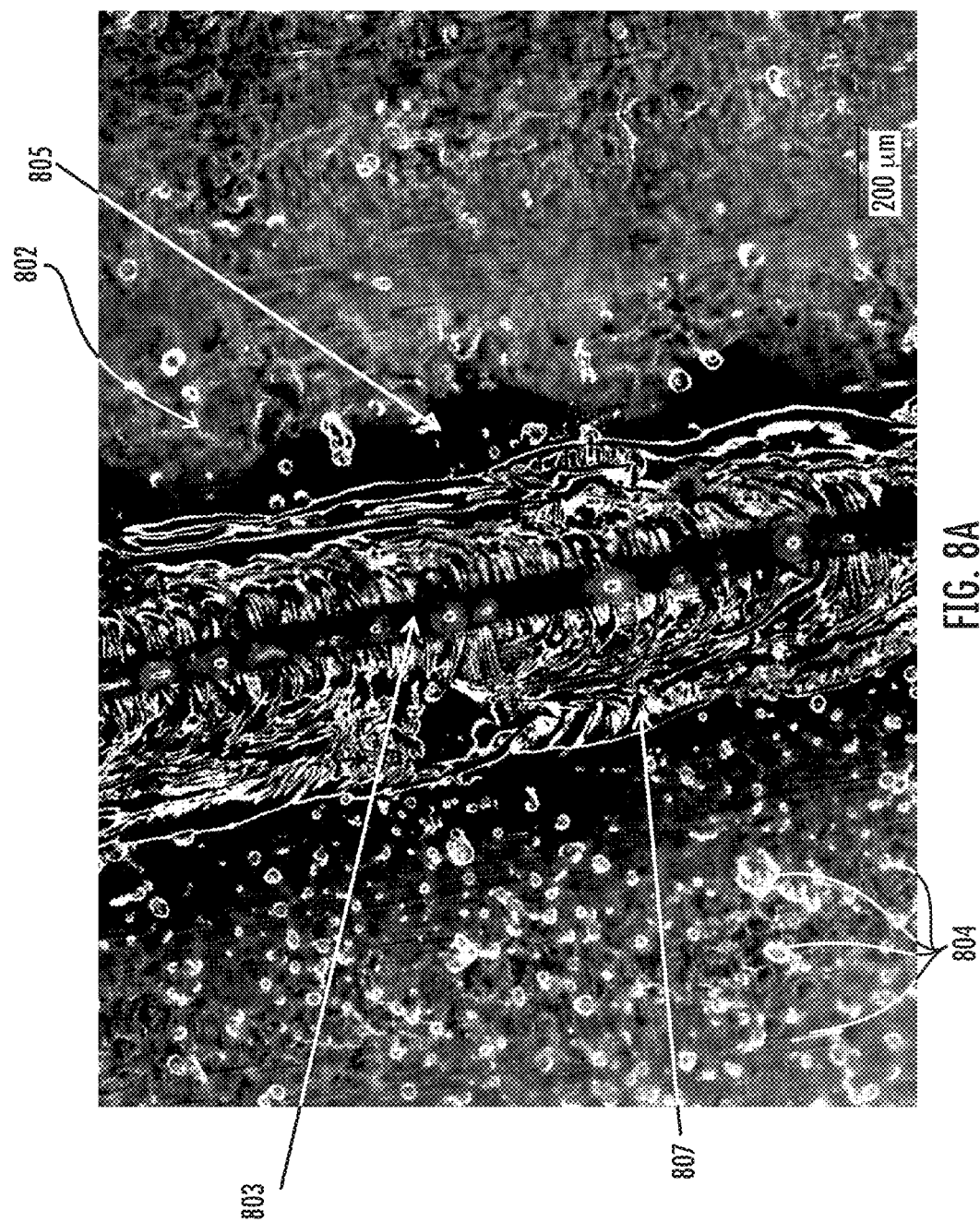
FIGS. 8A and 8B illustrate an example of cutting a composite material workpiece using an IR nanosecond (ns) pulsed laser.
Figure 8B:
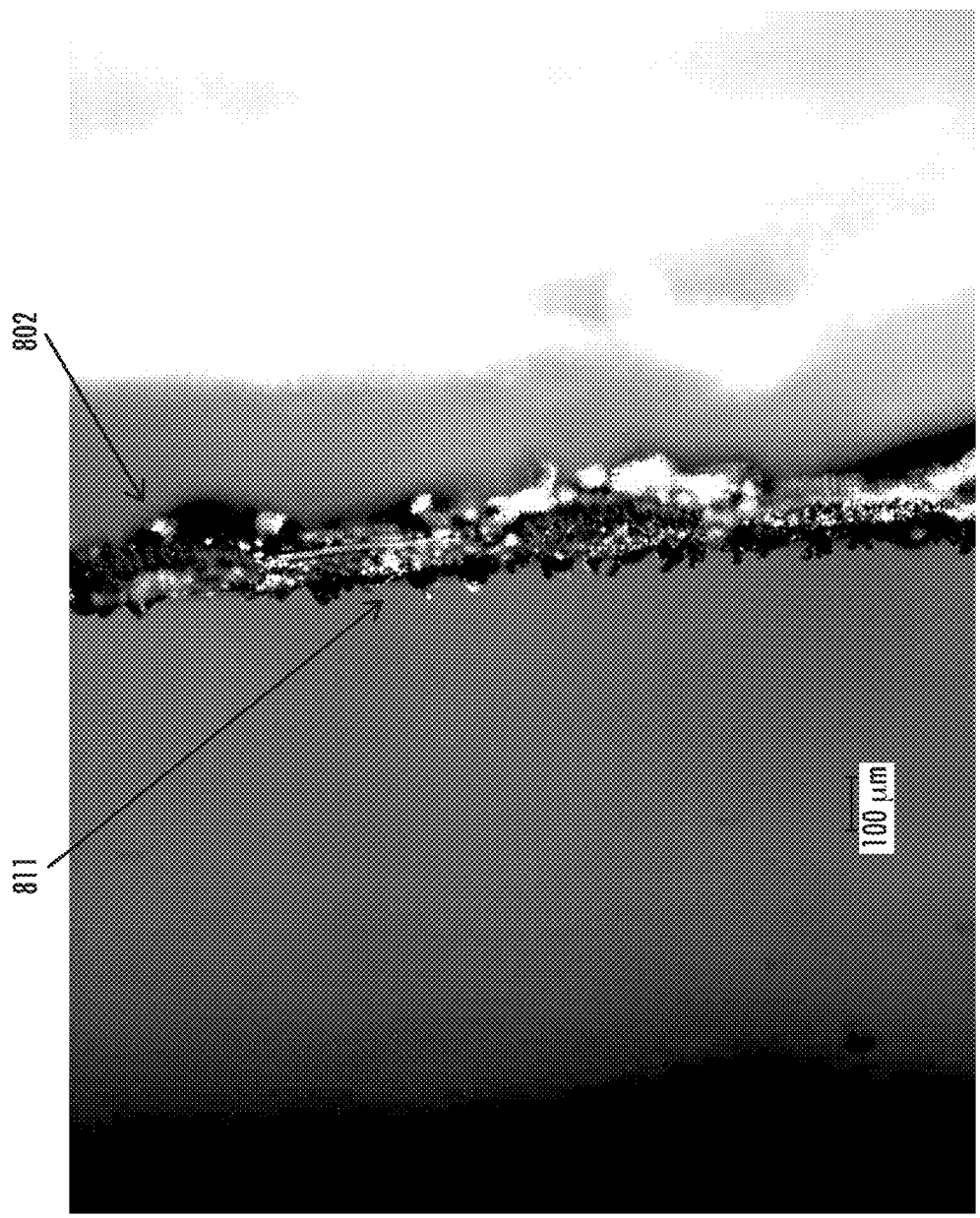
Figure 8C:
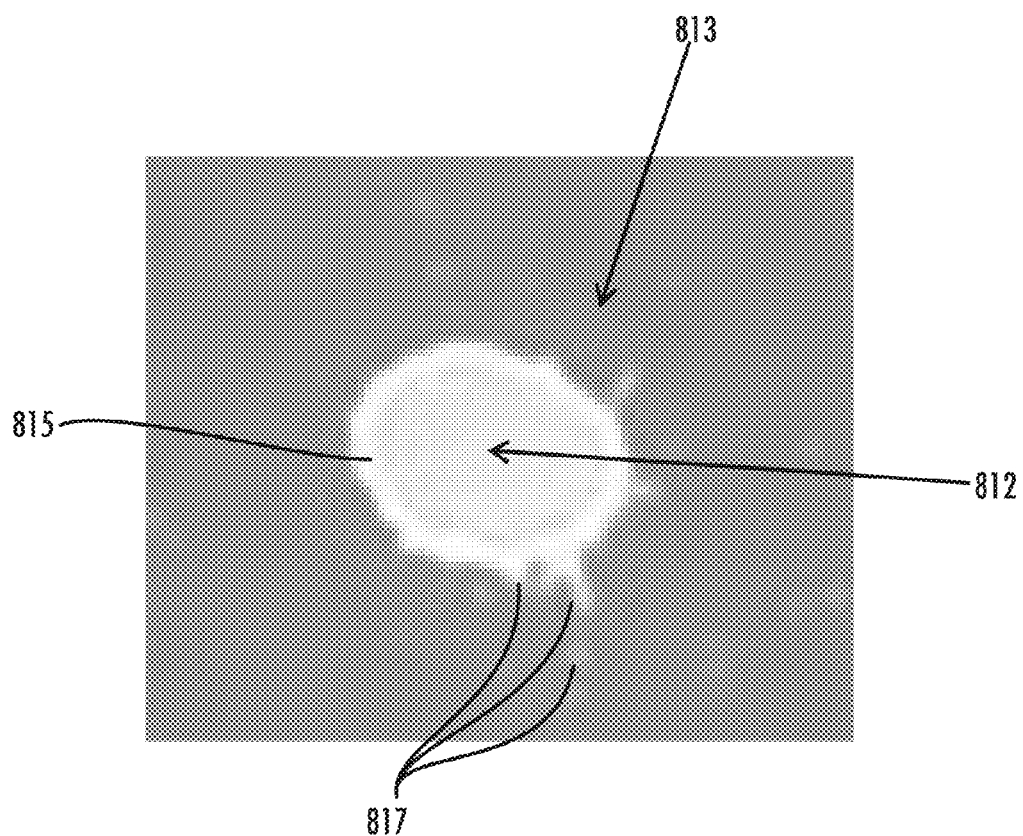
FIG. 8C shows a top view of a portion of a workpiece irradiated with an IR nanosecond pulse providing a fluence substantially higher than the ablation threshold of a femtosecond laser pulse. No damage of the glass fiber layer is evident in this example; only the polyimide top layer is ablated.

FIGS. 7A and 7B show optical microscopic images of the G10/FR4 sample 700 cut by the ultrashort pulse laser along a cutting line 702. In this experiment a scanning speed of about 200 mm/s was provided by the galvanometric scanning minors 108, and the scanning was repeated four times. It is to be understood that, for this composite material processing, translation stage(s) could be used additionally and/or alternatively to the minors 108. FIG. 7A provides a top view of the cutting line 702, corresponding to a complete cut through the composite material 700. The cut 702 includes a through-cut region 701 with a width of about 40 μm. The cutting line 702 also includes a narrow section 705 disposed along edges of the through-cut region 701. It is believed (although not required) that the narrow section 705 results at least partially from the removal of the polyimide top layer of the composite material 700 due to lower beam intensity away from the center of the laser spots in a Gaussian distribution of the intensity, and partially from recast of epoxy-glass material from the through cut section 701.

FIG. 7B illustrates an edge view of the cutting line 702 of a partially broken away portion of the workpiece. Compared to the ns laser cutting examples shown in FIGS. 8A and 8B, the ultrashort pulse laser provides a much clearer cutting edge with little or no recast or residue on the cutting surface. When a ns laser is used on composite material comprising epoxy resin (such as the example G-10/FR-4 workpiece used in the experiments), heat effects can produce voids on the cutting surface due to vaporization of overheated epoxy resin, as disclosed by K. C. Yung et al., J. Mater. Process Technology 122, 278 (2002)). In contrast, the example results in FIGS. 7A and 7B show few (if any) voids on the cutting surface when processed by a high-repetition rate ultrashort pulse laser. This benefit is expected to strengthen the cutting edge mechanically.

Figure 7C:
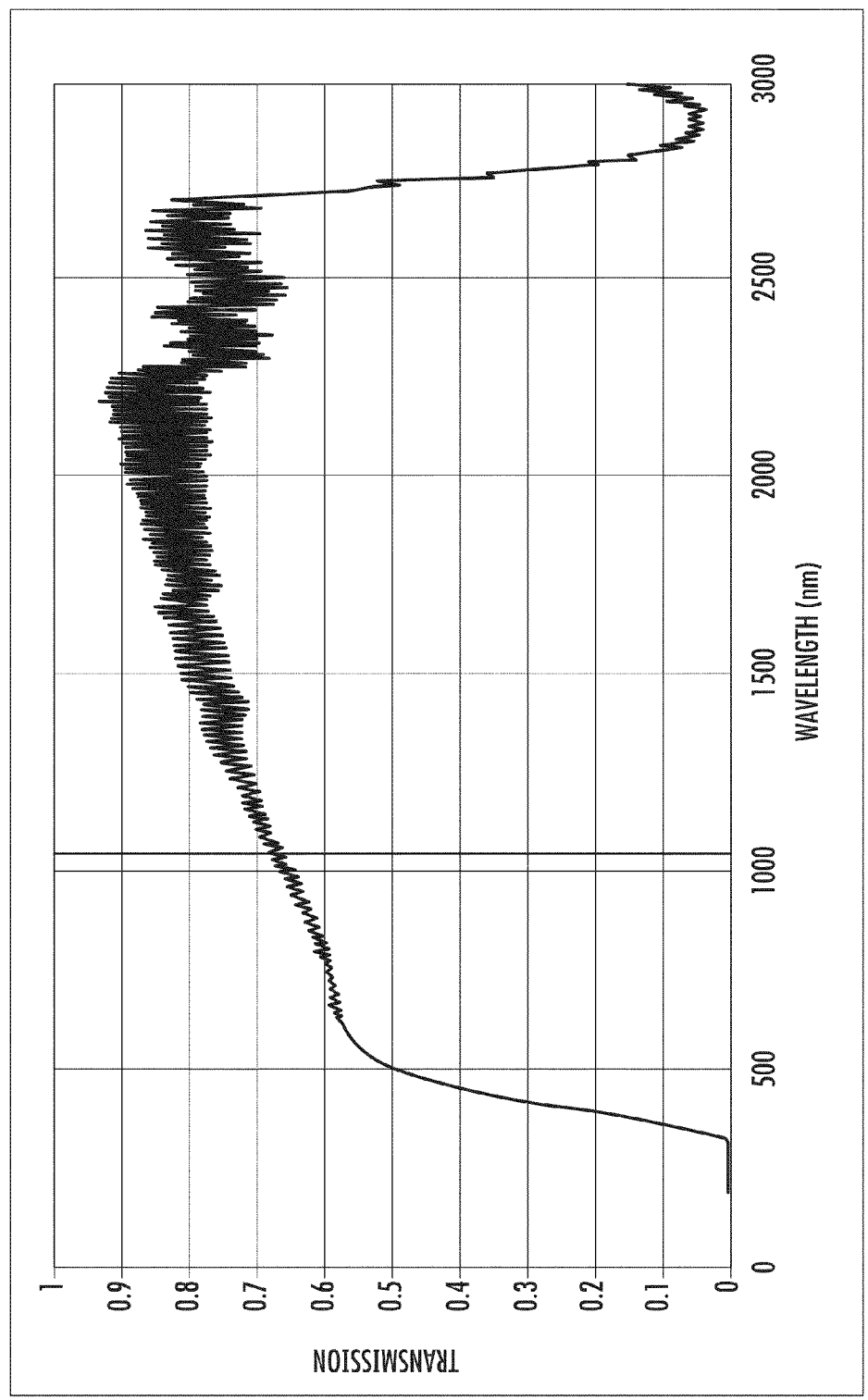
FIG. 7C is a plot illustrating an example measurement of a transmission spectrum of a composite material workpiece utilized for experiments described herein. The measurements show an absorption edge near about 500 nm. It is believed (although not required) that the wavelength range shorter than the absorption edge corresponds to linear absorption. In the wavelength range above the absorption edge in this example, the workpiece is relatively transparent, and it is believed (although not required) that nonlinear absorption processes will tend to dominate linear absorption processes in this wavelength range, at least for relatively high intensity pulses.

A transmission measurement of the absorptivity of a composite material workpiece comprising G-10/FR-4 is shown in FIG. 7C. An absorption edge is found at about 500 nm with a relatively transparent regime in the wavelength range greater than the absorption edge and out to about 2700 nm. This example workpiece is relatively transparent at IR wavelengths near about 1000 nm. The vertical line at about 1045 nm in FIG. 7C indicates the IR wavelength used for some ultrashort pulse experiments. The target material used in the transmission measurement experiment was not optically flat and homogenous, which may at least partially explain the ringing observed on the plot in FIG. 7C. The plot shown in FIG. 7C supports (but does not require) a reasonable assumption that linear absorption plays a role in this workpiece for the wavelength range substantially below the absorption edge at 500 nm. A UV range of wavelengths of about 200 nm to about 360 nm can be achieved from harmonic generation of the fundamental IR wavelength (about 1000 nm) of a laser source and is well matched with the linear absorption range. For wavelengths longer than the absorption edge, this workpiece is relatively transparent, and linear absorption will tend to play less of a role in absorbing laser light than nonlinear absorption processes. Accordingly, when this example workpiece is irradiated with high power laser pulses, nonlinear absorption processes will tend to predominate over linear absorption processes, at least at wavelengths greater than the absorption edge at about 500 nm. Accordingly, use of the fundamental IR wavelength at about 1 µm and high power densities may be advantageous for laser processing of the composite materials of this workpiece.

Figure 7D:
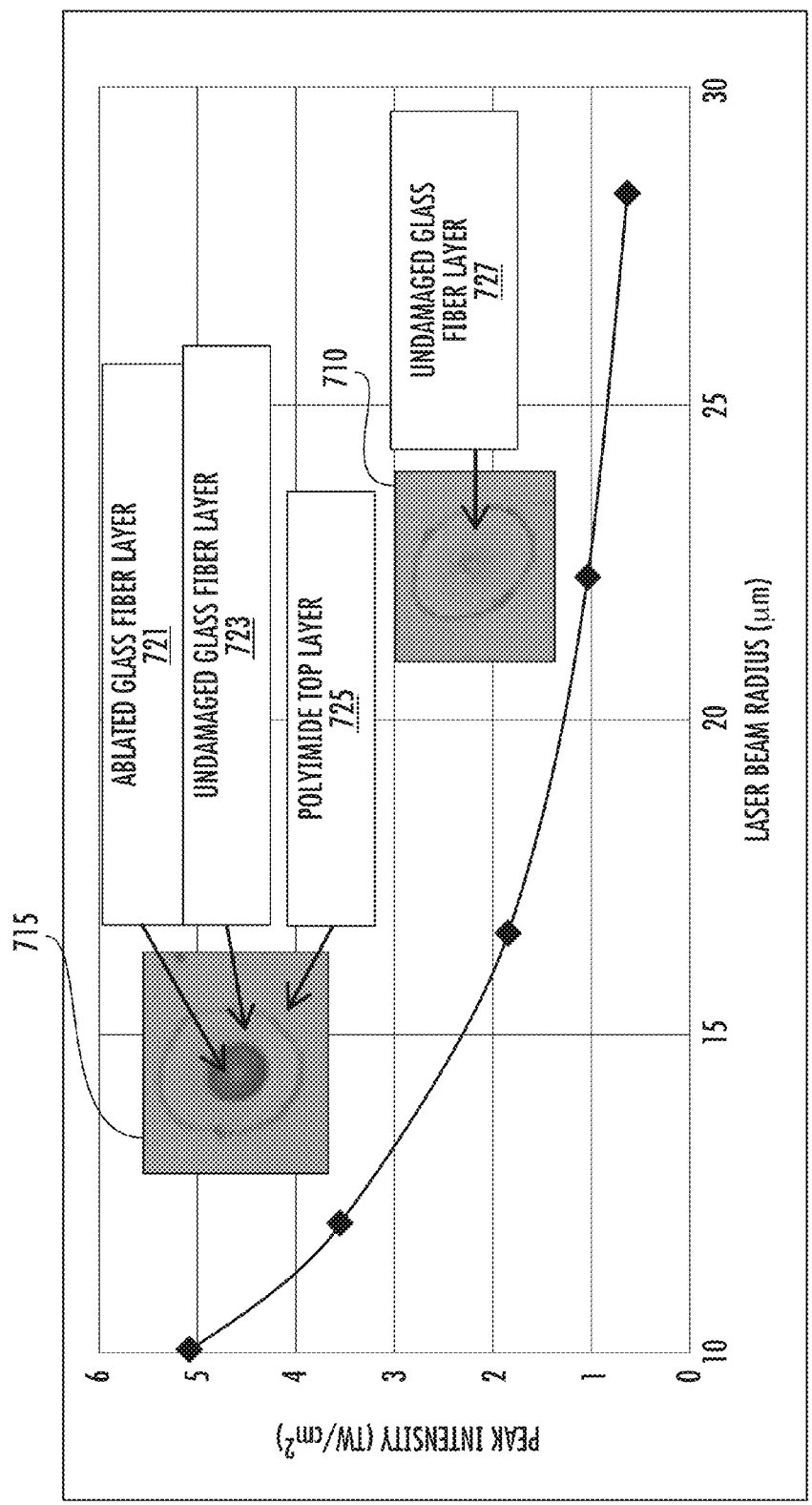
FIG. 7D is a plot illustrating a peak intensity versus radius of the laser beam for an ultrashort pulse laser processing example for cutting a composite material workpiece. The workpiece comprises an epoxy-glass fiber layer coated by a polyimide top layer. The peak intensity (shown on the vertical axis) was adjusted by changing the laser spot size (e.g., laser beam radius shown on the horizontal axis). The insets 710 and 715 are microscope images that show portions of the workpiece after laser processing. In this example, ablation of the glass fiber layer was initiated at a peak intensity (or power density) of about 1 TW/cm$^2$.

FIG. 7D is a plot illustrating a peak intensity versus radius of the laser beam for an ultrashort pulse laser processing example for cutting a composite material workpiece. The workpiece comprises an epoxy-glass fiber layer coated by a polyimide top layer. The peak intensity (shown on the vertical axis) was adjusted by changing the laser spot size (e.g., laser beam radius shown on the horizontal axis). The ablation threshold of the example workpiece can be estimated from these example results. The example experimental results shown in FIG. 7D were obtained by varying the size of the laser spot on the workpiece while maintaining the pulse energy at a constant value. Insets 710 and 715 are microscope photographs of regions of the workpiece after laser processing. Each ring visible in the insets 710, 715 corresponds to the edge of the ablated polyimide and illustrates the size of ablated polyimide material. The insets 710 and 715 show that in this example the onset of ablation of the glass fiber layer occurred at a peak intensity of about 1 TW/cm$^2$, which may correspond to the threshold for nonlinear absorption in these example experiments. For example, the inset 715 shows that the glass fiber layer 721 beneath the polyimide top layer 725 was above threshold and was ablated at a peak intensity about 3-4 TW/cm$^2$, e.g., as shown by the peak of the spot distribution being near or slightly above the threshold of the glass fiber layer. The glass fiber region 723 was below threshold and no substantial material modification of the glass fiber region 723 is evident in the inset 715. In contrast, the threshold intensity for the polyimide top layer 725 is substantially lower than that of the glass fiber layer and was ablated in these experiments (e.g., within the rings shown in insets 710, 715). The inset 710 shows that at lower peak intensity near about 1 TW/cm$^2$ the glass fiber layer 727 was very close to the ablation threshold in a small region near the center of the spot distribution. Thus, the glass fiber layer 727 was effectively undamaged, except for the small region of modified material shown near the center of the inset 710.

FIGS. 8A and 8B show optical microscopic images of an experiment in which the G10/FR4 sample was cut by the ns laser described above. Note that the sample, specifically epoxy resin, is not completely transparent at about 1060 nm and reveals certain opaqueness leading to a weak, linear absorption of some of the energy in the IR ns pulse. Processing parameters included a translation speed of about 1 mm/sec, 2 processing passes, spot overlap greater than about 99%, and a 14 kHz repetition rate. It is believed (although not required) that this weak linear absorption induces material changes leading to further cascaded absorption both in the linear and the nonlinear absorption regimes. As mentioned above, it is believed (although not required) that linear absorption has a more decisive impact on ns-pulse ablation. The energy for ablation can be reduced with ultrashort pulses, and in these examples Applicants estimate effectively four times higher accumulated pulse energy was used to fully cut the workpiece with ns pulses in comparison to the ultrashort pulses. This estimate is based at least in part on differences between the ns and the ultrashort pulse results in the repetition rate, pulse energy, scan speed and number of passes used in these experiments.

FIG. 8A illustrates a top view of the cut line 802 in this example experiment. The observed width of kerf 803 is about 90 µm, which is over twice the width of the cut-through region 701 shown in FIG. 7A. The cut line 802 shows HAZ 807 about 400 µm wide along both edges of the kerf 803. FIG. 8A also shows the presence of molten recast 804 is evident in the HAZ. An extended HAZ 805 is also shown in FIG. 8A. Expansion of heat produced by the ns pulses without ablation of the target material may also contribute to the widths of the kerf 803 and/or HAZ 805, 807.

FIG. 8B illustrates an edge view 811 of the cut line 802 of a partially broken away sample, showing recasts and residues. As a result of overheating with ns pulses, the epoxy resin can burn and shrink, turning into char, and resulting in recast. This overheating also leads to fiber protruding from the cutting surface and to a non-uniform cut line. By comparing FIGS. 7A and 8A, it is apparent that the ultrashort pulse laser cutting (see, e.g., FIG. 7A) provides a narrower kerf and/or HAZ determined, for example, by char or blackened area. Reduced kerf width, reduced char, and/or reduced HAZ can be advantageous for laser processing of high density circuit PCB packages.

To demonstrate that the ablation mechanism for the full cut of the PCB layer shown in FIGS. 7A and 7B depends more on nonlinear absorption than on linear absorption, FIG. 8C shows a result for IR nanosecond pulse processing on the same workpiece used for the ultrashort pulse processing shown in FIG. 7D. The fluence produced with the nanosecond pulse was set over 4 times higher than the fluence corresponding to the ablation threshold of the glass fiber layer with a 500 fs pulse. No significant material modification of the glass-fiber layer 812 is observed in FIG. 8C; only the polyimide top layer 813 was ablated. The boundary 815 of the ablated region contained molten polyimide, and droplets 817 in the region are evident. It is believed (but not required) that these results follow from the excessive HAZ of nanosecond pulses, which degrade the clean cut as the fluence increases for the full cut.

Although the ns laser provides higher pulse energy than the D-10K ultrashort pulse laser, the ns laser pulses have a peak intensity that is much lower due to the longer pulse width. As a result, ablation with the ns pulses was more difficult to obtain and less efficient than with the ultrashort pulses in these experiments. Additionally, because the ns laser generates more heat on the sample than the ultrashort pulse laser, the initial cutting by the ns laser produces charring about the cutting line. The charring area can increase absorption of the laser beam, further accelerating the formation of char and molten recasts to the surrounding region of the laser spot. Thus, an inhomogeneous cut line can be produced when the composite material is processed with the ns pulses.

K. C. Yung et al., in J. Mater. Process Technology vol. 122, p. 278 (2002) suggest that a UV laser may be preferred to reduce thermal accumulation and reduce HAZ. The example experimental results shown in FIGS. 7A-7D indicate that, an ultrashort pulse laser using a near IR wavelength, for example in the range from about 1 µm to about 1.1 µm, advantageously can provide a nearly HAZ-free cut surface and reduced charring. The quality of the cut 702 shown in FIGS. 7A and 7B is improved compared to the cuts disclosed in K. C. Yung et al. (and compared to the quality of the cuts shown in FIGS. 8A and 8B).

Embodiments of the present systems and methods may provide further advantages. For example, embodiments using the fundamental IR beam not only reduce the complexity of the system compared to a system using harmonic generation to create short UV wavelengths, but also substantially increases the working power for a laser source with high repetition rate. The increased working power provides for high throughput in some material processing implementations. In addition, maintenance of UV pulse generation can limit cost and reliability of a UV laser source due to the degradation of the harmonic crystal, particularly at shorter wavelengths. Furthermore, and possibly more importantly for some implementations, using a non-UV laser beam (e.g., a visible or IR beam) provides an advantage in not polymerizing organic resin for some materials.

Some experimental cuts shown in the results by X. C. Wang et al., Optics and Lasers in Engineering 46, 404 (2008) were obtained with 25-30 ns pulses and at a high overlap ratio of laser spots. Applicants' experiments show the surprising results that ultrashort pulses having a high spot overlap ratio (e.g., greater than about 50%, for example with a 25 µm spot diameter and 1000 mm/sec single scan speed) can provide improved quality of cuts as compared to Wang's results with 25-30 ns pulses. Accordingly, Applicants believe that high spot overlap ratio may be desirable for high throughput processing for a high repetition rate ultrashort pulse train in some embodiments. Embodiments of ultrashort laser pulse processing can result in a high quality HAZ-free (from the charring aspect) and straight-line cut when, for example, a spot overlap greater than about 99% (in some example experiments) is used and the laser beam power density is sufficient that the pulses are absorbed by nonlinear absorption processes in the composite material. Accordingly, in some embodiments, a high-speed, high-quality laser cut of epoxy and glass fiber reinforced PCB can be performed, which may be particularly beneficial for high speed PCB designs.

Based on these example experimental results for cutting G10/FR-4 material by ultrashort pulses and ns laser pulses, Applicants believe that ultrashort pulse laser cutting can have superior properties for laser cutting of composite materials in certain material processing implementations. These superior properties are expected to be found for composite materials including, but not limited to, FR-1, FR-2, FR-3, FR-4, FR-5, FR-6, G-10, CEM-1, CEM-2, CEM-3, and CEM-4.

The examples described herein illustrate experimental results for laser-processing of certain composite materials. Embodiments of systems and methods for ultrashort laser pulse processing provide a high cut quality measured in terms of reduced chipping, char, delamination, and/or more homogeneous cut section and line. Certain such embodiments advantageously reduce excessive kerf size, excessive heat outside the laser spot area and/or recasting molten debris associated with dielectric materials as compared to longer pulse (e.g., >ns) embodiments. Certain of the example techniques and example systems discussed herein providing surprising results for ultrashort laser processing by departing from the conventional wisdom of using longer pulses (e.g., >ns pulses) at UV wavelength with a high degree of linear absorption and with little or no spot overlap. Various embodiments described herein provide possibilities for achieving at least i) a high spot overlap ratio greater than about 90%, and high average power and high repetition rate laser source for enhanced processing throughput and/or ii) control of HAZ by taking advantage of nonlinear absorption. In various embodiments ultrashort laser pulses are utilized with a wavelength longer than the linear absorption edge in the material. In some embodiments, IR and/or second harmonic of the IR wavelength, where the linear absorption coefficient is relatively low, may be utilized for laser processing of composite materials. An embodiment for processing composite material may advantageously exploit nonlinear absorption as a primary process of absorbing light (compared to the linear absorption process), with the possible exception (in some implementations) of processing metallic material (which may in some cases exploit linear absorption processes). Also, in various implementations, laser processing of metallic material may be provided using processing parameters, e.g., power density, spatial overlap, scan speed, pulse energy, pulse repetition rate, etc., that are substantially the same as, or substantially different from, some or all of the processing parameters used for processing of the composite material. In at least one embodiment cutting thin printed circuit boards comprising glass fiber reinforcement mixed with epoxy resin has been performed.

Additional Embodiments

In some embodiments optical parameters of a laser based processing system can include one or more of:

a wavelength in the range from about 0.5 µm to about 2 µm; a wavelength in a range from about 0.9 µm to about 1.1 µm; a wavelength in a range from about 1 µm to about 1.5 µm; a wavelength of about 1045 nm; a wavelength in the infrared or visible portions of the electromagnetic spectrum; a wavelength corresponding to the fundamental output wavelength of the laser based processing system;

a wavelength in a range in which the composite material is relatively transparent to the laser pulses;

a wavelength in a range greater than an absorption edge in the composite material;

a wavelength in a range in which nonlinear absorption processes are substantially greater than linear absorption processes for the laser pulses;

a peak intensity at the workpiece greater than about $10^{12}$ W/cm$^2$, and in various embodiments in the range from about $10^{12}$ W/cm$^2$ to about $10^{14}$ W/cm$^2$;

a peak intensity at the workpiece of at least about $10^9$ W/cm$^2$, or in the range from about $10^{10}$ W/cm$^2$ to about $10^{12}$ W/cm$^2$;

peak intensities that may provide for processing with high repetition rates, for example rates in the range from about 1 MHz to about 1 GHz;

the power density at the workpiece may be greater than an ablation threshold of a material in the composite material; the ablation threshold may be greater than about $10^9$ W/cm$^2$, for example, about 1 TW/cm$^2$, for various composite materials;

a pulse duration may in the range from about 100 fs to about 10 ps;

a pulse duration may be about 100 fs, about 500 fs, about 1 ps, or about 10 ps;

a spatial overlap between adjacent spots ($1/e^2$) may be at least about 50%, at least about 80%, at least about 90%, at least about 95%, at least about 98%, or at least about 99%.

A thickness of the composite material workpiece may be less than about 1000 μm, less than about 500 μm, less than about 400 μm, less than about 300 μm, less than about 200 μm, or less than about 100 μm. The composite material may comprise glass and epoxy resin.

Embodiments are disclosed in which a near IR wavelength in the range from about 1 μm to about 1.5 μm provides for the superior results illustrated above (e.g., compared to processing with longer pulses) and may be implemented with present commercially available fiber laser-based systems.

In some embodiments for multi-material processing, where applications indicate a demand, an ultrashort pulse laser (e.g., a fs laser) may be utilized in combination with other lasers, including ns UV lasers.

In some embodiments an ultrashort pulse laser-based system producing harmonically generated visible or near UV laser pulses may be utilized. For example, U.S. Pat. No. 6,210,401 to Lai discloses generation of picosecond UV pulses for ablation of organic materials, but also suggests the disclosed configurations can also be useful for applications in micro-electronics in the areas of circuit repair, mask fabrication and repair, and direct writing of circuits. In accordance with the teachings herein, ultrashort fiber-based laser systems may provide a suitable source for fundamental wavelengths which are harmonically converted to short wavelengths to meet various application requirements.

The example experiments, experimental data, tables, graphs, plots, photographs, figures, and processing and/or operating parameters (e.g., values and/or ranges) described herein are intended to be illustrative of operating conditions of the disclosed systems and methods and are not intended to limit the scope of the operating conditions for various embodiments of the methods and systems disclosed herein. Additionally, the experiments, experimental data, calculated data, tables, graphs, plots, photographs, figures, and other data disclosed herein demonstrate various regimes in which embodiments of the disclosed systems and methods may operate effectively to produce one or more desired results. Such operating regimes and desired results are not limited solely to specific values of operating parameters, conditions, or results shown, for example, in a table, graph, plot, figure, or photograph, but also include suitable ranges including or spanning these specific values. Accordingly, the values disclosed herein include the range of values between any of the values listed or shown in the tables, graphs, plots, figures, photographs, etc. Additionally, the values disclosed herein include the range of values above or below any of the values listed or shown in the tables, graphs, plots, figures, photographs, etc. as might be demonstrated by other values listed or shown in the tables, graphs, plots, figures, photographs, etc. Also, although the data disclosed herein may establish one or more effective operating ranges and/or one or more desired results for certain embodiments, it is to be understood that not every embodiment need be operable in each such operating range or need produce each such desired result. Further, other embodiments of the disclosed systems and methods may operate in other operating regimes and/or produce other results than shown and described with reference to the example experiments, experimental data, tables, graphs, plots, photographs, figures, and other data herein.

Other systems, setups, and parameters may be used in other implementations, which may provide the same or different results. Many variations are possible and are contemplated within the scope of this disclosure. Films, layers, components, features, structures, and/or elements may be added, removed, combined, or rearranged. Additionally, process or method steps may be added, removed, or reordered. No single feature or step, or group of features or steps, is indispensable or required for each embodiment.

Certain processing steps or acts of the methods disclosed herein may be implemented in hardware, software, or firmware, which may be executed by one or more general and/or special purpose computers, processors, or controllers, including one or more floating point gate arrays (FPGAs), programmable logic devices (PLDs), application specific integrated circuits (ASICs), and/or any other suitable processing device. In certain embodiments, one or more functions provided by a controller or a control means may be implemented as software, instructions, logic, and/or modules executable by one or more processing devices. In some embodiments, the software, instructions, logic, and/or modules may be stored on computer-readable media including storage media implemented on a physical storage device and/or communication media that facilitates transfer of information. In various embodiments, some or all of the steps or acts of the disclosed methods may be performed automatically by one or more processing devices. Many variations are possible.

For purposes of this disclosure, certain aspects, advantages, and novel features are described herein. It is to be understood that not necessarily all such advantages may be achieved in accordance with any particular embodiment. Thus, for example, those skilled in the art will recognize that the systems and methods may be embodied or carried out in a manner that achieves one advantage or group of advantages as taught herein without necessarily achieving other advantages as may be taught or suggested herein. Furthermore, embodiments may include several novel features, no single one of which is solely responsible for the embodiment's desirable attributes or which is essential to practicing the systems and methods described herein. Additionally, in any method or process disclosed herein, the acts or operations of the method or process may be performed in any suitable sequence and are not necessarily limited to any particular disclosed sequence.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain embodiments of the inventions disclosed herein have been described, these embodiments have been presented by way of example only, and are not intended to limit the scope of the inventions disclosed herein. Reference throughout this disclosure to "some embodiments," "an embodiment," or the like, means that a particular feature, structure, step, process, or characteristic described in connection with the embodiment is included in at least one embodiment. Thus, appearances of the phrases "in some embodiments," "in an embodiment," or the like, throughout this disclosure are not necessarily all referring to the same embodiment and may refer to one or more of the same or different embodiments. Indeed, the novel methods and systems described herein may be embodied in a variety of other forms; furthermore, various omissions, substitutions, equivalents, and changes in the form of the methods and systems described herein may be made without departing from the spirit of the inventions disclosed herein.

What is claimed is:

1. A method of scribing, dicing, or cutting to remove material from a region of a workpiece having a composite material comprising at least two non-metallic materials having different optical properties, said method comprising:
    directing laser pulses toward said composite material of said workpiece to scribe, dice, or cut to remove material from the region of the workpiece having said composite material, the composite material comprising at least one portion of matrix and at least one portion of reinforcement in which the matrix surrounds and supports the reinforcement, said composite material comprising reinforced fiber, the laser pulses having at least one pulse width in the range from 10 fs to 500 picoseconds and a pulse repetition rate in the range from 10 kHz to 10 MHz;
    focusing said laser pulses into laser spots to scribe, dice, or cut to remove material from the region of the workpiece having said composite material, said laser spots having spot sizes ($1/e^2$) in a range from 1 micron to 100 μm, wherein at least one said laser pulse provides a power density above a threshold for nonlinear absorption in said reinforced fiber of said composite material at a wavelength of said at least one laser pulse, wherein said power density is in a range from $10^{12}$ W/cm$^2$ to $10^{14}$ W/cm$^2$; and
    positioning said laser spots relative to said workpiece to scribe, dice, or cut to remove material from the region of the workpiece having said composite material, said positioning such that a spatial overlap between adjacent focused spots ($1/e^2$) for removal of said composite material is sufficient for scribing, dicing, or cutting said workpiece at said wavelength, pulse width, repetition rate, and power density,
    wherein said method controls heat accumulation within one or more materials of said workpiece region, while limiting accumulation of unwanted material about said region,
    wherein said scribing, dicing, or cutting said workpiece comprises depthwise removing at least 25 μm up to 150 μm of composite material with said laser pulses in a single pass of laser processing pulses relative to said composite material, with said power density and operation in the nonlinear absorption regime in said composite material.

2. The method of claim 1, wherein said composite material of said workpiece comprises a material structure and its host material, wherein said material structure comprises said reinforcement and said host material comprises said matrix.

3. The method of claim 1, wherein said workpiece further comprises non-composite material disposed in contact with said composite material, and said method further comprises removing at least a portion of said non-composite material.

4. The method of claim 1, wherein an energy density of a pulse impinging said non-composite material is above a single shot ablation threshold corresponding to linear absorption at the wavelength.

5. The method of claim 1, wherein said wavelength is in a range from about 0.5 μm to about 2 μm.

6. The method of claim 1, wherein said wavelength is in a range from about 1 μm to about 1.5 μm.

7. The method of claim 1, wherein said wavelength is in a range from about 0.9 μm to about 1.1 μm.

8. The method of claim 1, wherein said workpiece further comprises at least two layers of non-composite material, and said composite material is disposed between said at least two layers of non-composite material, and said method further comprises removing at least a portion of said non-composite material from at least one layer of the non-composite material.

9. The method of claim 1, wherein a thickness of said workpiece is less than about 1000 μm.

10. The method of claim 1, wherein a fluence of at least one pulse is in a range from about 0.01 J/cm$^2$ to about 10 J/cm$^2$, and said positioning comprises moving said composite material relative to said focused spots at a speed in the range from about 1 mm/sec to about 0.5 m/sec.

11. The method of claim 1, wherein at least one laser pulse has a pulse energy in a range from about 0.1 μJ to about 500 μJ, wherein said pulse energy is determined, at least in part, by said spot size and said repetition rate.

12. The method of claim 1, wherein said laser pulses are output by an ultrashort pulsed laser system.

13. The method of claim 1, wherein a pulse width in the range from tens of femtoseconds to about 1 ps.

14. The method of claim 1, wherein said pulses comprise a series of pulses and at least two corresponding laser spots have a spatial overlap of at least about 50%, wherein said series of pulses provide depthwise removal of about 30-300 μm when positioned to impinge at least a portion of said composite material of said workpiece, wherein said spot sizes are in the range from about 10-100 μm.

15. The method of claim 1, wherein said composite material of said workpiece is selected from the group consisting of FR-4, FR-5, FR-6, G-10, CEM-1, CEM-2, CEM-3, CEM-4, and CEM-5.

16. The method of claim 1, wherein said composite material of said workpiece is selected from the group consisting of (a) woven glass and epoxy, (b) matte glass and polyester, (c) cotton paper and epoxy, and (d) woven glass and polyester.

17. The method of claim 1, wherein said workpiece comprises a printed circuit board.

18. The method of claim 1, wherein a patterned metal layer is deposited on said workpiece.

19. The method of claim 1, wherein said workpiece comprises a thin layer of polymer for protecting said composite material of said workpiece.

20. The method of claim 1, wherein said workpiece comprises a layer of low-k material.

21. The method of claim 3, wherein said non-composite material comprises metal.

22. The method of claim 3, wherein said non-composite material comprises a polymer.

23. The method of claim 2, wherein said material structure and its host material enhances a mechanical property of said workpiece.

24. The method of claim 2, wherein said material structure and its host material comprises a woven glass.

25. The method of claim 2, wherein said material structure and its host material comprises matte glass.

26. The method of claim 2, wherein said material structure and its host material comprise cotton paper.

27. The method of claim 2, wherein said host material comprises epoxy.

28. The method of claim 2, wherein said host material comprises polymer.

29. The method of claim 23, wherein said mechanical property comprises rigidity of the workpiece.

30. A method of processing a workpiece having a composite material comprising at least two different materials with different properties and functionalities, said different materials comprising at least one of a dielectric material or a metal material, said method comprising:
    irradiating said composite material of said workpiece with a series of laser pulses to remove at least a portion of said composite material of said workpiece, the composite material comprising at least one portion of matrix and at least one portion of reinforcement in which the matrix surrounds and supports the reinforcement, said composite material comprising reinforced fiber, at least two pulses of the series having different characteristics that are applied to different materials of said workpiece, said series of laser pulses comprising at least one pulse providing a power density above a threshold for nonlinear absorption in said reinforced fiber of said composite material at a wavelength of said at least one laser pulse, said power density in a range from $10^{12}$ W/cm$^2$ to $10^{14}$ W/cm$^2$; and
    controlling heat-affected zone (HAZ) during processing of said workpiece such that at least one HAZ generated during removal of at least one of the dielectric material or the metal material is increased depthwise relative to at least one HAZ generated during removal of a portion of said composite material of said workpiece,
    wherein said processing said workpiece comprises depthwise removing at least 25 µm up to 150 µm of composite material with said laser pulses in a single pass of laser processing pulses relative to said composite material, with said power density and operation in the nonlinear absorption regime in said composite material.

31. A laser-based system for scribing, dicing, or cutting a workpiece having a composite material comprising at least two different materials with different properties and functionalities, the laser-based system comprising:
    said workpiece, wherein said composite material of said workpiece comprises at least one portion of matrix and at least one portion of reinforcement in which the matrix surrounds and supports the reinforcement, said composite material comprising reinforced fiber;
    a source of optical pulses, at least one pulse having a wavelength longer than a linear absorption edge of said composite material of said workpiece;
    an optical amplification system configured to amplify a pulse from said source to a pulse energy of at least 1 µJ and to generate output optical pulses having at least one pulse width in a range from 10 fs to 500 ps;
    a modulation system, comprising at least one optical modulator, configured to adjust a repetition rate of said output optical pulses to be within a range from 10 kHz to 10 MHz;
    a beam delivery system configured to focus and deliver pulsed laser beams to the workpiece to scribe, dice, or cut the workpiece having the composite material, wherein a pulsed beam is focused into a spot size (1/e$^2$) in a range from 1 µm to 100 µm, said focused beam providing a peak power density above a threshold for nonlinear absorption in said reinforced fiber of said composite material at a wavelength of said laser pulse, said peak power density in a range from $10^{12}$ W/cm$^2$ to $10^{14}$ W/cm$^2$;
    a positioning system configured to position said beams relative to said workpiece at a rate in a range from 1 mm/sec to 20 m/sec; and
    a controller configured to be coupled to at least said positioning system, said controller configured to control a spatial overlap between adjacent focused beams during scribing, dicing, or cutting of the workpiece at said repetition rate,
    wherein said laser-based system is configured to depthwise remove at least 25 µm up to 150 µm of composite material with said pulsed laser beams in a single pass of said pulsed laser beams relative to said composite material, with said power density and operation in the nonlinear absorption regime in said composite material.

* * * * *